US00RE50335E

(19) United States
(12) Reissued Patent
Purathepparambil et al.

(10) Patent Number: US RE50,335 E
(45) Date of Reissued Patent: Mar. 11, 2025

(54) CONTEXTUAL SECURITY BEHAVIOR MANAGEMENT AND CHANGE EXECUTION

(71) Applicant: KnowBe4, Inc., Clearwater, FL (US)

(72) Inventors: Santhosh Purathepparambil, Santa Clara, CA (US); Sairamkumar Venkataraman, Santa Clara, CA (US); Rohan Puri, San Jose, CA (US)

(73) Assignee: KnowBe4, Inc.

(21) Appl. No.: 18/107,431

(22) Filed: Feb. 8, 2023

Related U.S. Patent Documents

Reissue of:
(64) Patent No.: 10,917,439
Issued: Feb. 9, 2021
Appl. No.: 16/511,465
Filed: Jul. 15, 2019

U.S. Applications:
(60) Provisional application No. 62/698,440, filed on Jul. 16, 2018.

(51) Int. Cl.
*H04L 29/06* (2006.01)
*G06N 20/00* (2019.01)
*H04L 9/40* (2022.01)

(52) U.S. Cl.
CPC ..... *H04L 63/205* (2013.01); *G06N 20/00* (2019.01); *H04L 63/145* (2013.01)

(58) Field of Classification Search
CPC ... H04L 63/102; H04L 63/105; H04L 63/145; H04L 63/20; H04L 63/205; G06F 21/55; G06F 21/552; G06F 21/577; G06N 20/00
See application file for complete search history.

(56) References Cited

U.S. PATENT DOCUMENTS

| | | | |
|---|---|---|---|
| 8,615,807 | B1 | 12/2013 | Higbee et al. |
| 8,635,703 | B1 | 1/2014 | Belani et al. |
| 8,719,940 | B1 | 5/2014 | Higbee et al. |
| 8,910,287 | B1 | 12/2014 | Belani et al. |
| 8,966,637 | B2 | 2/2015 | Belani et al. |
| 9,053,326 | B2 | 6/2015 | Higbee et al. |

(Continued)

FOREIGN PATENT DOCUMENTS

| | | | |
|---|---|---|---|
| EP | 3 582 468 | A1 | 12/2019 |
| WO | WO-2016/164844 | A1 | 10/2016 |

*Primary Examiner* — Minh Dieu Nguyen
(74) *Attorney, Agent, or Firm* — Foley & Lardner LLP

(57) ABSTRACT

A method and a system for contextually managing and executing a change in security behavior of a target user are provided. The system extracts multiple context attributes including activity telemetry, skill, etc., from multiple external applications. The system dynamically generates one or more security behavioral models for each user based on behavior modeling criteria. The system dynamically generates a security behavior score for each user by scoring a selection of the context attributes from their security behavioral models. The system dynamically generates targeted, contextual control elements specific to a target user identified from among the users using the security behavioral models, the security behavior score, and one or more context libraries. The system dynamically renders one or more of the targeted, contextual control elements on a user device of the target user through one or more delivery channels for executing a change in the security behavior of the target user.

36 Claims, 51 Drawing Sheets

(56) References Cited

U.S. PATENT DOCUMENTS 9,246,936 B1 1/2016 Belani et al.
9,253,207 B2 2/2016 Higbee et al.
9,262,629 B2 2/2016 Belani et al.
9,325,730 B2 4/2016 Higbee et al.
9,356,948 B2 5/2016 Higbee et al.
9,398,038 B2 7/2016 Higbee et al.
9,591,017 B1 3/2017 Higbee et al.
9,667,645 B1 5/2017 Belani et al.
9,870,715 B2 1/2018 Sadeh-Koniecpol et al. ..... G06F 21/564
9,912,687 B1 3/2018 Wescoe et al.
10,581,868 B2 * 3/2020 Kras ..... H04L 63/1433
10,657,248 B2 * 5/2020 Lowry ..... G06F 11/3409
10,904,186 B1 1/2021 Everton et al.
10,986,122 B2 4/2021 Bloxham et al.
11,044,267 B2 6/2021 Jakobsson et al.
11,184,393 B1 11/2021 Gendre et al.
11,297,094 B2 4/2022 Huda
2005/0132225 A1 6/2005 Gearhart
2012/0011077 A1 1/2012 Bhagat
2015/0172311 A1 6/2015 Freedman et al.
2016/0006749 A1 * 1/2016 Cohen ..... G06Q 40/12 726/23
2016/0119380 A1 * 4/2016 Gutesman ..... H04L 63/1416 726/1
2016/0164898 A1 6/2016 Belani et al.
2016/0219075 A1 * 7/2016 Bailloeul ..... G06Q 10/06
2016/0301705 A1 10/2016 Higbee et al.
2016/0344758 A1 * 11/2016 Cohen ..... H04L 63/145
2017/0041296 A1 * 2/2017 Ford ..... G06F 21/64
2017/0244746 A1 * 8/2017 Hawthorn ..... G06F 21/55
2017/0251013 A1 * 8/2017 Kirti ..... H04L 63/1441
2018/0027006 A1 * 1/2018 Zimmermann ..... G06F 9/46 726/11
2018/0324219 A1 * 11/2018 Xie ..... H04L 63/0209
2018/0375886 A1 * 12/2018 Kirti ..... H04W 12/086
2019/0087206 A1 * 3/2019 Barnes ..... G06F 21/554
2019/0173819 A1 6/2019 Wescoe et al.
2019/0245885 A1 8/2019 Starink et al.
2020/0311260 A1 10/2020 Klonowski et al.
2021/0185075 A1 6/2021 Adams
2021/0194924 A1 6/2021 Heinemeyer et al.
2022/0014543 A1 * 1/2022 Jakobsson ..... H04L 63/123
2022/0078207 A1 3/2022 Chang et al.
2022/0094702 A1 3/2022 Saad Ahmed et al.
2022/0100332 A1 3/2022 Haworth et al.
2022/0116419 A1 4/2022 Kelm et al.
2022/0130274 A1 4/2022 Krishna Raju et al.
2022/0286419 A1 9/2022 Stetzer et al.
2023/0096596 A1 * 3/2023 Cohen ..... G06Q 40/12 726/23

* cited by examiner

| Behavior Influencing Categories | Context Attributes | Intermediate Score | Score/Weightage (Based on the importance of the context attribute) (0.5-2) | Cumulative Score |
|---|---|---|---|---|
| Knowledge Score (Topic awareness) | End Point – Malware basics | 7 | *1 | 7 (7/1) |
| | Web | 4 | *0.5 | 8 (4/0.5) |
| | Email | 5 | 2 | 2.5 (5/2) |
| | More context attributes… X | | | |
| | Knowledge Score | | | 17.5 (Sum of X parameters score) |
| User Activity Score | End Point | 3 | *1 | 3 (3*1) |
| | Web | 4 | *0.5 | 2 (4 * 0.5) |
| | Email | 5 | 2 | 10 (5 * 2) |
| | More Activity tracking… Y | | | |
| | User Activity Score | | | 15 (Sum of Y parameters score) |

FIG. 11A

| | | | | |
|---|---|---|---|---|
| User Policy Control Score | Admin privilege enabled | 35 | 1 | 35 (35*1) |
| | USB Enabled | 4 | 1 | 4 (4*1) |
| | Multifactor mandated | 6 | 1 | 6 |
| | … Z control restrictions | | | |
| | | User Policy Control Score | | 45 |
| User Notification Score | User security dashboard (show the user about the activity and score) | 8 | 1 | 8 (8*1) |
| | Real-time alert for security misbehavior | 2 | 1 | 2 (2*1) |
| | HR notification about serious violations | 7 | 1 | 7 |
| | … Q number of parameters | | | |
| | | | User Notification Score | 17 |
| User Behavior Score = Function (Knowledge score) + function (User activity score) + function (User policy control score) + function (User notification score) | | | | 94.5 |

FIG. 11B

| Topic ID | User ID | Topic | Topic Parameters for Users | | | | | | | | |
|---|---|---|---|---|---|---|---|---|---|---|---|
| | | | Awareness Score | Historical Topical Action Score | Notification Effectiveness Score | Notification User Response | Notification Effectiveness Channel | Days since last notification | Notification Type | Role Sensitivity | Security Control Sensitivity |
| 100 | 201 | End point browser out of date version | 25% | 25% | 75% | Positive | Slack | 120 | Real time contextual | Medium | Medium |

FIG. 13A

| Topic ID | User ID | Topic | Topic Parameters at an Organization Level | | | | | | | |
|---|---|---|---|---|---|---|---|---|---|---|
| | | | Awareness score | Historical Topical Action Score | Notification Effectiveness Score | Org Security Control Sensitivity | HR Actions Type | Days since last HR action | Dept Awareness Score | Department Level Response Score |
| 100 | 201 | End point browser out of date version | 25% | 25% | 75% | Medium | 1 | 240 | 50% | 75% |

FIG. 13B

| Topic ID | User ID | Predicted action potential (Behavior score) (0-1)<br>0 - No expected actions<br>1 - Very high likely action |
|---|---|---|
| 100 | 201 | 0.44 |

FIG. 13C

| Topic ID | Assessment Score | Last Taken | User Topic Awareness Score |
|---|---|---|---|
| 100 | NA | Never | 0% |
| 100 | Failed | 6 months back | 25% |
| 100 | Pass | 6 months back | 50% |
| 100 | Pass | 3 months back | 75% |
| 100 | Pass | Last 1 month | 100% |

FIG. 13D

| Topic ID | Action Status | Historical Topical Action Score |
|---|---|---|
| 100 | No action | 0% |
| 100 | Viewed and attempted to resolve | 25% |
| 100 | Solved some part of the problem | 50% |
| 100 | Solve most of it; bat not completely | 75% |
| 100 | Completely resolve the problem | 100% |

FIG. 13E

| Topic ID | User ID | Notification Urgency 1-Most urgent 5-Least urgent | Channel Vendor | Available Delivery Channels to Users | User Preference (1 – most preferred 5- least preferred) | Admin Policy Preference |
|---|---|---|---|---|---|---|
| 100 | 201 | 3 | Symantec | Integrated DLP messaging | 2 | 3 |
| 100 | 201 | 3 | O365 | Email | 2 | 3 |
| 100 | 201 | 3 | General | SMS | 5 | 5 |
| 100 | 201 | 3 | Slack | Collaboration chat message | 2 | 2 |

FIG. 13F

| Topic ID | Notification Type | Available Status |
|---|---|---|
| 100 | General message addressed to every user | Available |
| 100 | Targeted topic with urgency addressed to every user | Available |
| 100 | User targeted message | Available |
| 100 | User targeted message with urgency | Available |
| 100 | User targeted message with response mandated | Available |

FIG. 13G

| Notification Response Type | Response Types |
|---|---|
| 0 | Neutral |
| -1 | Negative |
| +1 | Positive |

FIG. 13H

| Topic ID | User ID | Role | Sensitivity |
|---|---|---|---|
| 100 | 201 | Developer | Medium |
| 100 | 201 | Finance Employee | High |
| 100 | 201 | Front Desk | Low |

FIG. 13I

| Topic ID | Vendor | Security Control | Security Control Policy Settings | User ID | Sensitivity |
|---|---|---|---|---|---|
| 100 | Symantec | Web Protection | Website Rating Throttling | 201 | Medium |
| 101 | Symantec | Endpoint Protection | File Protection Throttling | 201 | High |
| 102 | Symantec | Endpoint Firewall Protection | Suspicious External Connection Throttling | 201 | low |

FIG. 13J

| Action Type ID | HR Action Type |
|---|---|
| 0 | No Actions |
| 1 | HR Warning |
| 2 | Multiple Warnings |
| 3 | Serious note; Employment Termination Type |

FIG. 13K

| Event source | Event | Targeted, Contextual Control Element (Notification) | Reward Cue | Punishment Cue | Awareness Facts | Social/Cultural |
|---|---|---|---|---|---|---|
| End point protection (Security product) | User browser is out of date and multiple malware were detected recently | Real time notification to the user via Slack messaging or collaboration app "Warning: Multiple malware detected in your computer recently from our recently downloaded files. Your browser is out of date too. Please update your browser; Here is more information on how to protect your device from a malware attack. 90% of our systems in your department are using Latest Chrome version. Thank you for helping us to be safe" | Rewarding them for every good security action they perform | | Facts about the out of date state of the user status. Access to more awareness information | Social comparison - the user is getting malware and setting expectations – more of your peers are using the latest version. |

FIG. 16A

| Event source | Event | Targeted, Contextual Control Element (Notification) | Reward Cue | Punishment Cue | Awareness Facts | Social/Cultural |
|---|---|---|---|---|---|---|
| Data protection (Security product) | User attempting to share sensitive data externally | Real time notification "Warning: Are you sure you wanted share the sensitive data? This data is classified as sensitive information. Here are more details about what is sensitive …If you wanted to share this, add note here" | | Ask for justification, potential action if there is any wrongdoing | Details about the risk | Additional action will be reviewed by HR |
| Email Protection | User clicked on a phishing email. Email protection solution caught it as detected | Offline notification: "Information: The recent email you just clicked on was a phishing attempt. Good news is technology was able to stop it but be careful in the future. Here is how you can identify a phishing attempt. Details from the email message the user received and highlight how to read phishing symptoms" | | | | |

FIG. 16B

| Event Source | Event | Targeted, Contextual Control Element (Notification) | Reward Cue | Punishment Cue | Awareness Facts | Social/Cultural |
|---|---|---|---|---|---|---|
| Calendar | User traveling to China | Calendar alert message: Safety warning: According to corporate policy, please follow these device security steps before traveling | Safety | Potential violation for HR policy | Corporate policy awareness | |
| Calendar | User uses an unapproved meeting application for office meeting | Slack Message warning "You are using an unapproved Meeting App. This app has security issues. More info Here is an alternate App to use – Link; 98% of your peers are using this safe App" | Easy access to alternate | This event is being monitored; future warnings if continue to use | Security Risks about the app and more details to access | Explaining about the social norms- What others are using |

FIG. 16C

| Event Source | Event | Targeted, Contextual Control Element (Notification) | Reward Cue | Punishment Cue | Awareness Facts | Social/Cultural |
|---|---|---|---|---|---|---|
| Cloud Apps – E.g.: Slack | User installed an app from the Slack market place in the user's workspace. | Real time Slack Message "Warning: The app you just installed doesn't seem to have good reputation in the App store. We recommend you review more details about this app. Here is some policy guideline about the App safety. Also here is a training module explaining about how you can evaluate app safety. If you continue to use the app, please respond with your business reasoning for future reference purpose. | Continue to enable the user to perform the task without blocking | You are responsible, show reasoning | Details training details readily available, relevant to their actions. | |

FIG. 16D

| SBMS configured Control ID | Control Specification | Compliance-Cloud Security Alliance (CSA) Cloud Controls Matrix Version 3.0 Mapping | NIST SP800-53 R3 Control Mapping | PCI DSS v3.0 Control Mapping |
|---|---|---|---|---|
| SA-EKM-103-10 | Non-encrypted sensitive data transmission | EKM-03 | AC-18<br>IA-3<br>IA-7<br>SC-7<br>SC-8<br>SC-9<br>SC-13<br>SC-16<br>SC-23<br>SI-8 | 2.1.1<br>2.3<br>3.3<br>3.4<br>3.4.1<br>4.1<br>4.1.1<br>4.2<br>4.3<br>6.5.3<br>6.5.4<br>8.2.1 |
| SA-EKM-103-11 | Non-encrypted sensitive data stored in a user device | EKM-03 | AC-18<br>IA-3<br>IA-7<br>SC-7<br>SC-8<br>SC-9<br>SC-13<br>SC-16<br>SC-23<br>SI-8 | 2.1.1<br>2.3<br>3.3<br>3.4<br>3.4.1<br>4.1<br>4.1.1<br>4.2<br>4.3<br>6.5.3<br>6.5.4<br>8.2.1 |

FIG. 17

1901

Message Configuration Screen

Title: Training email with custom factoids

X

Subject: Multiple malware detected in your device

Dear {{username}},

We are deeply committed to ensuring cybersecurity while enabling you to stay productive and innovative. We have now started a personalized and automated security awareness campaign.

{%if has_fact%}

You are required to complete this training because:

{% for fact in facts %}

1. {{fact|safe}}

{% endfor %}

{%endif%}

In order to stay safe and protect yourself and your company, we encourage you to take this quick 5-minute module on {{training_name}}.

Start Training

You may also click the link below to start your training:

{{training_url}}

Kind Regards,

-SecurityAdvisor Information Security

FIG. 19A

1902

Contextual Notification Message

Hello user,

Hope you are well. As you know, here at XYZ company, we are deeply committed to ensuring cybersecurity while enabling you to stay productive and innovative. We are writing to you as we need your help in keeping our company and data secure.

Action Required! Update your OS version!

Our systems indicate that your OS is out of date. Apple & Microsoft promptly fix vulnerabilities found in the field, typically multiple times every month. These published vulnerabilities are key gates for hackers to get into our system. The good news is that more than 70% of systems in your department have the latest version. Please update your OS version. See the instructions for updating the OS below.

Instructions for updating MAC OS

- Go to System Preferences and select Software update
- Select the checkbox "Automatically keep my MAC up to date"
- Apple instructions: https://support.apple.com/en-us/HT201541

Instructions for updating Windows OS

- Select the Start button, and then go to Settings > Update & Security > Windows Update, and select Check for updates
- Microsoft instructions: https://support.microsoft.com/en-in/help/4027667/windows-10-update.

If for some reason you cannot update the OS to the latest version, let us know how we can help.

Let us know

FIG. 19B

1903

APP 5:51 PM

Hello, your administrator would like you to turn on Multifactor authentication, to secure your login. View our training on how to turn it on.

Learn about 2-factor | Turn on 2-factor

FIG. 19C

1904

Only visible to you

APP 5:51 PM

! Hey @Santhosh, we noticed you shared sensitive information per your organization's rules in this message. If you think this was in error, delete this message.
Choose an option below.

Tag this message as appropriate | Delete this message

Slack Information Protection
Learn about what to share safely on slack. Never share information like passwords and personally identifiable information (PII) like SSN, driver license numbers, etc., on public channels or on channels with a large audience. You should use private channels, direct messages or other delivery channels approved by your company.

Learn about sharing sensitive information

FIG. 19D

2102

SecurityAdvisor Setup▼ Compliance▼ Automation▼ Catalog Management▼ Reporting▼ My Account▼ Logout Data Connectors Configure your applications to integrate with SecurityAdvisorBot. By connecting the application SecurityAdvisorBot can analyze data to create context per user for awareness training.

Select new application to configure:

Select application

Click here to view configured applications

Data Connectors List

Status of your configured data connectors

Click here to configure a new connector

| Application | Status | Last Connected | Events Processed | Edit |
|---|---|---|---|---|
| McAfee ePO | ✓ | Mon May 14 2018 14:09:23 GMT-0700 (PDT) | 1,575,651 | Edit\| Delete |
| BlueCoat | ✓ | Mon May 14 2018 14:09:23 GMT-0700 (PDT) | 836,030 | Edit\| Delete |
| Office365 | ✓ | Fri Mar 30 2018 14:09:23 GMT-0700 (PDT) | 1,287,243 | Edit\| Delete |
| SalesForce | ⊗ | Sun Apr 01 2018 14:09:23 GMT-0700 (PDT) | 2,486,377 | Edit\| Delete |
| | | | 8,363,207 | |

FIG. 21B

2104

Automate your context-based security awareness

Users will receive awareness messages when certain conditions below are met.

| Selection | Application | Trigger | Messaging | Throttling/Limit | Customer Feedback |
|---|---|---|---|---|---|
| | McAfee ePO | Above avg Malware per week | ☒ Micro-messaging<br>☐ Full Training<br>Customize Messaging | Once per day | ☒ Yes |
| | BlueCoat | Inappropriate Site Visits | ☒ Micro-messaging<br>☐ Full Training<br>Customize Messaging | Per Event* | ☒ Yes |
| | SalesForce | Active Lead Tracking | ☒ Micro-messaging<br>☒ Full Training<br>Customize Messaging | Once per week | ☐ Yes |
| | McAfee EDR | Malware Detected | ☒ Micro-messaging<br>☐ Full Training<br>Customize Messaging | Once per week | ☐ Yes |

FIG. 21D

2106

SecurityAdvisor Setup▼ Compliance▼ Automation▼ Catalog Management▼ Reporting▼ My Account▼ Logout Application Compliance List

| Application | Source | Compliance | Privacy |
|---|---|---|---|
| Slack | Weblogs, Slack | ✓ | ✓ |
| BigTinCan | Weblogs | ! | ✓ |
| CamCard | Weblogs | ! | ⊗ |
| Notepad++ | Windows | ⊗ | ⊗ |
| FieldWire | Weblogs | ✓ | ⊗ |

FIG. 21F

2107

SecurityAdvisor Setup▼ Compliance▼ Automation▼ Catalog Management▼ Reporting▼ My Account▼ Logout Zapier

| App Metadata | |
|---|---|
| **Version** | 1.0.0 |
| **Website** | https://www.zapier.com |
| **Terms** | https://zapier.com/terms |
| **Privacy** | https://zapier.com/privacy |

App Summary

Zapier automatically moves info between Slack and the other apps you use during your day, so you can focus on your most important work. Zapier supports 1,000+ apps like Gmail, Basecamp, HubSpot, Evernote, Google Sheets, Typeform, and more. In just a few minutes (and no coding skills required!) you can set up Zaps (automations) that turn Slack into your team's central command. Bring calendar events, social media mentions, or new lead details straight into chat.

Compliance

| Standards | Status | Evaluation Date |
|---|---|---|
| **HIPAA** | ⊗ | 04/28/2018 |
| **FISMA** | ⊗ | 04/28/2018 |
| **ISO 27001** | ⊗ | 04/28/2018 |
| **ISO 27018** | ⊗ | 04/28/2018 |
| **FEDRAMP** | ⊗ | 04/28/2018 |
| **SOC** | ! | 04/28/2018 |

Privacy

| Standards | Status | Evaluation Date | Notes |
|---|---|---|---|
| **Collect PII?** | ✓ | 04/28/2018 | |
| **Does it have a privacy policy?** | ⊗ | 04/28/2018 | |
| **Can you delete Your PII?** | ⊗ | 04/28/2018 | |
| **Limit sharing data with 3rd party** | ⊗ | 04/28/2018 | |
| **Permissions for access of app** | ⊗ | 04/28/2018 | |
| **Multi-factor authentication** | ✓ | 04/28/2018 | |

FIG. 21G

CONTEXTUAL SECURITY BEHAVIOR MANAGEMENT AND CHANGE EXECUTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 10,917,439 filed Jul. 15, 2019 and issued Feb. 9, 2021 which* claims priority to and the benefit of the *U.S.* Provisional Patent Application with [Ser.] *application Ser.* No. 62/698,440, filed [in the United States Patent and Trademark Office] on Jul. 16, 2018, [with the title "A SYSTEM AND METHOD FOR A BEHAVIOR MANAGEMENT PLATFORM FOR CYBER SECURITY". The content of the Provisional patent application is] *each of which is* incorporated [in its entirety] by reference [herein] *in their entirety*.

BACKGROUND

Technical Field

The embodiments disclosed herein, in general, relate to cybersecurity management. More particularly, the embodiments disclosed herein relate to contextually managing and executing a change in security behavior of a target user.

Description of the Related Art

The role of a user in cybersecurity is a growing concern in a home environment and a corporate environment. Users, for example, employees in an organization or individual consumer users make multiple mistakes related to cybersecurity. A recent study found about 60% to about 70% of cybersecurity incidents in a corporate environment is attributable to user actions associated, for example, with phishing, targeted malicious software (malware), social engineering, lack of security compliance, etc. User actions such as clicking on links in an electronic mail (email) without checking whether the links are legitimate, clicking on a phishing email or spam containing a malicious uniform resource locator (URL), a spoofed domain, or an impersonated brand, accessing a risky website without checking the credibility of the website, using an unsafe universal serial bus (USB) device on a computing device, installing a risky application (app) or desktop software on an endpoint device, downloading a risky app from a website or an app store, operating an application configured to spoof an organization, installing malicious plug-ins on browsers, etc., result in security incidents, for example, by spreading malware, in the organization. Users may also fall prey to online scams, where scam content may request the users to click on links and enter confidential information. Users typically find it difficult to adhere to basic cybersecurity policy guidelines, for example, creating strong passwords and periodically changing the passwords. Moreover, users may send personally identifiable information (PII) without encryption to a destination device even though a cybersecurity policy may suggest not to do so. Furthermore, users may share sensitive data without a customer's permission and violate a security compliance requirement, for example, the General Data Protection Regulation (GDPR). A drastic consequence for an organization is when users such as employees send out emails with malware. Threats such as phishing emails with malicious attachments, Trojan downloaders, risky macros, risky apps found online, cryptocurrency miners found in risky websites, etc., typically target security systems, for example, through email, the web, social media, and USB devices. Assuming even minimal leakage of malware in security systems, the volume of spam and malware implies that users need to be notified and alerted about their actions.

In a corporate environment, cybersecurity awareness is typically performed by conducting training sessions using presentation programs such as PowerPoint® presentation programs of Microsoft Corporation. Cookie-cutter training programs are typically loaded in a learning management system (LMS) of an organization and transmitted to users in the form of links through which the users undergo generic training. Users may not actively engage with these types of training programs, as these training programs are, for example, about an hour's duration, and users prefer short and/or interactive content, for example, videos of about 5 minutes' duration. Other conventional approaches of providing security awareness comprise, for example, computer-based training, classroom training, blog posts, security banners, gamifications, etc. Compliance coaching is typically performed as a standard practice to achieve a certification for conducting business. Users typically spend long hours every year for undergoing mandatory organizational training of different types. Most of the training is typically developed for a general-purpose audience, is uninteresting, and not targeted to a specific user. Users may therefore spend time on learning material they may not need to learn, and not on learning material related to their specific job role or to cybersecurity specific to their job role. Most users who deal with digital information are typically cognitively overloaded with large volumes of information. While users perform their job duties, it is difficult for them to remember multiple cybersecurity policies and procedures unless they have mastered security best practice habits and constantly remind themselves to adhere to the cybersecurity policies and procedures.

While some user behavior analytics solutions provide analytics reports that are typically directed to administrators and not end users, these solutions are not focused on the purpose of creating security awareness. Some phishing defense solutions provide basic phishing simulations for educating employees of an organization on security roles and providing a defense against phishing and cyber attacks. However, the scope of these solutions is limited to few generic simulations that are not substantially focused on real-world scenarios that users undergo to allow the users to learn from their mistakes. Furthermore, these solutions are typically focused only on training and do not effect a change in the security behavior of the users in the organization to provide a defense against cyber attacks and ensure cybersecurity.

Hence, there is a long-felt need for a method and a system for contextually managing and executing a change in security behavior of a target user.

SUMMARY

This summary is provided to introduce a selection of concepts in a simplified form that are further disclosed in the detailed description. This summary is not intended to determine the scope of the claimed subject matter.

The method and the system disclosed herein address the above-recited need for contextually managing and executing a change in security behavior of an organization. The method disclosed herein employs a security behavior management system (SBMS) comprising at least one processor configured to execute computer program instructions for contextually managing and executing a change in security behavior of an organization. The SBMS establishes a connection to multiple external applications via an application programming interface (API) system. The external applications comprise, for example, communication applications such as electronic mail (email) applications, short message service (SMS) applications, etc., web sources, cloud sources, calendar applications, productivity applications, endpoint security applications, events and alerts of security applications, cloud collaboration applications, on-premise collaboration applications, data analytics applications, customer relationship management (CRM) applications, enterprise resource planning (ERP) applications, file hosting applications, enterprise social media applications, marketing applications, cloud-based software as a service (SaaS) applications, etc. The SBMS extracts multiple context attributes from the external applications via the API system and multiple data acquisition sources. The context attributes comprise, for example, activity telemetry, relevancy metrics, security severity levels, actionability metrics, skill metrics, a timing metric, user actions, peer actions, historic responses, and user roles and permissions in an organization associated with the target user.

The SBMS dynamically generates one or more security behavioral models for each of multiple users, for example, employees of an organization, based on behavior modeling criteria derived from the context attributes. The behavior modeling criteria comprise, for example, a perceived security threat criterion, a self-efficacy criterion, a social norm criterion, a perceived reward and punishment criterion, etc. The SBMS dynamically generates a security behavior score for each of the users by scoring a selection of one or more of the context attributes from one or more security behavioral models of each of the users. In an embodiment, the SBMS classifies the context attributes into multiple predefined categories that influence security behavior. The predefined categories comprise, for example, knowledge, user activity, user policy control, user notification, compliance control, etc. The SBMS computes an intermediate score for each of the context attributes in each of the predefined categories on performing an assessment of actions of each of the users in relation to the context attributes. The SBMS generates a cumulative score for each of the predefined categories using the intermediate score of each of the context attributes. The SBMS then generates the security behavior score using the generated cumulative score of each of the predefined categories.

The SBMS dynamically generates multiple targeted, contextual control elements specific to a target user identified from among the users using the security behavioral models, the security behavior score, and one or more context libraries. The targeted, contextual control elements comprise, for example, targeted, contextual notification messages comprising one or more of preventive warnings based on internal threat vectors, preventive warnings based on external threat vectors, real-time cues and close to real-time cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user. In an embodiment, the SBMS, in communication with one or more context libraries, dynamically generates contextual awareness content using one or more security behavioral models, automatically generated awareness strategies, and personalization preferences of the target user and an organization associated with the target user. The contextual awareness content comprises, for example, security use cases derived from the external applications and the data acquisition sources, security training modules, newsletters, multi-channel threat simulations configured to educate the target user prior to a real-time threat, etc. The SBMS dynamically renders one or more of the targeted, contextual control elements on a user device of the target user through one or more of multiple delivery channels for executing a change in the security behavior of the target user, and in turn, the organization. In an embodiment, through the targeted, contextual control elements, target users are requested to review the contextual awareness content based on their context, which saves time for the target users and is more effective since the contextual awareness content used for the educating the target users is targeted. Users are more likely to study the contextual awareness content when they receive the targeted, contextual control elements comprising the contextual awareness content, for example, in real time or within few seconds, or few minutes or few hours after they make a mistake.

In another embodiment, the SBMS tracks user actions performed in response to the targeted, contextual control elements and maps the user actions to compliance requirements stored in a compliance database for regulating security compliance and identifying gaps in security risks of the organization. In an embodiment, the SBMS dynamically generates policy management recommendations configured to change configurations of security controls, security operations, and security policies of the organization based on one or more security behavioral models of each of the users using the dynamically generated, targeted, contextual control elements and a change in security risks of the organization incurred due to user actions performed in response to the targeted, contextual control elements. In another embodiment, the SBMS generates reports comprising one or more of user actions performed in response to the targeted, contextual control elements, security risks associated with target users, security behavior patterns, security behavior trends, and a correlation between the security risks and security compliance in an organization associated with the target users.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements may be employed depending on the design choices of the system designer.

BRIEF DESCRIPTION OF THE DRAWINGS

The foregoing summary, as well as the following detailed description, is better understood when read in conjunction with the appended drawings. For illustrating the method and the system disclosed herein, exemplary constructions of the method and the system disclosed herein are shown in the drawings. However, the method and the system disclosed herein are not limited to the specific methods and components disclosed herein. The description of a method step or a component referenced by a numeral in a drawing is applicable to the description of that method step or component shown by that same numeral in any subsequent drawing herein.

FIGS. 11A-11B exemplarily illustrate a tabular representation showing generation of a security behavior score for a target user in an organization.

FIGS. 13A-13K exemplarily illustrate tabular representations of a security behavior scoring model implemented by the behavior modeling engine for executing a change in security behavior of a target user.

FIGS. 16A-16D exemplarily illustrate a tabular representation showing targeted, contextual control elements used for executing a change in security behavior of a target user.

FIG. 17 exemplarily illustrates a tabular representation of a portion of a compliance database.

FIG. 19A exemplarily illustrates a screenshot of a message configuration screen rendered by the system for allowing an administrator to configure a targeted, contextual notification message based on personalization preferences of an organization.

FIGS. 19B-19D exemplarily illustrate different targeted, contextual notification messages generated by the control element generation engine for executing a change in security behavior of an organization.

DETAILED DESCRIPTION

Various aspects of the present disclosure may be embodied as a method, a system, or a non-transitory, computer readable storage medium having one or more computer readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
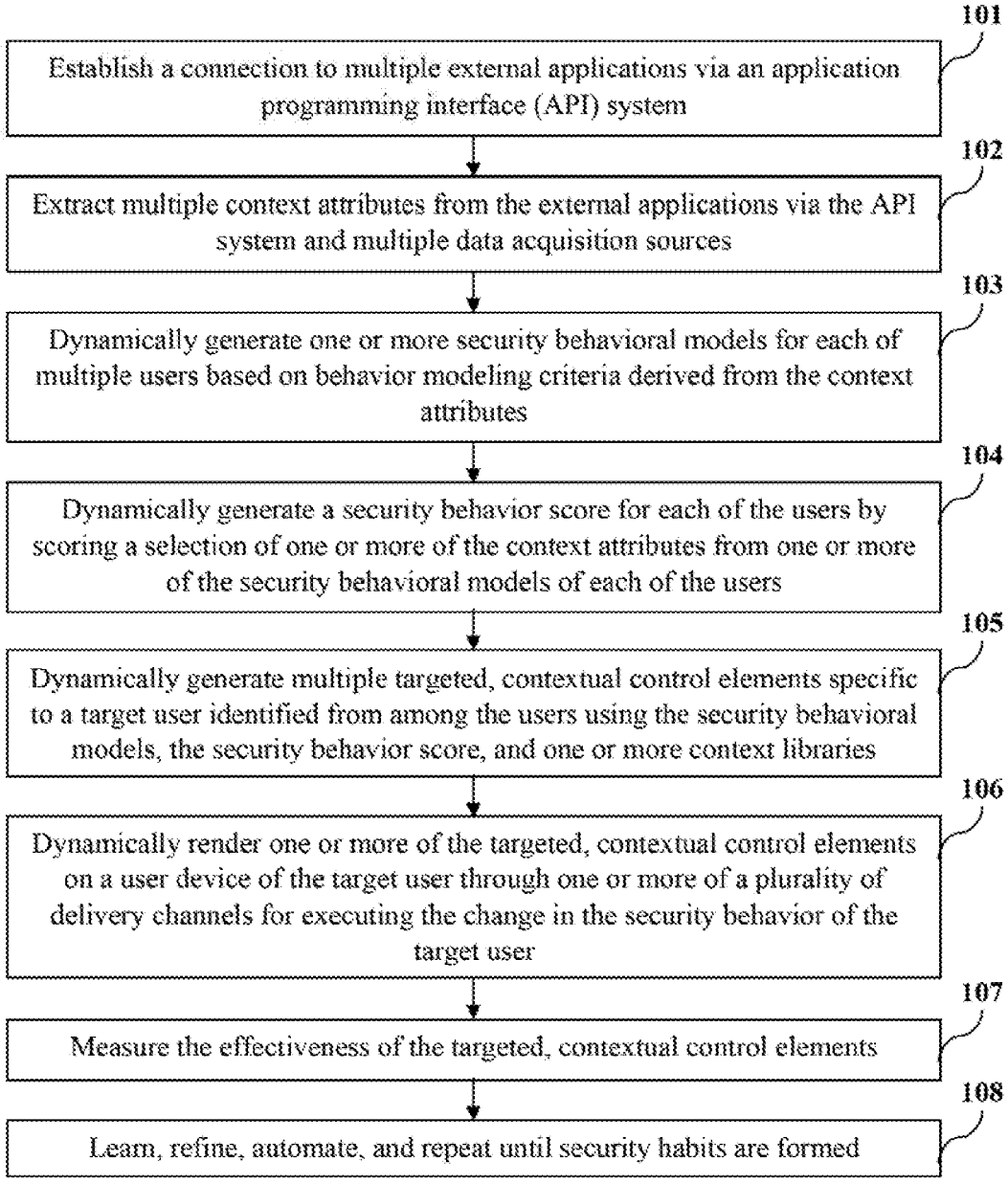
FIG. 1 illustrates a method for contextually managing and executing a change in security behavior of a target user.

FIG. 1 illustrates a method for contextually managing and executing a change in security behavior of a target user. As used herein, "security behavior" refers to actions or reactions of users towards security policies, standards, procedures, compliance measures, etc., that affect security, for example, cybersecurity, in a home environment or a corporate environment, for example, in an organization. Actions that affect security behavior comprise, for example, clicking on malicious links or files in electronic mails (emails), acts of negligence in following security procedures of an organization such as taking backups of data, inadvertently sharing passwords, transmitting sensitive documents to external destinations without protection, etc. Also, as used herein, "target user" refers to an individual who performs actions that result in security incidents in a home environment or a corporate environment. The target user is, for example, an employee, an executive, an administrator, a home user, etc., for whom contexts and specific security behavioral models are generated and to whom targeted, contextual control elements, for example, notification messages, contextual awareness content, recommendations, etc., are delivered to allow the user to change the security behavior in accordance with the user's specific context, for example, a job role in an organization. Also, as used herein, the term "context" refers to a set of conditions that is present at a time and a situation or an event when data is collected.

The method disclosed herein employs a security behavior management system (SBMS) comprising at least one processor configured to execute computer program instructions for contextually managing and executing a change in security behavior of an organization. In the method disclosed herein, the SBMS establishes 101 a connection to multiple external applications via an application programming interface (API) system as disclosed in the detailed description of FIG. 2. The external applications comprise, for example, communication applications such as electronic mail (email) applications, short message service (SMS) applications, etc., web sources, cloud sources, calendar applications, productivity applications, endpoint security applications, events and alerts of security applications, cloud collaboration applications, on-premise collaboration applications, data analytics applications, customer relationship management (CRM) applications, enterprise resource planning (ERP) applications, file hosting applications, enterprise social media applications, marketing applications, cloud-based software as a service (SaaS) applications, etc. The SBMS extracts 102 multiple context attributes from the external applications via the API system and multiple data acquisition sources comprising, for example, surveys, management inputs, gaming outputs, human resources (HR) systems, etc.

As used herein, "context attributes" refer to attributes, for example, behavioral activities performed by a user monitored during a session, actions performed by a user on a computing device in an organization, applications accessed by the user, links clicked by the user, user profile data, the user's job role, endpoint security events, email security events, web events, authentication events, application (app) events, alerts from security systems, user permissions, awareness levels, etc., that define a context for a user. The context attributes show activities performed by users and mistakes made by users. Users' understanding about potential security threats and their characteristics help them make the right choices that influence their approach to security. The SBMS maintains an inventory of each user and their awareness level in each category. Based on this inventory, the SBMS determines whether an awareness message needs to be delivered to a target user. The extracted context attributes are transformed and processed by one or more algorithms executed by the SBMS for dynamically generating one or more security behavioral models for each of multiple users and for dynamically generating one or more targeted, contextual control elements specific to a target user as disclosed below. In an embodiment, the SBMS identifies, classifies, and prioritizes the context attributes based on relevancy to a target user, as not all context attributes are useful for user engagements. For example, the SBMS prioritizes context attributes related to downloading confidential files to a universal serial bus (USB) drive or installing an unsafe plugin on a browser.

The SBMS dynamically generates 103 one or more security behavioral models for each of multiple users, for example, employees of an organization, based on behavior modeling criteria derived from the context attributes. As used herein, "security behavioral model" refers to a model that indicates how various context attributes form security behavior and how those context attributes can be influenced to execute a change in the security behavior and obtain a desired goal. The security behavioral model of a target user indicates the likelihood of the target user engaging in desired security behavior. The behavior modeling criteria comprise, for example, a perceived security threat criterion, a self-efficacy criterion, a social norm criterion, and a perceived reward and punishment criterion as disclosed in the detailed description of FIG. 9. The SBMS dynamically generates 104 a security behavior score for each of the users by scoring a selection of one or more of the context attributes from one or more security behavioral models of each of the users as disclosed in the detailed description of FIGS. 10-14. The security behavior score is the basis for further behavioral modeling and creation of a security behavior change model. The SBMS identifies a target user from among multiple users, for example, in an organization, based on the security behavior score of each of the users. In an embodiment, a low security behavior score indicates undesired behavior, causing the SBMS to target the user with the low security behavior score for execution of a change in the target user's security behavior. Furthermore, the SBMS categorizes target users based on type of security incidents. For example, the SBMS groups target users whose user devices have undergone malware and email phishing attacks in one category and other target users whose user devices have an out-of-date operating system and have undergone malware attacks in another category. The SBMS correlates data between the categories and targets the groups with contextual control elements.

The SBMS dynamically generates 105 multiple targeted, contextual control elements specific to the target user using one or more security behavioral models, the security behavior score, and one or more context libraries. As used herein, "targeted, contextual control elements" refer to elements generated by the SBMS based on the security behavioral models and the security behavior score of the target user and used to execute a change in the security behavior of a target user, thereby controlling the security behavior of the target user and security incidents triggered by actions of the target user. In an embodiment, the SBMS generates the targeted, contextual control elements to direct and execute security awareness, security controls, security cues, and security culture as disclosed in the detailed description of FIG. 9. In an embodiment, the targeted, contextual control elements comprise, for example, targeted, contextual notification messages comprising one or more of preventive warnings based on internal threat vectors, preventive warnings based on external threat vectors, real-time cues and close to real-time cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user.

In an embodiment, the targeted, contextual notification messages are micro-messages comprising, for example, short lines of text reciting preventive warnings, providing links to access contextual awareness content, recommendations, etc., that aim to reduce security incidents in an organization. In an embodiment, the SBMS, in communication with one or more context libraries, dynamically generates contextual awareness content using one or more security behavioral models, automatically generated awareness strategies, and personalization preferences of the target user and an organization associated with the target user. The contextual awareness content comprises, for example, security use cases derived from the external applications and the data acquisition sources, security training modules, newsletters, and multi-channel threat simulations configured to educate the target user prior to a real-time threat. The SBMS aligns the security training modules towards the security incidents and how the security incidents spread. For example, the SBMS renders a spam avoidance module to a spam recipient, an online safety module to an online cyber-attack victim, a USB safety module to a USB device infection victim, etc. The contextual awareness content promotes creation of personalized, contextual awareness based on security activities.

The SBMS dynamically renders 106 one or more of the targeted, contextual control elements on a user device of the target user through one or more of multiple delivery channels for executing the change in the security behavior of the target user. In a corporate environment, the above disclosed steps of the method disclosed herein are performed for each of the users of the organization to execute a change in the security behavior of the organization. The targeted, contextual control elements provide a path for users to improve their security compliance. Moreover, the targeted, contextual control elements aim to reduce security incidents in an organization, thereby improving security efficacy and reduction in operations staff required to deal with the security incidents. In an embodiment, the SBMS tracks user actions performed in response to the targeted, contextual control elements and maps the user actions to compliance requirements stored in a compliance database for regulating security compliance and identifying gaps in security risks of the organization. In another embodiment, the SBMS dynamically generates policy management recommendations configured to change configurations of security controls, security operations, and security policies of the organization based on one or more security behavioral models of each of the users using the dynamically generated, targeted, contextual control elements and a change in security risks of the organization incurred due to user actions performed in response to the targeted, contextual control elements.

In another embodiment, the SBMS generates reports comprising one or more of user actions performed in response to the targeted, contextual control elements, security risks associated with target users, security behavior patterns, security behavior trends, and a correlation between the security risks and security compliance in an organization associated with the target users. The steps such as "extracting". "generating", "rendering", and "tracking" of the method disclosed herein refer to actions and processes of a computer system or a similar electronic computing device, that manipulate and transform data represented as physical or electronic quantities within registers of the computer system and memory units into other data similarly represented as physical or electronic quantities within the memories or registers of the computer system or other such storage, transmission, communication or display devices. The method disclosed herein further measures 107 the effectiveness of the targeted, contextual control elements and through the targeted, contextual control elements, executes a continuous cyclical process of learning, refining, automating, and repeating 108 until security habits are formed in each of the users in the organization. The SBMS learns about multiple users in an organization and their various awareness levels, and when various events stream into the SBMS, the SBMS generates security insights that are relevant for user awareness and delivers targeted, contextual control elements, for example, contextual notification messages if a user engagement configuration permits such messaging. Over time, the SBMS learns to optimize context generation based on a feedback loop from the users and analytics performed by the SBMS.

Figure 2:
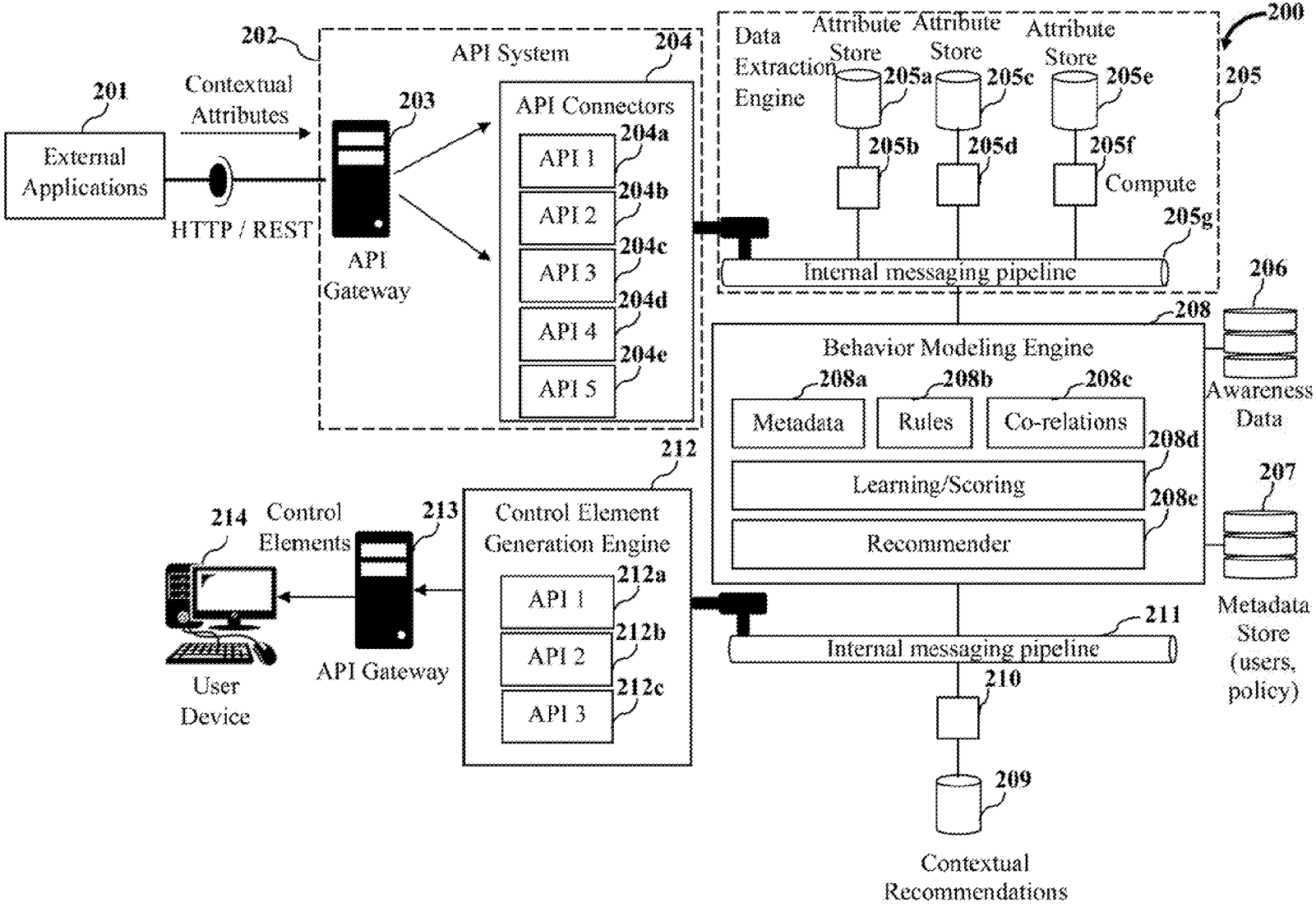
FIG. 2 exemplarily illustrates a system for contextually managing and executing a change in security behavior of a target user.

FIG. 2 exemplarily illustrates a system 200 for contextually managing and executing a change in security behavior of a target user. The system 200 disclosed herein provides a cybersecurity technology platform that manages, strategizes, monitors, measures, acts on, and automates security behavior of an target user, for example, in an organization such that the behavior of each user in the organization is changed to implement best security practices and create an optimal security habit among the users in the organization. The system 200 disclosed herein provides application programming interface (API) based learning of security behavior of users. Moreover, the system 200 disclosed herein combines teachable events related to security behavior, user personas and their abilities, security insights, a rating or a reputation of applications (apps), and a behavior modification framework into the cybersecurity technology platform to deliver the right set of targeted, contextual control elements, for example, contextual notification messages to the right set of users, for example, via a cloud platform. As used herein, "teachable events" refer to informative data, for example, microcontent, intended to contextually train and educate the target user. The system 200 disclosed herein is implemented, for example, at enterprises for directing users, for example, employees, into an active line of defense against cybersecurity concerns. The system 200 disclosed herein learns what messaging works in an organization and tunes the messaging based on its performance with the intent of changing and improving the organization's security culture.

The system 200 disclosed herein comprises an API system 202, a data extraction engine 205, a behavior modeling engine 208, and a control element generation engine 212. The API system 202 comprises an API gateway 203 and API connectors 204 with corresponding APIs 204a, 204b, 204c, 204d, and 204e configured to connect to multiple external applications 201. The data extraction engine 205 establishes a connection to multiple external applications 201 via the API system 202. The API system 202 accesses the external applications 201 using, for example, a representational state transfer (REST) web services architecture that uses a hypertext transfer protocol (HTTP). The API gateway 203 is, for example, the Microsoft® Azure API gateway or the Amazon API gateway. In a corporate environment, the data extraction engine 205 integrates with corporate applications of multiple cloud providers, for example, customer relationship management (CRM) and cloud solutions of Salesforce.com. Inc., threat prevention applications of Cylance, Inc., Office 365® of Microsoft Corporation, the cloud enterprise resource planning (ERP) system of Workday, Inc., cloud-based team collaboration software tools of Slack Technologies, Inc., etc., information technology (IT) applications of Symantec Corporation, McAfee LLC, International Business Machines (IBM) Corporation, Splunk, Inc., etc., endpoint security applications, data loss prevention software applications, website security software applications, and other in-org applications such as bank applications, human resources (HR) systems, etc., to generate insights about users, assets, and activities of the organization and targeted, contextual control elements for the users.

Users typically deal with different security context and interact with security protections tools to protect their devices from security threats. For example, when users browse the internet, web protection security applications prevent the users from accessing malicious websites or malicious content. The web protection security applications create different events to record user actions, for example, browsing a malicious website knowingly or unknowingly at a particular time. These events provide insights that can be used to generate targeted, contextual control elements that, in an embodiment, contextually train and educate the user about best practices for securely browsing websites. In another example, an endpoint protection application protects endpoint devices from malware. If a user downloads files that may contain malware from the internet, the endpoint protection application terminates the download and records the download attempt as an event. This event provides an insight that can be used to generate targeted, contextual control elements that, in an embodiment, contextually train and educate the user about malware and basics of malware. As not all contexts are relevant to every user, the system 200 disclosed herein generates one or more context libraries 215 shown in FIG. 3, comprising different security categories, for example, endpoint, web, email, apps, etc., to determine which context is relevant for a target user. The system 200 uses the context libraries 215 to generate contexts, and in turn, security behavioral models for each user in the organization. The system 200 dynamically updates the security categories based on an advancement of the latest threat vectors or attack vectors and their sources. Threat vectors refer to methods, paths, or tools, for example, email, web, social media, universal serial bus (USB) devices, etc., used to activate security threats to attack endpoint devices of users. The threat vectors originate, for example, from external applications, internal applications, and supply chain applications.

The data extraction engine 205 extracts multiple context attributes from the external applications 201 via the API system 202 and multiple data acquisition sources. The data extraction engine 205 performs data ingestion, for example, across emails, files, web sources, cloud sources, calendar applications, enterprise social media applications, marketing applications, productivity applications, endpoint security applications, etc., to extract the context attributes and learn patterns by executing one or more rule-based, supervised and unsupervised machine learning and data analytics algorithms. The context attributes comprise, for example, activity telemetry, relevancy metrics, security severity levels, actionability metrics, skill metrics, a timing metric, user actions, peer actions, historic responses, and user roles and permissions in an organization associated with a target user. The activity telemetry comprises, for example, security events such as endpoint security events, email security events, end user activity events, etc., web events, authentication events, application (app) events, compliance events, etc., initiated by a user or received by a user. The endpoint security events generate insights, for example, malware detected, malware not cleaned, antivirus not updated, browser plug-in not approved, databases not updated, etc. The web events generate insights, for example, users who click on bad links, users who frequently visit risky websites, users who download a large amount of content, user devices with heavy data traffic, users using risky applications, etc. The email security events generate insights, for example, users who send emails with known malware, ransomware, etc., users who send emails to external users, users who receive emails from external users, users who send emails with unusual file types, etc. The app events generate insights, for example, users who installed non-compliant apps, etc. The security behavior management system (SBMS) maintains a context library of relevant app events, for example, a user accessing an HR app and downloading employee records, a sales representative downloading sales leads information from a customer relationship management (CRM) application, etc., for the purpose of generating awareness content. The activity telemetry further comprises, for example, alerts from security systems. Other security events extracted by the data extraction engine 205 comprise, for example, events related to data protection, email security, social engineering, phishing, device safety, password safety, malware, ransomware, travel security, safe social network, safe web browsing, mobile device security, insider threats, etc. The compliance events indicate, for example, whether software is out of date, whether a security policy is not enabled, whether a security policy is not enforced, etc. The data extraction engine 205 extracts end user activity events, for example, via IT applications. The end user activity events comprise, for example, sharing data to other users internally and externally via a Slack® team collaboration software tool, Microsoft Office® team application events, etc.

The relevancy metrics comprise, for example, insights on whether information is relevant to the target user. The security severity levels comprising, for example, a critical severity level, a high severity level, a medium severity level, and a low severity level, indicate the severity of a threat. The actionability metrics determine whether information has any follow-up action, for example, update an application to a latest version, learn a piece of information, report an incident, etc. The skill metrics determine whether a user has the skills, security expertise, or abilities to understand and utilize a piece of information. The timing metric determines whether the timing of the information is relevant, for example, a user having browsed a bad website an hour ago. The user actions comprise, for example, browsing a website, clicking a link in an email, inserting a USB device into an endpoint device, etc. The historic responses comprise a user's past response to messages, for example, accepting the messages but ignoring actions required to be performed, completing the actions, not accepting the messages, etc. The user roles comprise, for example, an administration role, an executive role, external facing roles, etc., their criticality and impact. The context attributes further comprise, for example, indicators that measure a user's motivation to proactively address potential security challenges, and a security maturity score of the organization with relation, for example, to a security policy, security tools, technology, processes, management, etc. On receiving the context attributes from the external applications 201 via the API gateway 203, the API connectors 204 of the API system 202 transmit the context attributes to the data extraction engine 205 via an internal messaging pipeline 205g as exemplarily illustrated in FIG. 2. In an embodiment, the data extraction engine 205 comprises multiple compute clusters, for example, 205b, 205d, and 205f, that receive the context attributes from the internal messaging pipeline 205g and parse and categorize the context attributes into multiple predefined categories. The predefined categories comprise, for example, policy and procedure categories, security categories, and compliance categories. The compute clusters, for example, 205b, 205d, and 205f of the data extraction engine 205 store the categorized context attributes in storage devices, for example, attribute stores 205a, 205c, and 205e. The compute clusters, for example, 205b, 205d, and 205f of the data extraction engine 205 transmit the categorized context attributes to the behavior modeling engine 208 via the internal messaging pipeline 205g.

Figure 9:
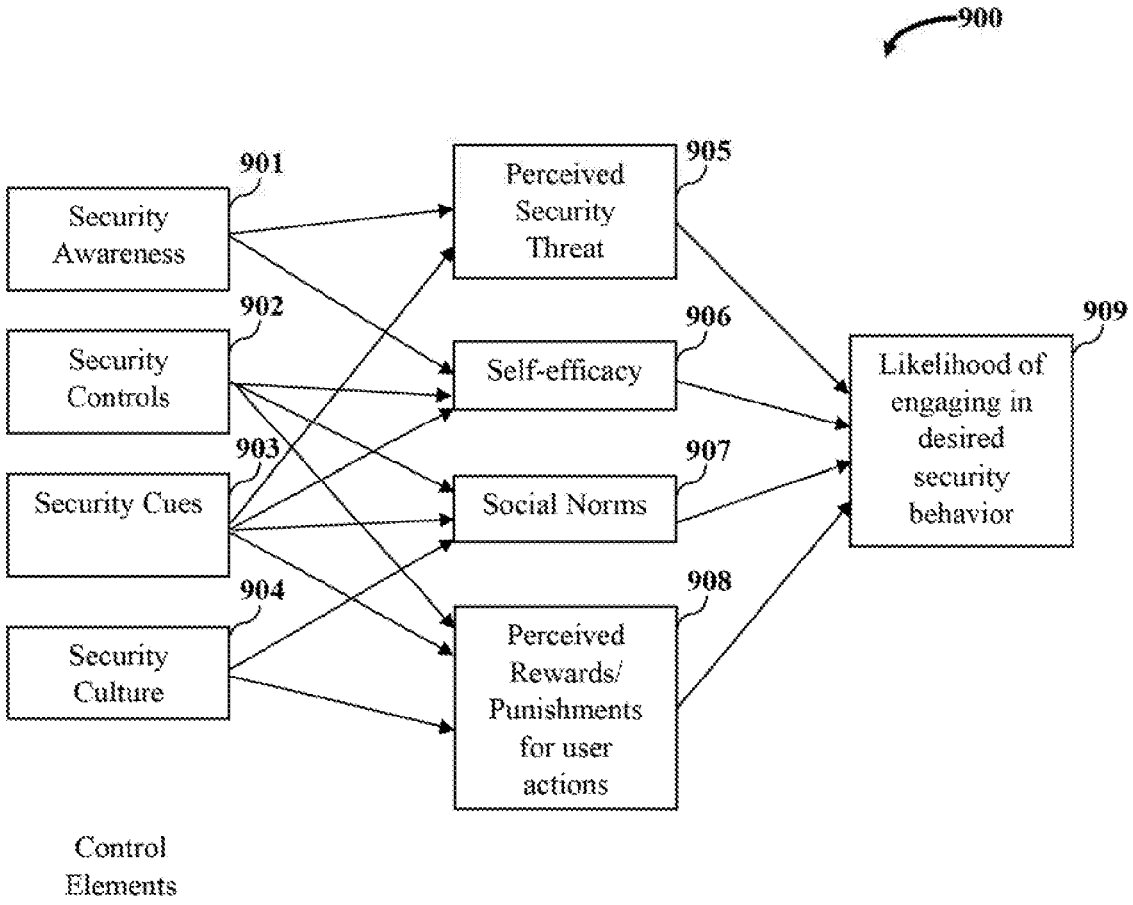
FIG. 9 exemplarily illustrates a security behavior change model created by the behavior modeling engine.

In an embodiment, the behavior modeling engine 208 operates as a context engine and dynamically generates one or more security behavioral models for each of multiple users based on behavior modeling criteria derived from the context attributes as disclosed in the detailed description of FIG. 9. In another embodiment, the behavior modeling engine 208 operates as a behavior scoring engine and dynamically generates a security behavior score for each of the users by scoring a selection of one or more of the context attributes from one or more security behavioral models of each of the users as disclosed in the detailed descriptions of FIGS. 10-14. The behavior modeling engine 208 operating as a combination of a context engine and a behavior scoring engine establishes a behavior modification framework that interacts with the control element generation engine 212 for generating targeted, contextual control elements that execute a change in security behavior of a target user, and in turn, the organization. In an embodiment, through the behavior modification framework, the behavior modeling engine 208 creates a behavior change model that defines security behavior based on awareness, organizational security structure, and triggers as disclosed in the detailed description of FIG. 9. In this embodiment, awareness refers to a user's knowledge about security incidents, skills to understand security, and security practices with which the user is familiar. Awareness about various security topics and threat vectors, for example, data protection, email security, social engineering, phishing, device safety, password safety, ransomware, travel security, safe social networking, safe web browsing, mobile devices security, compliance, insider threats, etc., provide the skills necessary for a user to take appropriate actions and follow the desired security behavior. In another embodiment, through the behavior modification framework, the behavior modeling engine 208 communicates with the control element generation engine 212 to render awareness content to target users, for example, using content-based training, gamification of security concepts, posters, banners, newsletters, etc.

Organizational security structure defines user actions that are allowed by an organization, social acceptance of user actions, and consequences of user actions. Organizations typically provide antivirus solutions, web protection software, email protection software, etc., and define various security policies and processes that constitute the organizational security structure. Organizational security structure comprises, for example, cybersecurity policies that dictate rules of security behavior or dos and don'ts related to security behavior, operational processes that set user activity expectations, security controls and their configurations that create boundaries for user actions, a rewards system that creates motivation to act in various situations, etc. The behavior modification framework leverages the organizational security structure to execute a change in security behavior of an organization. To motivate users to behave in a desired way with respect to security, security policies of the organizational security structure act as guard rails. In an example, an organization may limit the users' access to social media during work hours based on the IT policy. If the users' access is controlled systematically, user behavior is controlled; however, if the users' access is enforced non-systematically as described in a security policy, the behavior modification framework performs a follow up action with the user to direct the users towards the desired behavior. In another example, an organization may restrict USB device usage and systematically control the USB device usage using security tools; however, activities related to USB device usage are typically only monitored and systematically controlled. In this example, communication with the user re-enforces the security policy's desired behavior. The triggers comprise the targeted, contextual control elements that execute a change in the security behavior of the target user by a continuous feedback process until good security habits are formed in the target user. To establish long lasting organizational security behavior, activity tracking should be a continuous process and a continuous, personalized reminder is required against a set of desired behavior expectations.

The behavior modeling engine 208 receives the categorized context attributes from the data extraction engine 205 via the internal messaging pipeline 205g. In an embodiment, the behavior modeling engine 208 performs machine learning 208d by executing one or more of rule-based, supervised, and unsupervised machine learning algorithms on the categorized context attributes using metadata 208a, rules 208b, and co-relations 208c to dynamically generate one or more security behavioral models for each of the users. In an embodiment, the behavior modeling engine 208 retrieves the metadata 208a comprising, for example, user profiles, security policies of an organization associated with the users, etc., from a metadata storage device 207 for performing the computations required for dynamically generating one or more security behavioral models for each of the users. In an embodiment, the behavior modeling engine 208 performs machine learning 208d by executing one or more of rule-based, supervised, and unsupervised machine learning algorithms on the categorized context attributes using metadata 208a, rules 208b, and co-relations 208c to dynamically generate a security behavior score for each of the users.

In an embodiment, the behavior modeling engine 208 comprises a recommender 208e for rendering recommendation inputs to the control element generation engine 212 for generating recommendations to execute changes to configurations of security controls, security operations, and security policies of an organization based on the dynamically generated security behavioral models of each of the users. In another embodiment, the recommender 208e of the behavior modeling engine 208 renders recommendation inputs to a policy management module 219 of the system 200 disclosed herein shown in FIG. 3, for dynamically generating policy management recommendations configured to change configurations of security controls, security operations, and security policies of an organization based on one or more security behavioral models of each of the users using the dynamically generated targeted, contextual control elements and a change in security risks of the organization incurred due to user actions performed in response to the targeted, contextual control elements. The security behavior of users substantially influences the configuration of security controls. The policy management module 219 generates the policy management recommendations based on the security behavioral models of each of the users to tune the security controls for optimum results in executing a change in the security behavior of the users. For example, the policy management module 219, in communication with the recommender 208e, generates and renders policy management recommendations to a security operations center of an organization based on a change in the security risks caused by target users. When target users respond to the targeted, contextual control elements, for example, the targeted, contextual notification messages, recommendations, etc., the users may take actions to avoid future security risks, thereby reducing the security risks caused by them. In another example, if there is an increase in the security risks, the policy management module 219, in communication with the recommender 208e, generates additional recommendations to train target users and/or implement changes to configurations of security controls, security operations, and security policies of the organization. The behavior modeling engine 208, in operable communication with the control element generation engine 212 and the policy management module 219, establishes a feedback loop for configuring security polices and security controls in the organization. The behavior modeling engine 208 transmits the recommendation inputs generated by the recommender 208e and the recommendations received from the control element generation engine 212 and/or the policy management module 219 to a database 209 that stores contextual recommendations via an internal messaging pipeline 211 as exemplarily illustrated in FIG. 2. In an embodiment, a compute cluster 210 processes the recommendation inputs and the recommendations prior to storing the recommendation inputs and the recommendations in the database 209.

The databases in the system 200, for example, 205a, 205c, 205e, 206, 207, 209, etc., can be any storage area or medium that can be used for storing data and files. The databases can be, for example, any of structured query language (SQL) data stores or not only SQL (NoSQL) data stores. In an embodiment, the databases can also be locations on a file system. In another embodiment, the databases can be remotely accessed by the data extraction engine 205, the behavior modeling engine 208, and the control element generation engine 212, via a network, for example, the internet. In another embodiment, the databases are configured as cloud-based databases implemented in a cloud computing environment, where computing resources are delivered as a service over the network. As used herein, "cloud computing environment" refers to a processing environment comprising configurable computing physical and logical resources, for example, networks, servers, storage media, virtual machines, applications, services, etc., and data distributed over the network. The cloud computing environment provides on-demand network access to a shared pool of the configurable computing physical and logical resources. In an embodiment, one or more of the context libraries 215 comprise a collection of security best practices that can be used by the control element generation engine 212 to automate the generation of the targeted, contextual control elements, for example, the targeted, contextual notification messages and deliver contextual awareness content to a target user. In another embodiment, one or more of the context libraries 215 is a security insights library comprising a collection of threat events and their sources. In another embodiment, one or more of the context libraries 215 comprise predefined cyber security situations and scenarios to which different users behave differently. Administrators may select and configure these predefined cyber security situations and scenarios on a graphical user interface (GUI) of their user devices for their organizations to watch.

The behavior modeling engine 208 performs a look up of threat data comprising, for example, malware names, from multiple security vendors via the API system 202 and stores the threat data along with a combination of machine generated probabilities and security analyst research data in the context libraries 215. The behavior modeling engine 208 determines a potential source of a security event with a probability score. The behavior modeling engine 208 then adds the context of when, where, and how the security event occurred for a target user, which aids in predicting insights of the security event. For example, the behavior modeling engine 208 detects "Virus Win32/Virtu.gen!AO" on a computing device and determines that this virus has a higher probability of being propagated via a USB device. If the user has performed an endpoint and USB action around the time of the virus, the behavior modeling engine 208 determines that an infection spread via the USB device. In some cases, security events contain the threat data to perform a confirmation of the security incident.

The behavior modeling engine 208 transmits the dynamically generated security behavioral models and the recommendation inputs to the control element generation engine 212 via the internal messaging pipeline 211. The control element generation engine 212 dynamically generates targeted, contextual control elements specific to a target user identified from among multiple users using the dynamically generated security behavioral models, the security behavior score, and one or more context libraries 215. In an embodiment, the control element generation engine 212 operates as a messaging engine and dynamically generates targeted, contextual notification messages comprising, for example, one or more of preventive warnings based on internal threat vectors, preventive warnings based on external threat vectors, real-time cues and close to real-time cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user. In an example, if a target user receives a request for a wire transfer of monetary funds, the control element generation engine 212 generates a targeted, contextual notification message "Looks like you have a wire transfer request. Click on the following link to learn about the corporate policy of the organization" in accordance with the personalization preferences of the organization. In another example, the control element generation engine 212 generates a targeted, contextual notification message "The email you just opened was a phishing attack. This is how you can find that out in the future".

In an embodiment, the control element generation engine 212, in communication with one or more of the context libraries 215, dynamically generates contextual awareness content using one or more security behavioral models, automatically generated awareness strategies, and personalization preferences of the target user and an organization associated with the target user. The personalization preferences of the target user comprise, for example, a communication mode such as email, short message service (SMS) message, a collaboration app, etc., through which the target user wants to receive the contextual awareness content. The personalization preferences of the organization comprise, for example, a format or a template in which the contextual awareness content is configured to be sent in accordance with the organization's requirements to the target user. In an embodiment, the behavior modeling engine 208 accesses a database 206 that stores awareness data and selectively retrieves one or more awareness data modules from the database 206. In an embodiment, the behavior modeling engine 208 transmits the awareness data and the awareness data modules to the control element generation engine 212 via the internal messaging pipeline 211 for the dynamic generation of contextual awareness content specific to the target user. In another embodiment, the behavior modeling engine 208 allows the control element generation engine 212 to directly access the database 206 via the internal messaging pipeline 211 for dynamically generating contextual awareness content specific to the target user.

The contextual awareness content comprises, for example, security use cases derived from the external applications 201 and the data acquisition sources, security training modules, newsletters, etc. In an example, if a user is traveling to China, the control element generation engine 212 receives one or more awareness data modules on how to keep data safe in China from the behavior modeling engine 208 for the dynamic generation of the contextual awareness content specific to the target user. In another example, if a user is traveling to Europe, the control element generation engine 212 receives one or more General Data Protection Regulation (GDPR) compliance modules from the behavior modeling engine 208 for the dynamic generation of the contextual awareness content specific to the target user. In another example, if a bank employee is installing an unauthorized software as a service (SaaS) app on an endpoint device, the control element generation engine 212, in communication with the behavior modeling engine 208 and/or the context libraries 215, generates contextual awareness content comprising best practices in using cloud compliance and a service organization control 2 (SOC 2) micro-message with a list of approved applications and renders the contextual awareness content and the micro-message to the target user. In another example, if malware is detected but not cleaned from an endpoint device, the control element generation engine 212, in communication with the behavior modeling engine 208 and/or the context libraries 215, generates and renders contextual awareness content comprising remediation do-it-yourself (DIY) advice on what to do to safeguard the endpoint device to the target user. In another example, if an HR administrator shares protected health information (PHI) to an external user device, the control element generation engine 212, in communication with the behavior modeling engine 208 and/or the context libraries 215, generates and renders a Health Insurance Portability and Accountability Act (HIPAA) micro-message to the target user.

In an embodiment, the contextual awareness content further comprises multi-channel threat simulations generated by the behavior modeling engine 208 and/or the control element generation engine 212. As used herein, "multi-channel threat simulations" refer to simulations of real-world security threats generated based on a selection of one or more of the context attributes specific to a target user and that can be delivered to user devices, for example, endpoint devices, to educate the target user via multiple delivery channels, for example, email, a social engineering call, an SMS message, a collaboration app, an IT application, a security product application, etc., and any other cloud apps from a cloud apps marketplace. The multi-channel threat simulations provide mock threat situations in the target user's context through multiple delivery channels to determine the target user's security behavior. The multi-channel threat simulations are configured to educate the target user prior to a real-time threat. The behavior modeling engine 208 generates new sources to create additional contexts using the multi-channel threat simulations. For example, the behavior modeling engine 208 generates mock email phishing threat simulations or mock cloud app simulations in a cloud apps marketplace. The behavior modeling engine 208 and/or the control element generation engine 212 track user actions in response to the multi-channel threat simulations and generate contextual awareness content to train the target user to mitigate a real-time threat. The multi-channel threat simulations allow users to become aware of the mistakes they are making that result in security incidents. From the user actions to the multi-channel threat simulations, the control element generation engine 212 generates teachable events that trigger the users to undergo training specific to their context and retain knowledge and tips provided to avoid security threat attacks in the future.

The control element generation engine 212 also generates different micro-messages based on a type of engagement with a user. The micro-messages comprise, for example, alerts, reminders, tips, safety guidelines, and instructions for performing actions such as activating a firewall, enabling an antivirus, performing an on-demand scan, encrypting a user device that implements bring your own technology (BYOT), cleaning malware from an endpoint device, using an approved collaboration app, undergoing training, sharing content through social media, etc. The control element generation engine 212 implements contextual user engagement and change in security behavior to reduce security incidents and encourage DIY user actions. The control element generation engine 212 also generates different micro-messages based on security and compliance categories, for example, calendar, endpoint security, data loss prevention, encryption, social media. Payment Card Industry Data Security Standard (PCI DSS), HIPAA, cloud, email, web, etc. In an embodiment, the control element generation engine 212 automatically selects one or more of the targeted, contextual control elements that would have a high probability of acceptance and engagement by a target user for executing a change in the security behavior of the target user. In an embodiment, the control element generation engine 212 utilizes a history of user engagement, for example, whether and when the target user received a particular contextual control element, to select and render one or more of the targeted, contextual control elements to the target user. In an embodiment, the control element generation engine 212 accesses a policy control configured to control the type of contextual control elements that should be delivered, the frequency of delivery of the contextual control elements, the type of message tone in the contextual control elements based on the organization's security culture, etc.

The control element generation engine 212 dynamically renders one or more of the targeted, contextual control elements to a user device 214 of the target user through one or more of multiple delivery channels, for example, email, SMS, a mobile app, a collaboration app, etc., via respective APIs, for example, 212a, 212b, and 212c, for executing the change in the security behavior of the target user. The user device 214 is an electronic device, for example, one or more of a personal computer, a tablet computing device, a mobile computer, a mobile phone, a smart phone, a portable computing device, a laptop, a personal digital assistant, a wearable device such as a smart glass, a smart watch, etc., a touch centric device, a workstation, a client device, a portable electronic device, a network enabled computing device, an interactive network enabled communication device, a gaming device, an image capture device, a web browser, any other suitable computing equipment, combinations of multiple pieces of computing equipment, etc. The control element generation engine 212 delivers the targeted, contextual control elements to the user device 214 of the target user via an API gateway 213. In an embodiment, the control element generation engine 212 automatically selects one or more of the delivery channels that has a high probability of success in executing a change in the security behavior of the target user. The control element generation engine 212 delivers the targeted, contextual control elements to the user device 214 of the target user via the automatically selected delivery channels.

Figure 3:
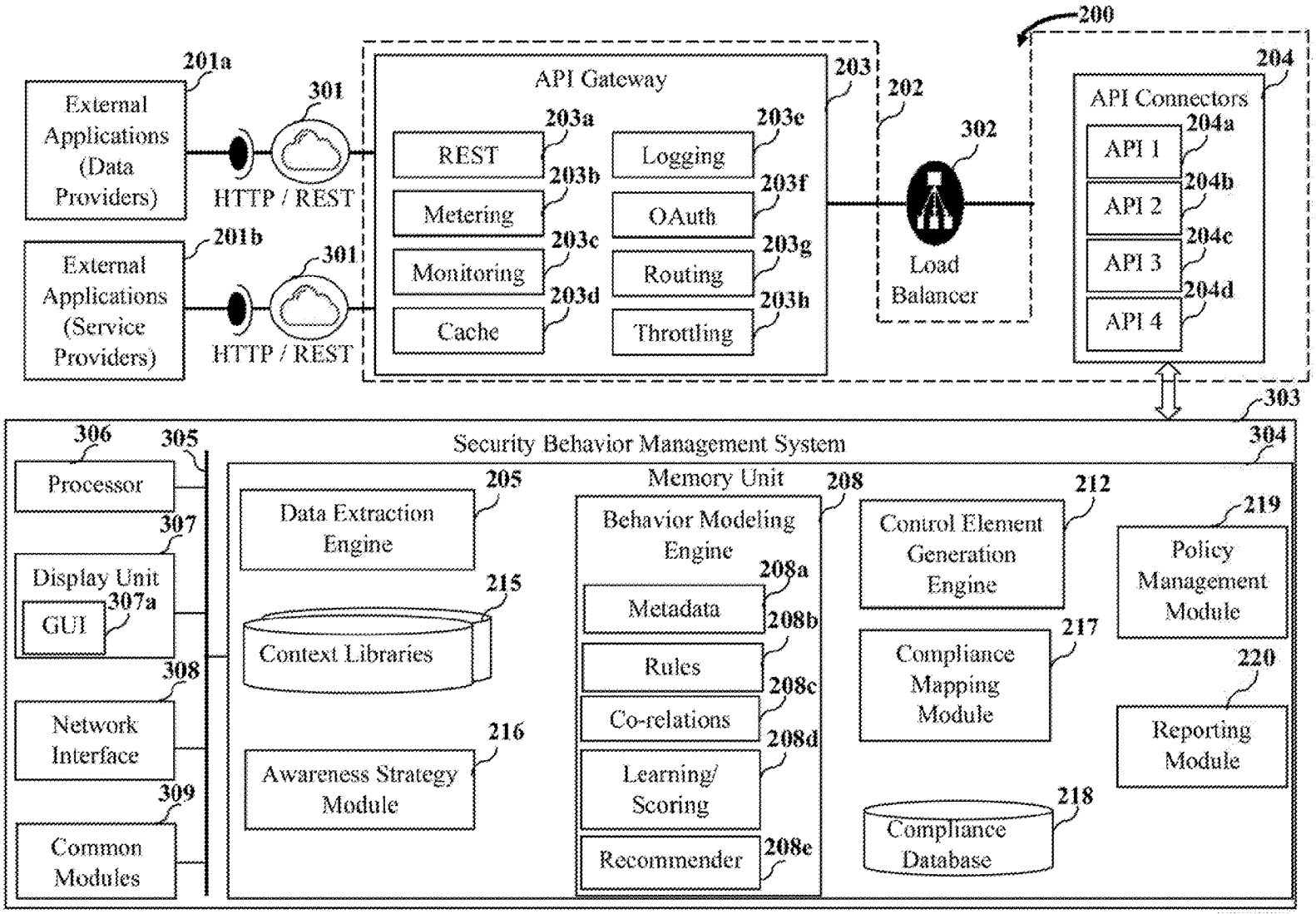
FIG. 3 exemplarily illustrates an architectural diagram showing an exemplary implementation of modules of the system for contextually managing and executing a change in security behavior of a target user.

FIG. 3 exemplarily illustrates an architectural diagram showing an exemplary implementation of modules of the system 200 for contextually managing and executing a change in security behavior of a target user. In an embodiment, various modules of the system 200 disclosed herein are deployed in the security behavior management system (SBMS) 303. The SBMS 303 accesses multiple external applications 201a and 201b associated with data providers and service providers respectively, via the application programming interface (API) system 202. The API system 202 connects to the external applications 201a and 201b via a network 301, for example, a short-range network or a long-range network. The network 301 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The API gateway 203 of the API system 202 acts as a single point of entry for retrieving multiple context attributes from the external applications 201a and 201b. In an embodiment, the API gateway 203 uses a REST web services architecture 203a to access the external applications 201a and 201b. Furthermore, the API gateway 203 handles operations, for example, metering 203b, monitoring 203c, logging 203e, authentication 203f, routing 203g, and throttling 203b to execute communications between the external applications 201a and 201b and the API connectors 204. The API gateway 203 stores operational data in a cache 203d. The API gateway 203 connects to the API connectors 204 of the API system 202 comprising multiple APIs, for example, 204a, 204b, 204c, 204d, etc., that provide access to different external applications 201a and 201b via a load balancer 302. The load balancer 302 distributes and balances the workload in the system 200 via the API gateway 203. The SBMS 303 is a computer system programmable using high-level computer programming languages. In an embodiment, the SBMS 303 is implemented using programmed and purposeful hardware. In an embodiment, the SBMS 303 is accessible to users, for example, through a broad spectrum of technologies and user devices such as smart phones, tablet computing devices, endpoint devices, etc., with access to the network 301. In an embodiment, the SBMS 303 is implemented in a cloud computing environment. In an embodiment, the SBMS 303 is a cloud computing-based platform implemented as a service for contextually managing and executing a change in security behavior of a target user. In another embodiment, the SBMS 303 is implemented as an on-premise platform comprising on-premise software installed and run on computers on the premises of an organization. In the system 200 disclosed herein, the SBMS 303 comprising the data extraction engine 205, the behavior modeling engine 208, and the control element generation engine 212 and their respective compute clusters, interfaces with the API system 202, and in an embodiment, with a learning management system (LMS) 803 shown in FIG. 8, and therefore more than one specifically programmed computing system is used for contextually managing and executing a change in security behavior of a target user.

As exemplarily illustrated in FIG. 3, the system 200 disclosed herein further comprises a non-transitory, computer-readable storage medium, for example, a memory unit 304 deployed in the SBMS 303, for storing computer program instructions defined by the modules, for example, 205, 208, 212, 215, 216, 217, 218, 219, 220, etc., of the SBMS 303. As used herein, "non-transitory computer-readable storage medium" refers to all computer-readable media, for example, non-volatile media, volatile media, and transmission media, except for a transitory, propagating signal. Non-volatile media comprise, for example, solid state drives, optical discs or magnetic disks, and other persistent memory volatile media including a dynamic random-access memory (DRAM), which typically constitute a main memory. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor 306. The system 200 disclosed herein further comprise a processor 306 operably and communicatively coupled to the memory unit 304 for executing the computer program instructions defined by the modules, for example, 205, 208, 212, 215, 216, 217, 218, 219, 220, etc., of the SBMS 303. The memory unit 304 is used for storing program instructions, applications, and data. The memory unit 304 is, for example, a random-access memory (RAM) or another type of dynamic storage device that stores information and instructions for execution by the processor 306. The memory unit 304 also stores temporary variables and other intermediate information used during execution of the instructions by the processor 306. The SBMS 303 further comprises read only memories (ROMs) or other types of static storage devices that store static information and instructions for execution by the processor 306. In an embodiment, the modules, for example, 205, 208, 212, 215, 216, 217, 218, 219, 220, etc., of the SBMS 303 are stored in the memory unit 304.

The processor 306 is configured to execute the computer program instructions defined by the modules, for example, 205, 208, 212, 215, 216, 217, 218, 219, 220, etc., of the SBMS 303 for contextually managing and executing a change in security behavior of a target user. The processor 306 refers to any one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 306 is implemented as a processor set comprising, for example, a programmed microprocessor and a math or graphics co-processor. The SBMS 303 is not limited to employing the processor 306. In an embodiment, the SBMS 303 employs controllers or microcontrollers. The processor 306 executes the modules, for example, 205, 208, 212, 215, 216, 217, 218, 219, 220, etc., of the SBMS 303.

As exemplarily illustrated in FIG. 3, the SBMS 303 further comprises a data bus 305, a display unit 307, a network interface 308, and common modules 309. The data bus 305 permits communications between the modules, for example, 304, 306, 307, 308, and 309 of the SBMS 303. The display unit 307, via a graphical user interface (GUI) 307a, displays information, display interfaces, user interface elements such as checkboxes, input text fields, etc., for example, for allowing a user such as a system administrator in an organization to configure message templates and personalization preferences of the organization for facilitating the dynamic generation of contextual awareness content and other targeted, contextual control elements for target users in the organization. The SBMS 303 renders the GUI 307a on the display unit 307 for receiving inputs from the system administrator. The GUI 307a comprises, for example, online web interfaces, web-based downloadable application interfaces, mobile-based downloadable application interfaces, etc. The display unit 307 displays the GUI 307a.

The network interface 308 enables connection of the SBMS 303 to the network 301 via the API system 202. In an embodiment, the network interface 308 is provided as an interface card also referred to as a line card. The network interface 308 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The common modules 309 of the SBMS 303 comprise, for example, input/output (I/O) controllers, input devices, output devices, fixed media drives such as hard drives, removable media drives for receiving removable media, etc. Computer applications and programs are used for operating the SBMS 303. The programs are loaded onto fixed media drives and into the memory unit 304 via the removable media drives. In an embodiment, the computer applications and programs are loaded into the memory unit 304 directly via the network 301.

In an exemplary implementation shown in FIG. 3, the modules of the system 200 disclosed herein comprise the data extraction engine 205, the behavior modeling engine 208, the control element generation engine 212, and the context libraries 215 as disclosed in the detailed description of FIG. 2. In an embodiment, the data extraction engine 205, the behavior modeling engine 208, and the control element generation engine 212 are stored in the memory unit 304 and executed by the processor 306. In an embodiment, the modules of the system 200 disclosed herein further comprise a compliance mapping module 217 and a compliance database 218. The compliance mapping module 217 tracks user actions performed in response to the targeted, contextual control elements and maps the user actions to compliance requirements stored in the compliance database 218 for regulating security compliance and identifying gaps in security risks of an organization. The compliance database 218 stores regulations and dictionaries of multiple compliance authorities, for example, the General Data Protection Regulation (GDPR) authorities. The compliance database 218 can be any storage area or medium that can be used for storing data and files. The compliance database 218 can be, for example, any of structured query language (SQL) data stores or not only SQL (NoSQL) data stores. In an embodiment, the compliance database 218 can also be a location on a file system. In another embodiment, the compliance database 218 can be remotely accessed by the compliance mapping module 217 via the network 301. In another embodiment, the compliance database 218 is configured as a cloud-based database implemented in a cloud computing environment.

Users, for example, employees are expected to behave a certain way to meet the compliance standards for the organization. The compliance mapping module 217 identifies the user actions that potentially harm cybersecurity related compliance standards of the organization. In an embodiment, the compliance mapping module 217 generates and renders one or more reports related to the identified user actions to a user device of a system administrator of the organization to allow the system administrator to track the user actions and trigger the dynamic generation of contextual awareness content to train and educate target users directly about the importance of certain violations and user actions and their potential causes and effects, thereby improving security awareness of the target users and ensuring compliance of the security policies of the organization.

In another embodiment, the modules of the system 200 disclosed herein further comprise a reporting module 220, in operable communication with the behavior modeling engine 208, for generating reports comprising one or more of user actions performed in response to the targeted, contextual control elements, security risks associated with target users, security behavior patterns, security behavior trends, and a correlation between the security risks and security compliance in an organization associated with the target users. The reporting module 220 generates and renders multiple reports comprising the security risks associated with target users and relevance of the security risks to security compliance standards, for example, standards of Health Insurance Portability and Accountability Act (HIPAA) of 1996, the General Data Protection Regulation (GDPR), the Payment Card Industry Data Security Standard (PCI DSS), National Institute of Standards and Technology (NIST), etc., to an end user, for example, a security operations center (SOC) administrator of an organization. The reporting module 220 generates online reports with charts and graphs to provide complete visibility of the entire behavior management process implemented by the system 200 disclosed herein. In an embodiment, the reporting module 220 performs a casual inference analysis, for example, by determining the percentage of employees who cause security incidents in an organization.

In another embodiment, the reporting module 220 generates reports that provide, for example, visibility to integration points such as the health of API system integration, data ingestion information, user interaction information such as message accepted, message opened rate, actioned rate, training completion status, etc. In another embodiment, the reporting module 220 generates cause and effect reports or return on investment (ROI) reports that indicate results produced based on user engagements and user actions in response to the targeted, contextual control elements. For example, for customers using the Slack® application, an organization may have a goal to increase the security posture of the organization by increasing multifactor authentication. The control element generation engine 212 engages with the user via messaging and communicates with the reporting module 220 to generate a final report on user enabled multifactor authentication based on messaging interventions. In another embodiment, the reporting module 220 performs user level reporting by generating reports indicating the security behavior score of the target user, overtime reports on how the users progress, and gaps in the security risks of the organization. For example, after a targeted, contextual notification message comprising a link to access security awareness content is sent to the target user, for example, via email, the reporting module 220 tracks user actions, for example, whether the target user clicked on the link in the email and undertook training. The reporting module 220 also determines whether a reminder to undergo training needs to be sent to the target user, how much malware was received by the target user over a period of time, a percentage of top spam recipients who are no longer top recipients, a percentage of vulnerable users targeted by suspicious emails in a month, whether target users are reporting spam, etc.

In another embodiment, the modules of the system 200 disclosed herein further comprise an awareness strategy module 216 for automatically generating awareness strategies based on the security behavioral models dynamically generated by the behavior modeling engine 208 for improving awareness of target users including system administrators. The generated awareness strategies comprise specifications of what users need to know in terms of security threat concepts and how security controls need to be optimally tuned to suit a target user's security behavioral requirements. The awareness strategy module 216 recommends the awareness strategies to system administrators via their user devices. The awareness strategy module 216 allows target users, for example, corporate administrators to quickly make decisions on whom to be focused and what to be focused in terms of awareness automation. In an embodiment, the awareness strategy module 216 generates and renders one or more reports on the generated awareness strategies to a user device of a system administrator of the organization to provide insights and tools for the system administrator to automate the generation of targeted, contextual control elements and deliver awareness content to target users. For example, the awareness strategy module 216 provides security habit insights to managers and human resources departments for managing employees. In another embodiment, the modules of the system 200 disclosed herein further comprise the policy management module 219 for dynamically generating policy management recommendations configured to change configurations of security controls, security operations, and security policies of an organization associated with target users based on one or more security behavioral models of each of the users using the dynamically generated targeted, contextual control elements and a change in security risks of the organization incurred due to user actions performed in response to the targeted, contextual control elements. The policy management module 219 renders an online policy configuration portal on a user device of the system administrator of the organization. The online policy configuration portal allows the administrator to configure multiple policies, for example, application level policies such as policies to enable or disable applications, policies to configure a test mode or a production mode, and user level policies comprising, for example, communication preferences, frequency, preferences of the delivery channels for receiving the targeted, contextual control elements, application preferences for interventions through the targeted, contextual control elements, groups, etc. In an embodiment, the compliance mapping module 217, the awareness strategy module 216, the policy management module 219, and the reporting module 220 are stored in the memory unit 304 and executed by the processor 306.

The data extraction engine 205, the behavior modeling engine 208, the control element generation engine 212, the awareness strategy module 216, the compliance mapping module 217, the policy management module 219, and the reporting module 220 are disclosed above as software executed by the processor 306. In an embodiment, the modules, for example, 205, 208, 212, 215, 217, 218, 219, 220, etc., of the system 200 disclosed herein are implemented completely in hardware. In another embodiment, the modules, for example, 205, 208, 212, 215, 217, 218, 219, 220, etc., of the system 200 disclosed herein are implemented by logic circuits to carry out their respective functions disclosed above. In another embodiment, the system 200 is also implemented as a combination of hardware and software including the API system 202 and one or more processors, for example, 306, that are used to implement the modules, for example, 205, 208, 212, 215, 217, 218, 219, 220, etc., of the system 200 disclosed herein.

The processor 306 retrieves instructions defined by the data extraction engine 205, the behavior modeling engine 208, the control element generation engine 212, the awareness strategy module 216, the compliance mapping module 217, the policy management module 219, and the reporting module 220 for performing respective functions disclosed above. The processor 306 retrieves instructions for executing the modules, for example, 205, 208, 212, 215, 217, 218, 219, 220, etc., from the memory unit 304. A program counter determines the location of the instructions in the memory unit 304. The program counter stores a number that identifies the current position in the program of each of the modules, for example, 205, 208, 212, 215, 217, 218, 219, 220, etc. The instructions fetched by the processor 306 from the memory unit 304 after being processed are decoded. The instructions are stored in an instruction register in the processor 306. After processing and decoding, the processor 306 executes their respective instructions, thereby performing one or more processes defined by those instructions.

At the time of execution, the instructions stored in the instruction register are examined to determine the operations to be performed. The processor 306 then performs the specified operations. The operations comprise arithmetic operations and logic operations. An operating system of the SBMS 303 performs multiple routines for performing a number of tasks required to assign the input devices, the output devices, and the memory unit 304 for execution of the modules, for example, 205, 208, 212, 215, 217, 218, 219, 220, etc. The tasks performed by the operating system comprise, for example, assigning memory to the modules, for example, 205, 208, 212, 215, 217, 218, 219, 220, etc., and to data used by the SBMS 303, moving data between the memory unit 304 and disk units, and handling input/output operations. The operating system performs the tasks on request by the operations and after performing the tasks, the operating system transfers the execution control back to the processor 306. The processor 306 continues the execution to obtain one or more outputs.

For purposes of illustration, the detailed description refers to the modules, for example, 205, 208, 212, 215, 217, 218, 219, 220, etc., being run locally on a single computer system; however the scope of the method and the system 200 disclosed herein is not limited to the modules, for example, 205, 208, 212, 215, 217, 218, 219, 220, etc., being run locally on a single computer system via the operating system and the processor 306, but may be extended to run remotely over the network 301 by employing a web browser and a remote server, a mobile phone, or other electronic devices. In an embodiment, one or more portions of the system 200 disclosed herein are distributed across one or more computer systems (not shown) coupled to the network 301.

The non-transitory computer-readable storage medium disclosed herein stores computer program instructions executable by the processor 306 for contextually managing and executing a change in security behavior of a target user. The computer program instructions implement the processes of various embodiments disclosed above and perform additional steps that may be required and contemplated for contextually managing and executing a change in security behavior of a target user. When the computer program instructions are executed by the processor 306, the computer program instructions cause the processor 306 to perform the steps of the method for contextually managing and executing a change in security behavior of a target user as disclosed above. In an embodiment, a single piece of computer program code comprising computer program instructions performs one or more steps of the method disclosed above. The processor 306 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refers to the hardware, which is specifically configured to recognize and/or execute the computer program codes to be held on a non-transitory, computer-readable storage medium. Furthermore, in another embodiment, use of a module, or an engine, or a unit refers to the non-transitory, computer-readable storage medium including the computer program codes, which is specifically adapted to be executed by the microcontroller to perform predetermined operations. In another embodiment, the term "module" or "engine" or "unit" refers to the combination of the microcontroller and the non-transitory, computer-readable storage medium. Often module or engine boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 4:
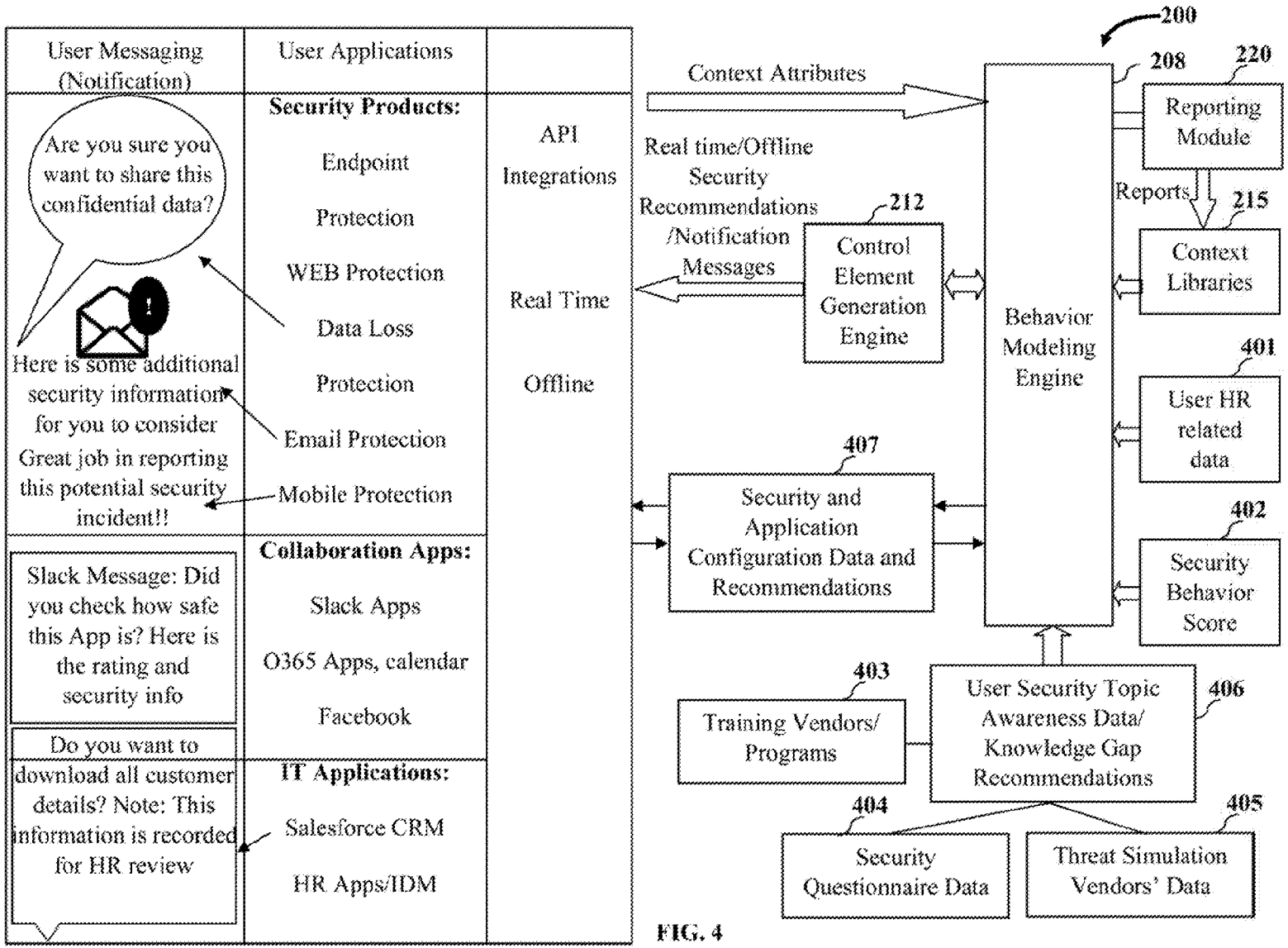
FIG. 4 exemplarily illustrates an exemplary implementation of the system for dynamically rendering targeted, contextual control elements to a target user.

FIG. 4 exemplarily illustrates an exemplary implementation of the system 200 for dynamically rendering targeted, contextual control elements to a target user. As exemplarily illustrated in FIG. 4, the behavior modeling engine 208 receives multiple context attributes from multiple external applications or user applications (apps), for example, security products such as endpoint products, protection products, web protection products, data loss prevention products, email protection products, mobile protection products, etc., collaboration apps such as Slack® apps, Office® 365 apps, calendar apps, the Facebook® social networking app, and IT applications such as the Salesforce® customer relationship management (CRM) app, human resources (HR) apps, an internet download manager (IDM) app, etc. The context attributes provide activity data and event data to the behavior modeling engine 208. The activity data and the event data comprise, for example, data of security events and user activity events generated from security products related, for example, to data protection, email security, social engineering, phishing, device safety, password safety, malware, ransomware, travel security, safe social networking, safe web browsing, mobile device security, insider threats, etc. The activity data and the event data further comprise, for example, data of end user activity events collected via IT applications, collaboration app user events such as sharing data to other users internally and externally, team application events, etc. Some security products generate data of compliance events, for example, software is out of date, a security policy is not enabled, a security policy is not enforced, etc., and transmit the data to the behavior modeling engine 208 in the form of context attributes.

The behavior modeling engine 208 generates insights from the context attributes and determine a context for each user. The behavior modeling engine 208 generates real time intelligence information on security failures, compliance failures, and user actions. The behavior modeling engine 208 dynamically generates one or more security behavioral models and a security behavior score 402 for each of multiple users of an organization based on behavior modeling criteria derived from the context attributes. In an embodiment, the reporting module 220 in communication with the behavior modeling engine 208 generates multiple reports as disclosed in the detailed description of FIG. 3, and stores the reports in the context libraries 215 shown in FIG. 3. Through the reports, the reporting module 220 performs reporting of, for example, security risks caused by the users, reduction in security risks over time, return-on-investment, compliance reporting, analytics reporting, etc. In an embodiment, the context libraries 215 comprise, for example, a library of security scenarios, a compliance mapping library, a threat intelligence library, etc. In another embodiment, the context libraries 215 store micro-messages containing a short few lines of text, short interactive content, games, interactive videos, etc., that are used by the control element generation engine 212 for generating targeted, contextual control elements. In an embodiment, the behavior modeling engine 208 utilizes data from the context libraries 215, HR related data 401 of each of the users, the security behavior score 402 of each of the users, and security topic awareness data and/or knowledge gap recommendations 406 for dynamically updating the security behavioral models. The security topic awareness data comprises, for example, training data from training vendors and training programs 403, security questionnaire data 404, threat simulation vendors' data 405, etc.

The behavior modeling engine 208 transmits the results of behavioral modeling performed using the context libraries 215, the HR related data 401 of each of the users, the security behavior score 402 of each of the users, and the security topic awareness data and/or knowledge gap recommendations 406 to the control element generation engine 212 for dynamic generation of the targeted, contextual control elements, for example, real-time and/or offline security recommendations, notification messages, etc. The control element generation engine 212 renders the targeted, contextual control elements to one or more of the user applications on a user device of the target user via API integrations. For example, when a target user attempts to send confidential data via an email client, the control element generation engine 212 renders a real-time cue "Are you sure you want to share this confidential data?" within the email client. In another example, the control element generation engine 212 sends an email with a notification message "Here is some additional security information for you to consider" and a link to access contextual awareness content and facilitate execution of targeted training to the target user. In another example, the control element generation engine 212 sends a notification message "Did you check how safe this app is? Here is the rating and security info of the app." through a collaboration app such as the Slack® app. In another example, the control element generation engine 212 sends a notification message "Do you want to download all customer details? Note: This information is recorded for HR review" through an IT app such as the internet download manager. In another example, the control element generation engine 212 sends a real time proactive alert notification "This is personally identifiable information (PII). Are you sure you wanted to share this?" to the user device.

The control element generation engine 212 generates other types of notification messages comprising, for example, security product notifications with content, banners, alert icons, warnings with various severity levels, etc., email messages with content and indicators showing various severity levels, short message service (SMS) messages, collaboration app messages such as a Slack® messages, Microsoft® Teams® notifications, Facebook® Workplace™ notifications, WhatsApp® messages, messages via IT Applications such as CRM systems, human resource management (HRM) systems, etc., desktop notifications, browser notifications, etc., to user devices of target users. The control element generation engine 212 includes content with cues and severity level indicators in the targeted, contextual notification messages.

In an embodiment, the behavior modeling engine 208 transmits the results of behavioral modeling performed using the context libraries 215, the HR related data 401 of each of the users, the security behavior score 402 of each of the users, and security topic awareness data and/or knowledge gap recommendations 406 to the policy management module 219 shown in FIG. 3, for generating security and application configuration data and recommendations 407. A target user, for example, an administrator of a security operation center in an organization utilizes the security and application configuration data and recommendations 407 for changing configurations of security controls, security operations, and security policies of the organization based on a change in security risks of the organization incurred due to user actions performed in response to the targeted, contextual control elements.

Figure 5:
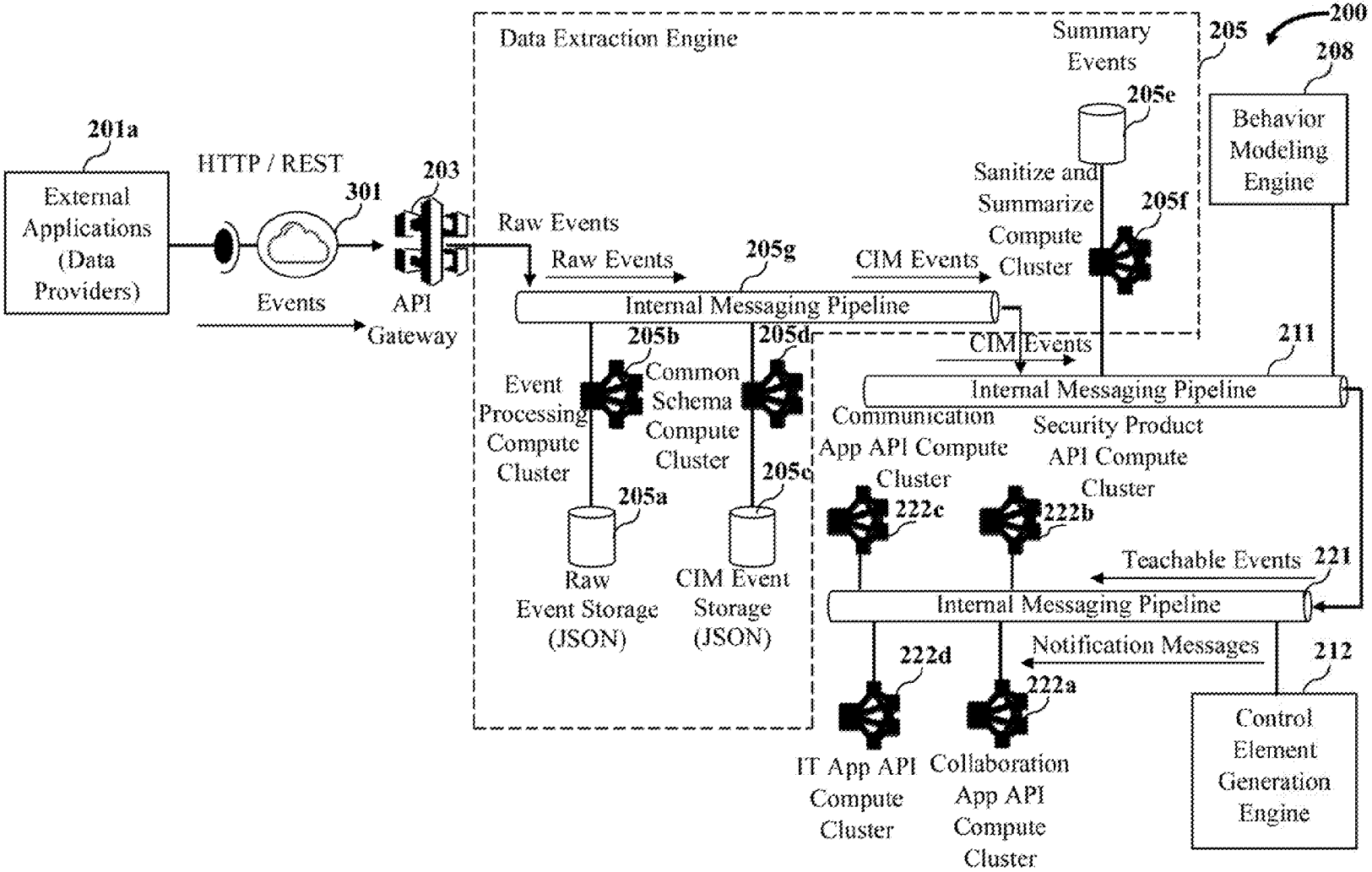
FIG. 5 exemplarily illustrates messaging pipelines implemented by the system for contextually managing and executing a change in security behavior of a target user.

FIG. 5 exemplarily illustrates messaging pipelines, for example, 205g, 211, and 221 implemented by the system 200 for contextually managing and executing a change in security behavior of a target user. FIG. 5 shows an exemplary implementation of the data extraction engine 205 that extracts multiple context attributes, for example, events, from the external applications, for example, 201a, via the API gateway 203 over a network 301. As exemplarily illustrated in FIG. 5, the data extraction engine 205 comprises multiple compute clusters, for example, 205b, 205d, and 205f, attribute storage devices, for example, 205a, 205c, and 205e, and the internal messaging pipeline 205g. The data extraction engine 205 receives raw events from the external applications 201a of data providers via the API gateway 203 over the network 301 using a hypertext transfer protocol (HTTP). An event processing compute cluster 205b processes the raw events and stores the raw events in a raw event storage device 205a. In an embodiment, a common schema compute cluster 205d converts the raw events to common information model (CIM) events and stores the CIM events in a CIM event storage device 205c. The common schema compute cluster 205d transmits the CIM events to a sanitize and summarize compute cluster 205f via the internal messaging pipeline 205g. The sanitize and summarize compute cluster 205f sanitizes and processes the CIM events and stores the processed CIM events in a summary events storage device 205e. In an embodiment, the storage devices 205a and 205c are relational databases, for example, the mongoDB® of MongoDB, Inc., supported by JavaScript Object Notation (JSON). In another embodiment, the storage device 205e is a database, for example, the Cassandra database of the Apache Software Foundation.

After sanitization and summarization, the sanitize and summarize compute cluster 205f transmits the CIM events to the behavior modeling engine 208 via the internal messaging pipeline 211. The behavior modeling engine 208 dynamically generates one or more security behavioral models for a target user using a selection of one or more of the CIM events and the context libraries 215 shown in FIG. 3, and transmits the dynamically generated security behavioral models to the control element generation engine 212 via the internal messaging pipelines 211 and 221. The control element generation engine 212 dynamically generates targeted, contextual control elements specific to the target user using the security behavioral models, the security behavior score, and one or more context libraries 215. In an embodiment as exemplarily illustrated in FIG. 5, the control element generation engine 212 dynamically generates targeted, contextual notification messages comprising teachable events specific to the target user using the security behavioral models, the security behavior score, and one or more context libraries 215. The teachable events are generated using the context attributes specific to a target user and encapsulated in a targeted, contextual notification message used for training the target user. The teachable events are transmitted to the target user via micro-messaging, for example, short message service (SMS) type security awareness messaging. In an embodiment, the teachable events provide byte sized training focused on a single topic. The teachable events are time sensitive and targeted to a specific user. In an example where a user clicked on malware that was delivered via an email attachment and a security protection software application installed in the user's endpoint device terminated the malware, the control element generation engine 212 generates a targeted, contextual notification message containing a teachable event, for example, "The email you just clicked was a malware attack against our company and you. Security protection technologies have stopped the malware for now, but next time watch out for these areas".

The control element generation engine 212 acts as an early warning system and delivers the targeted, contextual notification message as soon as the user action is identified to allow the targeted, contextual notification message to effectively train the target user. The targeted, contextual notification messages comprising the teachable events can be consumed by the target user in a short time duration and allows the target user to learn from mistakes or activities and in some cases, prevent the mistakes from happening through proactive messaging. In an embodiment, the teachable events aid in pre-emptively avoiding a security incident from occurring, thereby providing a preventive solution rather than a corrective solution. In another embodiment, the teachable events can be extended to increase productivity in an organization. In this embodiment, the behavior modeling engine 208 creates an organizational behavior for cyber security best practices to improve the productivity of the employees in the organization. For example, the behavior modeling engine 208 tracks sales behavior of sales personnel in the organization and triggers the control element generation engine 212 to generate and render contextual notification messages with a combination of byte sized teachable events to educate sales employees with the best sales behavior.

The control element generation engine 212 delivers the targeted, contextual notification messages to a user device of the target user through one or more of multiple delivery channels for executing a change in the security behavior of the target user. In an embodiment, the control element generation engine 212 uses multiple API compute clusters, for example, 222a, 222b, 222c, and 222d to deliver the targeted, contextual notification messages to a user device of the target user through multiple delivery channels, for example, a collaboration application such as the Slack® application, a security product application, a communication application such as an email application, an SMS application, an IT application, etc. The API compute clusters 222a, 222b, 222c, and 222d receive and process the targeted, contextual notification messages from the control element generation engine 212 via the internal messaging pipeline 221, and proceed to deliver the targeted, contextual notification messages to the user device of the target user via one or more of the delivery channels.

In an embodiment, the internal messaging pipelines, for example, 205g, 211, and 221, are developed, for example, using a NATS messaging system for communicating the raw events, the CIM events, and the teachable events within the system 200 disclosed herein. In another embodiment, the internal messaging pipelines, for example, 205g, 211, and 221, are developed, for example, using the Kafka® distributed streaming platform of the Apache Software Foundation for real-time communication of the raw events, the CIM events, and the teachable events within the system 200 disclosed herein. In an embodiment, the compute clusters, for example, the event processing compute cluster 205b, the common schema compute cluster 205d, the sanitize and summarize compute cluster 205f, and the API compute clusters 222a, 222b, 222c, and 222d are implemented as a distributed cluster computing framework, for example, using Apache Spark™ for data processing. In another embodiment, the compute clusters, for example, the event processing compute cluster 205b, the common schema compute cluster 205d, the sanitize and summarize compute cluster 205f, and the API compute clusters 222a, 222b, 222c, and 222d are implemented as a stream processing framework, for example, using Apache Flink® for data processing.

Figure 6:
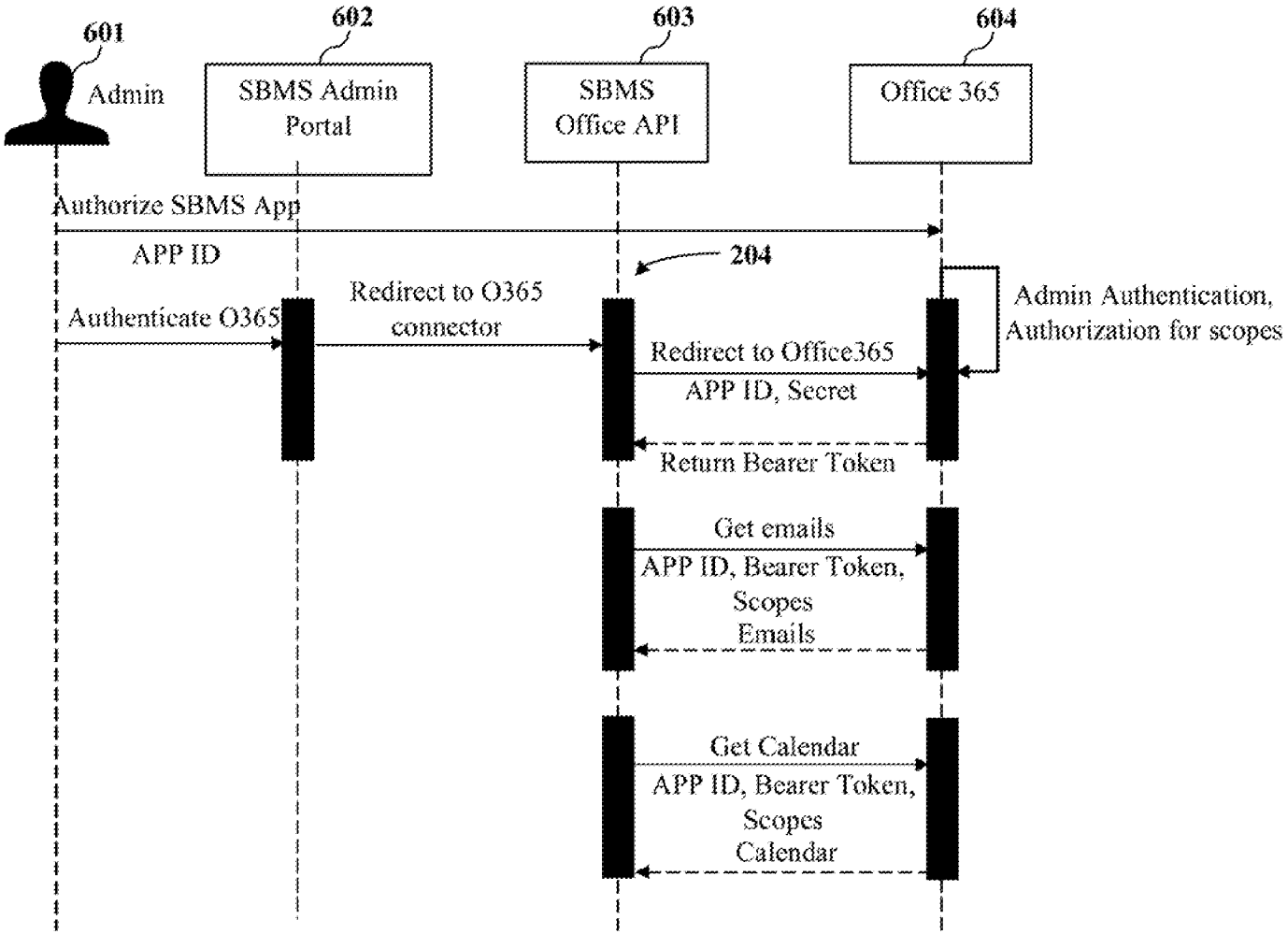
FIG. 6 exemplarily illustrates an application programming interface connector flow involved in accessing an external application.

FIG. 6 exemplarily illustrates an application programming interface (API) connector flow involved in accessing an external application. FIG. 6 shows flow of events between an administrator (admin) portal 602 of the security behavior management system (SBMS) 303 shown in FIG. 3, operated by an administrator 601 of an organization, an SBMS Office API 603, and the Office 365 application (app) 604. After authentication events triggered by the administrator 601 via the admin portal 602, the API connectors 204 of the system 200 shown in FIGS. 2-3, allow access, for example, to the Office 365 app 604, email apps, and calendar apps using a bidirectional flow of events as exemplarily illustrated in FIG. 6. The SBMS 303 dynamically extracts activity telemetry comprising, for example, security events triggered from the Office 365 app 604, email security events, calendar events, etc., via the SBMS Office API 603. The administrator 601 can view the activity telemetry on the admin portal 602.

Figure 7:
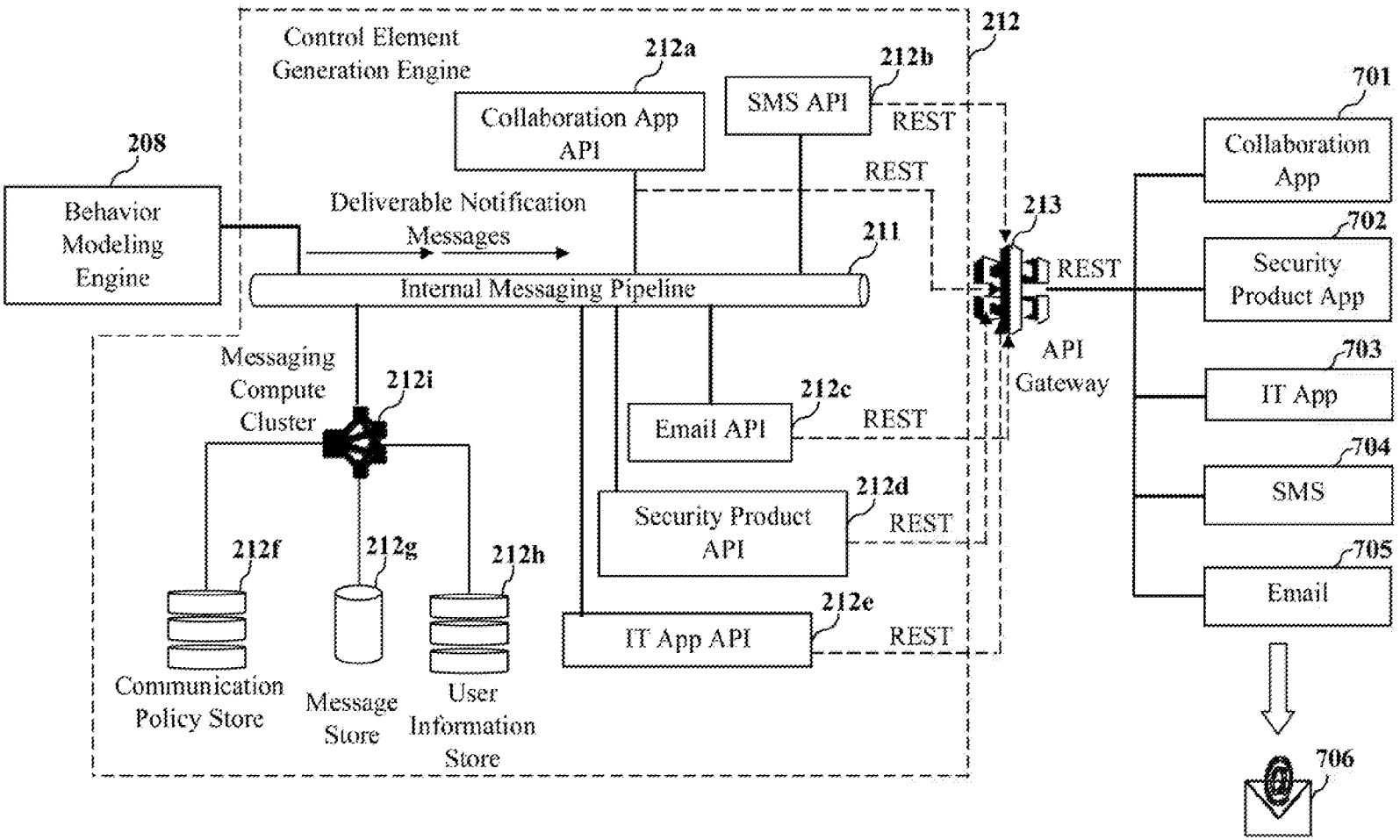
FIG. 7 exemplarily illustrates interactions between a behavior modeling engine and a control element generation engine of the system for contextually managing and executing a change in security behavior of a target user.

FIG. 7 exemplarily illustrates interactions between the behavior modeling engine 208 and the control element generation engine 212 of the system 200 shown in FIG. 2, for contextually managing and executing a change in security behavior of a target user. The behavior modeling engine 208 communicates the dynamically generated security behavioral models of a target user to the control element generation engine 212 via the internal messaging pipeline 211. In an embodiment, the control element generation engine 212 comprises a messaging compute cluster 212i and storage devices, for example, a communication policy store 212f, a message store 212g, and a user information store 212h. The messaging compute cluster 212i processes the dynamically generated security behavioral models received from the behavior modeling engine 208 and generates targeted, contextual notification messages using data, for example, communication policies of the organization, personalization preferences of the organization, etc., retrieved from the communication policy store 212f, and user profile information comprising, for example, user roles, permissions, user actions, etc., retrieved from the user information store 212h. The messaging compute cluster 212i generates the targeted, contextual notification messages in accordance with the communication policies and the personalization preferences of the organization. The messaging compute cluster 212i stores the targeted, contextual notification messages in the message store 212g. The messaging compute cluster 212i also delivers the targeted, contextual notification messages to different delivery channels, for example, a collaboration application (app) 701, a security product application 702, an IT application 703 such as a customer relationship management (CRM) application, a human resources management (HRM) application, etc., communication applications such as an SMS application 704, an email application 705, etc., deployed on the user device of the target user through the API gateway 213 via the respective APIs 212a, 212d, 212e, 212b, and 212c of the control element generation engine 212. The target user accesses the targeted, contextual notification messages 706 on the user device.

Figure 8:
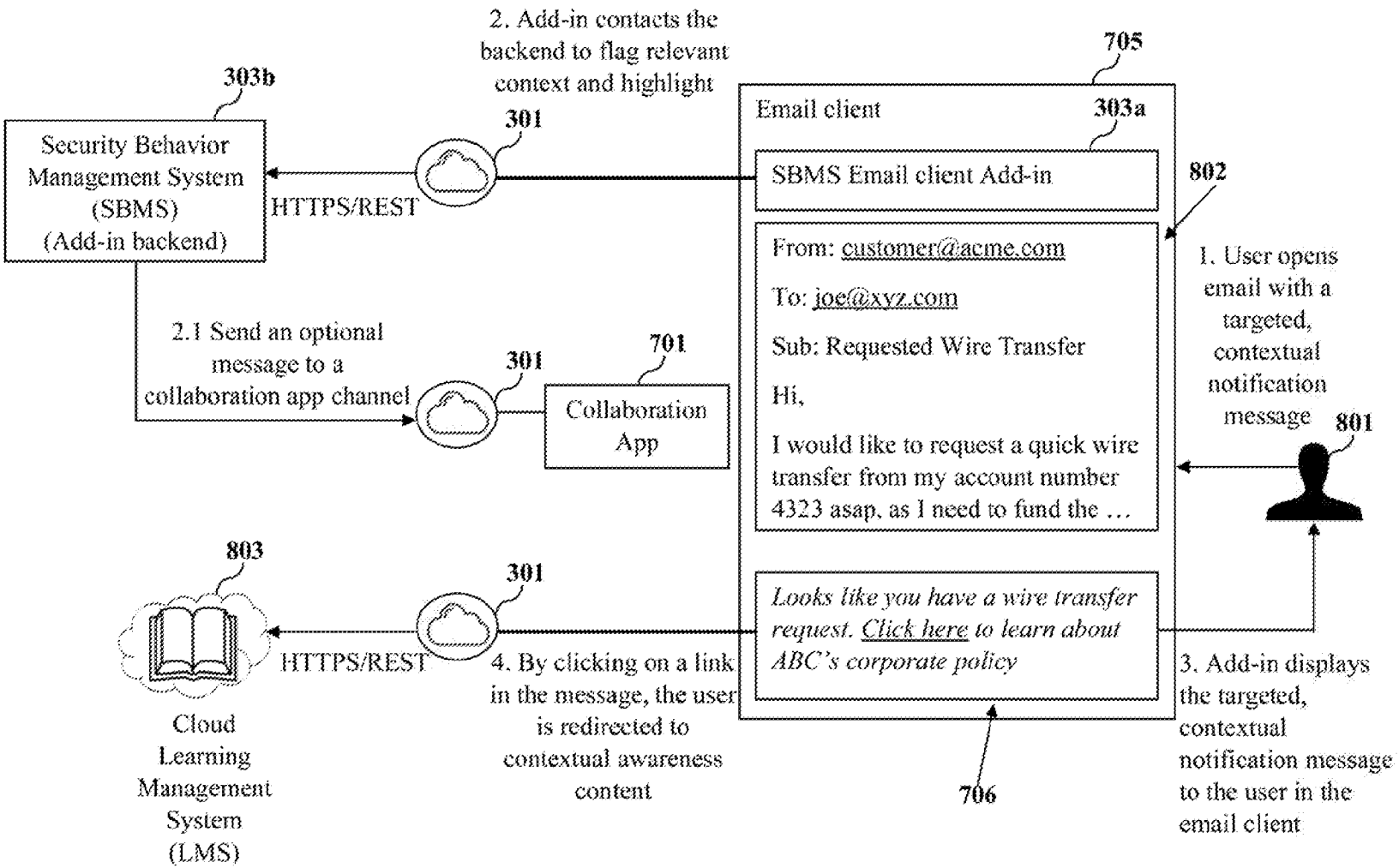
FIG. 8 exemplarily illustrates a process flow diagram showing delivery of a targeted, contextual notification message specific to a target user for executing a change in security behavior of an organization.

FIG. 8 exemplarily illustrates a process flow diagram showing delivery of a targeted, contextual notification message 706 specific to a target user 801 for executing a change in security behavior of an organization. In an embodiment, the security behavior management system (SBMS) 303 shown in FIG. 3, is implemented as a client add-in 303a and a backend add-in 303b. Consider an example where the control element generation engine 212 shown in FIGS. 2-5 and FIG. 7, delivers a targeted, contextual notification message 706 comprising a teachable event to an email client 705 deployed on a user device of the target user 801 via an email API 212c shown in FIG. 7. In this example, the client add-in 303a is embedded in the email client 705. The client add-in 303a renders an email 802 along with the targeted, contextual notification message 706 comprising the teachable event in the email client 705. The target user 801 opens the email 802 with the targeted, contextual notification message 706 in the email client 705. In this example, the email 802 relates to a request for a wire transfer of monetary funds.

The client add-in 303a contacts the backend add-in 303b via the network 301 to flag and highlight relevant context of the email 802. In an embodiment, the backend add-in 303b sends an optional message for the target user 801 to the collaboration app 701 via the network 301. The client add-in 303a displays the targeted, contextual notification message 706, for example, "Looks like you have a wire transfer request. Click here to learn about ABC's corporate policy" in the email client 705. By clicking on a training link in the targeted, contextual notification message 706, the client add-in 303a redirects the target user 801 to contextual awareness content generated for the target user 801. The target user 801 accesses the dynamically generated contextual awareness content from the targeted, contextual notification message 706, for example, through a cloud-based learning management system (LMS) 803 via the network 301. The cloud-based LMS 803 administers, tracks, reports, hosts, and renders or plays the dynamically generated contextual awareness content on the user device of the target user 801. In an embodiment, the LMS 803 is deployed as a software application in the memory unit 304 of the SBMS 303 shown in FIG. 3, for allowing access to dynamically generated contextual awareness content from the targeted, contextual notification message 706.

FIG. 9 exemplarily illustrates a security behavior change model 900 created by the behavior modeling engine 208 shown in FIGS. 2-5 and FIG. 7. Based on the context attributes, the behavior modeling engine 208 shown in FIGS. 2-5 and FIG. 7, predicts various behavioral modeling criteria that influence the security behavior and generates one or more security behavioral models for each user. The behavior modeling engine 208 measures current security behavior of each user based on the context attributes extracted from multiple external applications with which each user engages on a daily basis. The behavior modeling engine 208 derives the behavior modeling criteria from the context attributes comprising, for example, activity data. In an embodiment, the behavior modeling criteria comprise a perceived security threat criterion 905, a self-efficacy criterion 906, a social norm criterion 907, and a perceived reward and punishment criterion 908. The perceived security threat criterion 905 involves decisions made in relation to security situations, for example, sharing sensitive data, clicking on an email attachment that may be potentially malicious, installing apps that may be potentially malicious, etc. The behavior modeling engine 208 derives the perceived security threat criterion 905 from context attributes comprising, for example, each user's activities and interactions with various security systems, IT applications, and their responses to various security events. The self-efficacy criterion 906 involves determining whether a user can achieve certain goals amid various security events based on their understanding, experience, and learning of multiple security concepts. The behavior modeling engine 208 derives the self-efficacy criterion 906 from context attributes comprising, for example, security knowledge assessments via questionnaires, test scores, security awareness training modules, newsletters, security seminars, experiences and reactions to simulated threats, etc. The behavior modeling engine 208 derives the social norm criterion 907 from context attributes comprising, for example, views of conditions surrounding a user, accepted or rejected behavior in the user's group of peers, actions that gain social acceptance or social rejection, etc. The perceived reward and punishment criterion 908 involves security management of the organization from the perspective of a security leadership team and a human resources (HR) leadership team, for example, in terms of whether security processes, security policies, and security technologies have been established in the organization, whether employees of the organization have been educated about the security policies and processes of the organization, follow through actions performed by the employees and/or the organization based on the security policies, whether the organization maintains security goals and metrics to measure, monitor, and manage the security policies and processes, whether the organization rewards and punishes the employees based on their security actions, etc. The behavior modeling engine 208 derives the perceived reward and punishment criterion 908 based on process maturity, technology usage, and established messaging to users in the organization.

The behavior modeling engine 208 dynamically generates one or more security behavioral models based on the behavior modeling criteria, and generates a security behavior score, from which the control element generation engine 212 shown in FIGS. 2-5 and FIG. 7, generates multiple targeted, contextual control elements specific to each user, for example, in the form of security awareness content 901, security controls 902, security cues 903 or notification messages, and security culture 904. The targeted, contextual control elements in the form of security awareness content 901 comprise, for example, security trainings, newsletters, simulations, classroom trainings, security modules, etc., that provide knowledge to the user to interpret various threat events and act accordingly. The targeted, contextual control elements related to security controls 902 comprise dynamically changing security control policies based on the security behavioral model of each target user in real time to preclude the target user from making mistakes and creating security incidents. In an embodiment, the targeted, contextual control elements related to security controls 902 execute a change in security behavior in an offline mode, where the control element generation engine 212 executes an action based on anticipation of the user's security behavior. For example, for endpoint malware protection, the control element generation engine 212 tunes a sensitivity level of a security control associated with a security solution to high when the behavior modeling engine 208 determines that the target user is negligent with endpoint security events. When the sensitivity level is high, the security solution blocks suspicious activity without informing the target user. Similarly, the control element generation engine 212 adjusts security policies and software configurations to limit the actionability of the target user and prevent the target user from making mistakes. Moreover, the control element generation engine 212 adjusts other security controls, for example, endpoint software security controls, network security controls, cloud apps security controls, collaboration software security controls, data protection security controls, email security controls, social engineering controls, IT application configurations that allow or disallow a user from performing certain actions, etc. In an embodiment, the control element generation engine 212 communicates with the policy management module 219 shown in FIG. 3, for changing configurations of security controls, security operations, and security policies of an organization.

Furthermore, the control element generation engine 212 generates targeted, contextual control elements in the form of security cues 903 while a user performs actions on a user device. The control element generation engine 212 renders the security cues 903 as notifications on a graphical user interface (GUI) of a user device while a target user interacts with software on the user device. These security cues 903 remind the target user, for example, about a potential reward or punishment, data facts to make correct judgements, etc., and help communicate expectations from users. These security cues 903 influence the target user to follow desired actions. Furthermore, the control element generation engine 212 generates targeted, contextual control elements based on social elements that define security culture 904. The behavior modeling engine 208 measures the social elements based on peer security actions or activity and peer behavior towards security events. For example, the behavior modeling engine 208 measures social elements, for example, related to seriousness that peers of target users offer to cybersecurity; whether their peers follow a clean desk policy; whether their peers connect to unsafe network connections such as unsafe Wi-Fi® networks; whether their peers classify data to protect; how well their peers maintain their device safety, for example, by maintaining an up-to date operating system and browser version; whether their peers browse non-work related websites during their working hours; whether their peers use their official devices for unofficial purposes, etc. The behavior modeling engine 208 updates a security behavior model of the target user based on the measured social elements. In an embodiment, the behavior modeling engine 208 performs organizational level industry comparison to establish a baseline comparison and determine how an organization deviates from peer organizations. In an example, the behavior modeling engine 208 determines whether HR actions are performed against users with poor security behavior. The control element generation engine 212, in communication with the behavior modeling engine 208, renders the targeted, contextual control elements to a user device of the target user via one or more selected delivery channels. Actions and responses of the target user to the targeted, contextual control elements update the behavior modeling criteria, for example, the perceived security threat criterion 905, the self-efficacy criterion 906, the social norm criterion 907, and the perceived reward and punishment criterion 908 in a feedback loop, and in turn, the generated security behavioral models of the target user, thereby creating a security behavior change model 900 that increases a likelihood 909 of each user engaging in the desired security behavior.

Figure 10:
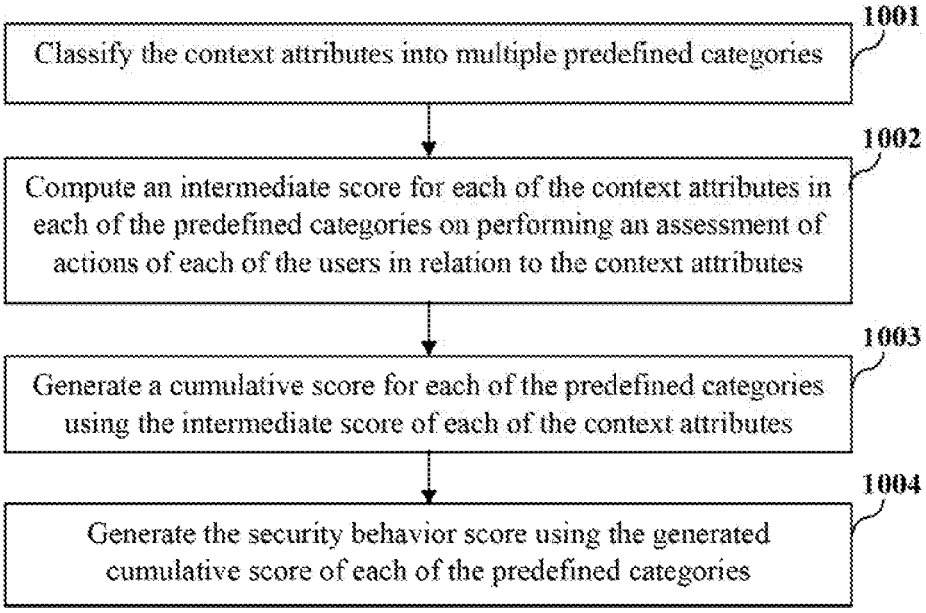
FIG. 10 exemplarily illustrates a flow diagram comprising the steps for generating a security behavior score for a target user in an organization.

FIG. 10 exemplarily illustrates a flow diagram comprising the steps for generating a security behavior score for a target user in an organization. The security behavior score indicates how likely users follow the desired security behavior of the organization. In an embodiment, the behavior modeling engine 208 shown in FIGS. 2-5 and FIG. 7, classifies 1001 the context attributes into multiple predefined categories that influence security behavior. The predefined categories comprise, for example, knowledge, user activity, user policy control, user notification, compliance control, etc. The behavior modeling engine 208 computes 1002 an intermediate score for each of the context attributes in each of the predefined categories on performing an assessment of actions of each of the users in relation to the context attributes. The behavior modeling engine 208 generates 1003 a cumulative score for each of the predefined categories using the intermediate score of each of the context attributes. The behavior modeling engine 208 then generates 1004 the security behavior score using the generated cumulative score of each of the predefined categories as disclosed in the detailed description of FIGS. 11A-11B. The behavior modeling engine 208 maintains, monitors, and dynamically updates the security behavior score to generate an optimal security behavior score for each of the users in the organization to automatically improve the security posture and the security culture of the organization.

FIGS. 11A-11B exemplarily illustrate a tabular representation showing generation of a security behavior score for a target user in an organization. Consider an example where the behavior modeling engine 208 shown in FIGS. 2-5 and FIG. 7, classifies context attributes into predefined categories, for example, a knowledge category, a user activity category, a user policy control category, and a user notification category. The predefined categories define topics that influence security behavior, while the context attributes represent different parameters related to the topics. The knowledge category comprises context attributes, for example, related to knowledge of endpoint security events, knowledge of web security events, knowledge of email security events, etc. The user activity category comprises context attributes, for example, related to threat activities at endpoints, the web, email, etc. The user policy control category comprises context attributes, for example, related to enabling of administrator privileges, enabling of universal serial bus (USB) devices, multifactor authentication, control restrictions, etc. The user notification category comprises context attributes, for example, related to receiving and viewing notifications provided on a security dashboard, receiving and viewing real-time alerts for security misbehavior, receiving and viewing human resources (HR) notifications about serious security violations, etc. The behavior modeling engine 208 computes a score for each of the context attributes in each of the predefined categories on performing an assessment of actions of the target user in relation to the context attributes. In the above example, the behavior modeling engine 208 computes a knowledge score, a user activity score, a user policy control score, and a user notification score. The behavior modeling engine 208 performs an assessment of the knowledge of the target user on an ongoing basis, for example, by analyzing responses of the target user to an assessment survey, training questions, etc., to compute the knowledge score. The behavior modeling engine 208 assigns an intermediate score to each of the context attributes in the knowledge category based on the assessment of the target user's knowledge on the context attributes. For example, the behavior modeling engine 208 assigns intermediate scores 7, 4, and 5 to knowledge of endpoint security events, knowledge of web security events, and knowledge of email security events respectively. In an embodiment, the behavior modeling engine 208 assigns a weightage to each of the intermediate scores to generate a final score for each of the context attributes. For example, the behavior modeling engine 208 assigns a weightage of 1 to the knowledge of endpoint security events, 0.5 to the knowledge of web security events, and 2 to the knowledge of email security events, and accordingly computes the final scores as 7, 8, and 2.5 respectively. The behavior modeling engine 208 then generates a cumulative score for the knowledge category using the final score of each of the context attributes. In this example, the behavior modeling engine 208 generates the knowledge score as 17.5. A high knowledge score indicates a less chance of poor security behavior.

The behavior modeling engine 208 computes the user activity score, for example, based on threat activities performed by the target user. For example, the behavior modeling engine 208 performs a count of security incidents created by the user on an endpoint device, a count of web security incidents, a count of email security incidents, and a count of security incidents created on other security products. The behavior modeling engine 208 assigns an intermediate score to each of the context attributes in the user activity category based on the threat activities performed by the target user. For example, the behavior modeling engine 208 assigns intermediate scores 3, 4, and 5 to threat activities at endpoints, the web, and email respectively. In an embodiment, the behavior modeling engine 208 assigns a weightage to each of the intermediate scores to generate a final score for each of the context attributes. For example, the behavior modeling engine 208 assigns a weightage of 1 to the threat activities at endpoints, 0.5 to the threat activities performed on the web, and 2 to the threat activities performed via emails, and accordingly computes the final scores as 3, 2, and 10 respectively. The behavior modeling engine 208 then generates a cumulative score for the user activity category using the final score of each of the context attributes. In this example, the behavior modeling engine 208 generates the user activity score as 15. A low user activity score indicates a low level of threat activities the user is involved in, and hence good security behavior.

The behavior modeling engine 208 computes the user policy control score, for example, based on how an organization restricts undesired actions of users. For example, an organization may restrict administrative privileges on user devices to disallow users from installing software on user devices, thereby preventing installation of malicious software on the user devices. In another example, the organization may block usage of USB devices to disallow users from introducing viruses into USB drives of the user devices. In another example, the organization enforces multifactor authentication for accessing user devices in the organization. The behavior modeling engine 208 assigns an intermediate score to each of the context attributes in the user policy control category based on the restrictive actions performed by an organization. For example, the behavior modeling engine 208 assigns intermediate scores 35, 4, and 6 to restrictive actions related, for example, to enabling of administrator privileges, enabling of USB devices, and multifactor authentication respectively. In an embodiment, the behavior modeling engine 208 assigns a weightage to each of the intermediate scores to generate a final score for each of the context attributes. For example, the behavior modeling engine 208 assigns a weightage of 1 to each of the restrictive actions and accordingly computes the final scores as 35, 4, and 6 respectively. The behavior modeling engine 208 then generates a cumulative score for the user policy control category using the final score of each of the context attributes. In this example, the behavior modeling engine 208 generates the user policy control score as 45. A high user policy control score indicates good security behavior.

The behavior modeling engine 208 computes the user notification score, for example, based on receiving and viewing actions performed by each user on notification messages such as triggers, reminders, cues, etc. For example, the behavior modeling engine 208 determines whether the user viewed a real time security alert, a security dashboard displayed on a graphical user interface of a user device, HR and chief security officer (CSO) policy messages, etc., and scores the user's receiving and viewing actions accordingly. The notification messages provide a continuous reinforcement for the desired security behavior. The behavior modeling engine 208 assigns an intermediate score to each of the context attributes in the user notification category based on the receiving and viewing actions performed by each user on the notification messages. For example, the behavior modeling engine 208 assigns intermediate scores 8, 2, and 7 to receiving and viewing actions performed on notifications provided on a security dashboard, receiving and viewing actions performed on real-time alerts for security misbehavior, and receiving and viewing actions performed on HR notifications about serious security violations respectively. In an embodiment, the behavior modeling engine 208 assigns a weightage to each of the intermediate scores to generate a final score for each of the context attributes. For example, the behavior modeling engine 208 assigns a weightage of 1 to each of the reviewing and viewing actions and accordingly computes the final scores as 8, 2, and 7 respectively. The behavior modeling engine 208 then generates a cumulative score for the user notification category using the final score of each of the context attributes. In this example, the behavior modeling engine 208 generates the user notification score as 17. A high user policy control score indicates good security behavior.

In an embodiment, the behavior modeling engine 208 generates the security behavior score by performing a summation of the knowledge score, the user activity score, the user policy control score, and the user notification score. For purposes of illustration, the detailed description refers to the security behavior score being generated by a summation of the knowledge score, the user activity score, the user policy control score, and the user notification score; however the scope of the method and the system 200 disclosed herein is not limited to a summation computation of the security behavior score, but may be extended to multiple different computations using one or more complex formulas. In the above example, the behavior modeling engine 208 generates the security behavior score as 17.5+15+45+17=94.5. The security behavior score provides a measure of security behavior of each user in the organization. In various embodiments, different weighting and scoring methods can be used in the generation of the security behavior score.

Figure 12:
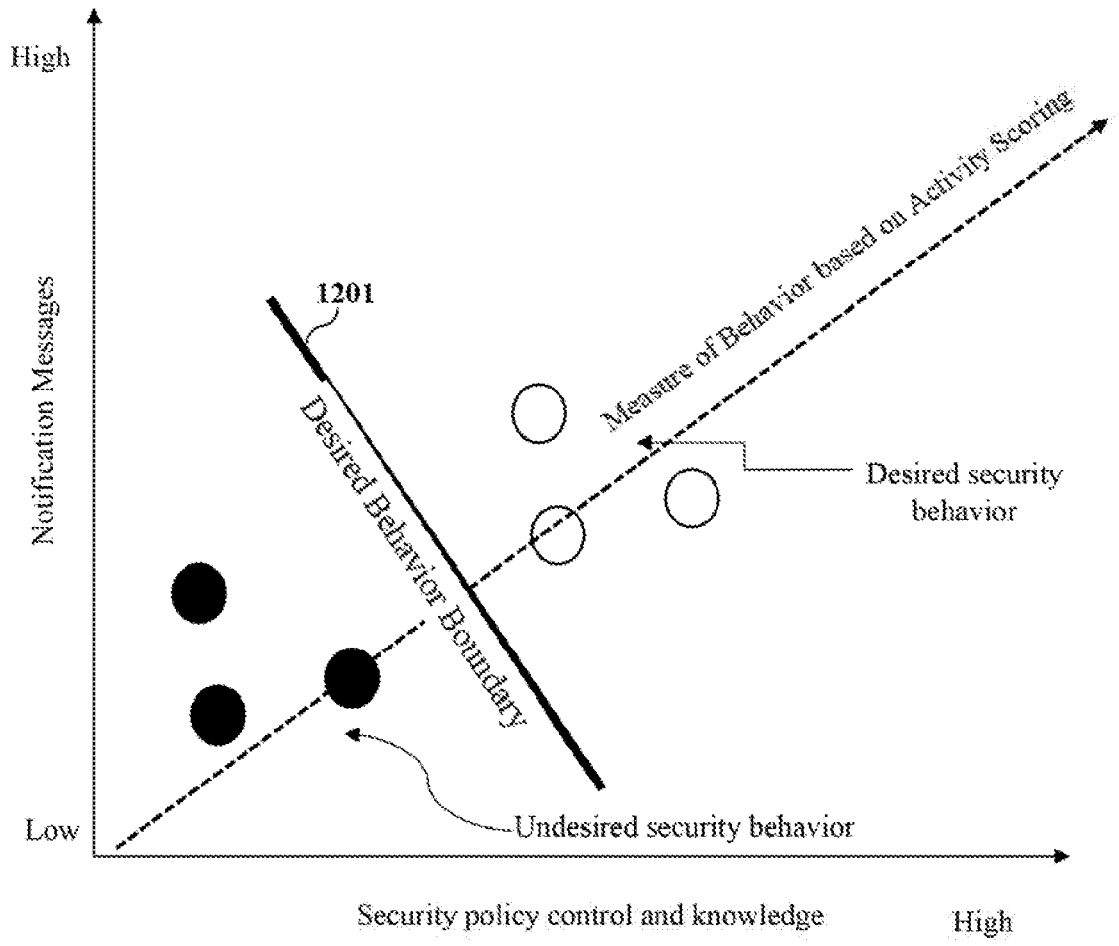
FIG. 12 exemplarily illustrates a graphical representation of the security behavior change model implemented by the behavior modeling engine.

FIG. 12 exemplarily illustrates a graphical representation of the security behavior change model implemented by the behavior modeling engine 208 shown in FIGS. 2-5 and FIG. 7. The behavior modeling engine 208 computes various scores, for example, the user policy control score, the knowledge score, the user activity score, and the user notification score to generate the security behavior score of a target user as disclosed in the detailed description of FIGS. 11A-11B. The user policy control score indicates, for example, whether the organization prevents the target user from making a mistake. The knowledge score indicates, for example, whether the target user knows how to respond to a security situation. The user activity score and the user notification score indicate, for example, whether the target user is motivated to follow guidelines. The user notification score also indicates, for example, whether the target user views the right cues to trigger a motivation. The behavior modeling engine 208 configures a desired behavior boundary 1201 as exemplarily illustrated in FIG. 12, where users with low scores that fall below the desired behavior boundary 1201 are identified as target users with poor security behavior and accordingly the control element generation engine 212 shown in FIGS. 2-5 and FIG. 7 generates and renders targeted, contextual control elements to the target users to execute a change in their security behavior and direct the security behavior to a desired state. Users with high scores that rise above the desired behavior boundary 1201 are identified as users with good security behavior that meets the desired state.

FIGS. 13A-13K exemplarily illustrate tabular representations of a security behavior scoring model implemented by the behavior modeling engine 208 shown in FIGS. 2-5 and FIG. 7, for executing a change in security behavior of a target user. Consider an example where the behavior modeling engine 208 analyzes security behavior of a target user under a predefined category or a topic such as endpoint browser version and user actions in updating the version of an endpoint browser. The behavior modeling engine 208 assigns a topic identifier (ID) to the topic and tabulates a list of topic parameters associated with the topic and measures or scores assigned to each topic parameter under the topic ID for each user identified by a user ID as exemplarily illustrated in FIG. 13A. In this example, the list of topic parameters comprises a user's topic awareness score, a historical topical action score, a notification effectiveness score, a measure of a user's response to notification messages, a measure of effectiveness of a delivery channel through which the notification messages were sent to the user, the number of days since the last notification message, a notification type, a measure of role sensitivity, and a measure of security control sensitivity. Similarly, the behavior modeling engine 208 tabulates a list of topic parameters and measures or scores assigned to each topic parameter under the topic ID for each user at an organization level as exemplarily illustrated in FIG. 13B. In this example, the list of topic parameters at the organization level comprises an awareness score, a historical topical action score, a notification effectiveness score, a measure of the organization's security control sensitivity, type of human resources (HR) actions, the number of days since the last HR action, a department's awareness score, and a department level response score.

As exemplarily illustrated in FIG. 13C, the behavior modeling engine 208 computes a score or a measure of predicted action potential of each user in relation to a topic. For example, the behavior modeling engine 208 assigns a score between 0 to 1 to a user based on an action a user is expected to perform in relation to a topic such as updating the version of the endpoint browser. The behavior modeling engine 208 assigns a score of 0 if the user is not expected to perform any action in relation to updating the version of the endpoint browser, and a score of 1 if the user is highly expected to perform the action of updating the version of the endpoint browser. Moreover, the behavior modeling engine 208 computes a topic awareness score based on an assessment of a user's awareness of the topic. The behavior modeling engine 208 performs multiple security knowledge assessments, for example, via questionnaires, tests, security awareness training modules, reactions to simulated threats, gamified assessments, etc., and computes an assessment score and accordingly computes the topic awareness score from the assessment score as exemplarily illustrated in FIG. 13D. The behavior modeling engine 208 also computes the historical topical action score for each user in relation to a topic as exemplarily illustrated in FIG. 13E. The behavior modeling engine 208 computes the historical topical action score based on actions performed by the user or by the organization to execute a change in the user's security behavior. The behavior modeling engine 208 determines action statuses, for example, no action, viewed and attempted to resolve, solved some part of the problem, solved most of the problem; but not completely, and completely resolved the problem to compute the historical topical action score.

The behavior modeling engine 208 also indicates urgency or severity of targeted, contextual notification messages, the delivery channels for delivering the targeted, contextual notification messages to a user in relation to a topic, user preferences, and administration policy preferences in a table as exemplarily illustrated in FIG. 13F. The control element generation engine 212 shown in FIGS. 2-5 and FIG. 7, in operable communication with the behavior modeling engine 208, dynamically generates and renders the targeted, contextual notification messages to a user device via one or more of the delivery channels based on the user preferences and the administration policy preferences. The behavior modeling engine 208 determines the type of contextual notification messages to be generated by the control element generation engine 212 as exemplarily illustrated in FIG. 13G. The contextual notification messages comprise, for example, general messages targeted to every user in the organization, messages with targeted topics with urgency addressed to every user in the organization, contextual notification messages targeted to a specific user, contextual notification messages with urgency targeted to a specific user, contextual notification messages targeted to a specific user with a response mandated, etc. The control element generation engine 212, in communication with the behavior modeling engine 208, determines the notification response types, for example, as 0 for a neutral response, −1 for a negative response, and +1 for a positive response as exemplarily illustrated in FIG. 13H. Based on a user's role in the organization, the control element generation engine 212, in communication with the behavior modeling engine 208, assigns a sensitivity level to the contextual notification messages, for example, as medium, high, or low as exemplarily illustrated in FIG. 13I. The control element generation engine 212, in communication with the behavior modeling engine 208, also determines the security controls, the policy settings to be configured for the security controls, and the sensitivity level to be assigned to each of the security controls for a user as exemplarily illustrated in FIG. 13J. The control element generation engine 212, in communication with the behavior modeling engine 208, also determines HR actions, for example, no actions, HR warnings, multiple warnings, serious notes regarding termination of employment, etc., that are performed in the organization to execute a change in the security behavior of the organization.

Figure 14:
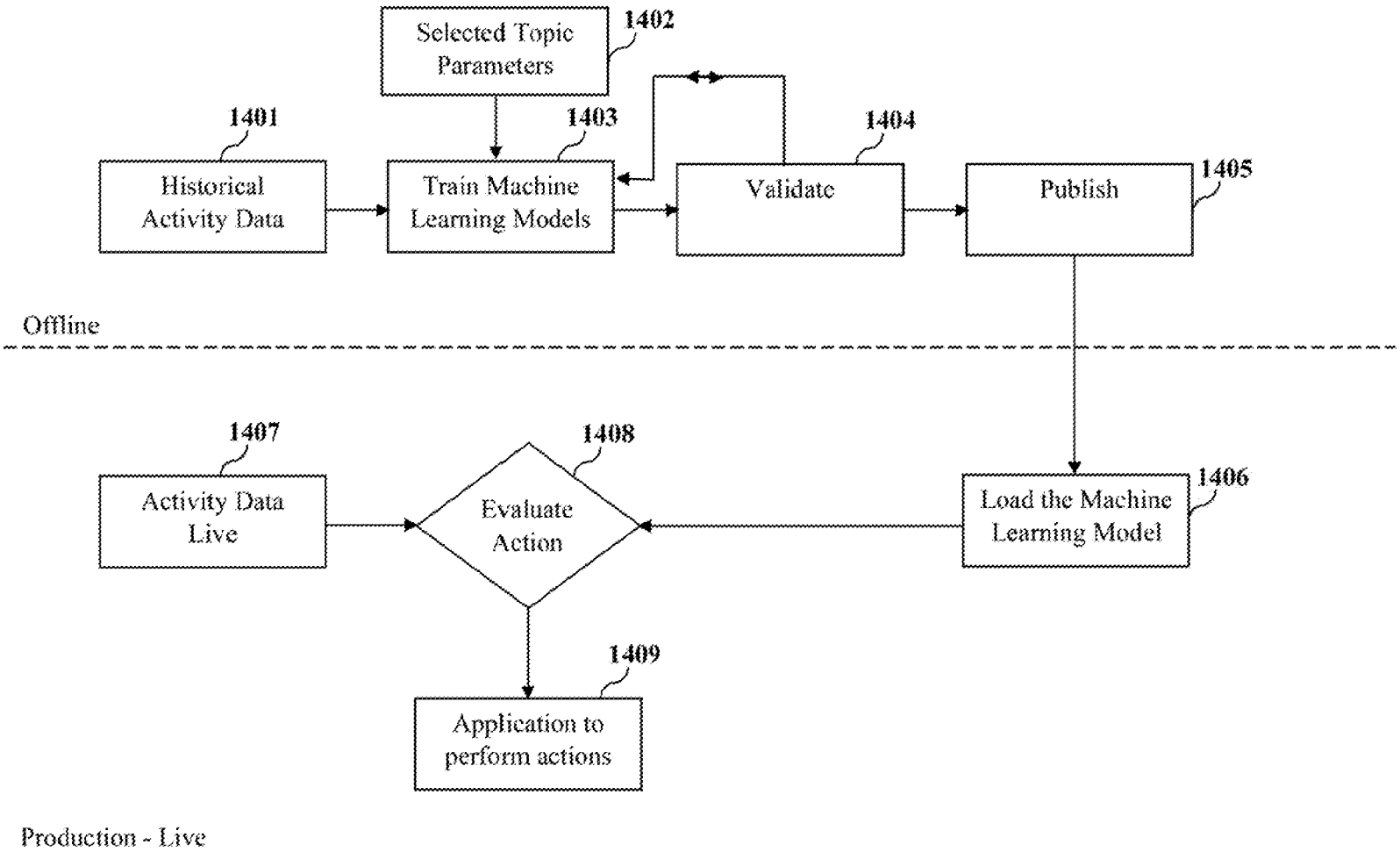
FIG. 14 exemplarily illustrates a flow diagram comprising the steps for generating a security behavior score for a target user using machine learning.

FIG. 14 exemplarily illustrates a flow diagram comprising the steps for generating a security behavior score for a target user using machine learning. In an embodiment, the behavior modeling engine 208 shown in FIGS. 2-5 and FIG. 7, executes one or more machine learning algorithms to classify groups of security behavior, generate a security behavior score, perform predictions based on planned activities, and learn after the planned activities are performed. In an offline mode, the behavior modeling engine 208 receives multiple context attributes that constitute, for example, historical activity data 1401 and selected topic parameters 1402 as disclosed in the detailed description of FIGS. 13A-13K, as inputs and executes one or more machine learning algorithms to generate and train 1403 machine learning models that define the security behavioral models for each user. The behavior modeling engine 208 validates 1404 the machine learning models using validation datasets that provide an estimate of model skills while tuning the context attributes. The behavior modeling engine 208 then publishes 1405 the validated machine learning models for use in real time. When a user performs actions on a software application or on user devices in an organization, the behavior modeling engine 208 loads 1406 the published machine learning models and receives activity data 1407 in real time. The behavior modeling engine 208 evaluates 1408 the action and facilitates generation of targeted, contextual control elements by the control element generation engine 212 shown in FIGS. 2-5 and FIG. 7. The control element generation engine 212 renders the targeted, contextual control elements comprising, for example, targeted, contextual notification messages, contextual awareness content, recommendations to change configurations of security controls, security operations, and security policies of an organization, etc., to a user device of a target user through a software application 1409 to allow the target user to perform corrective actions.

Figure 15:
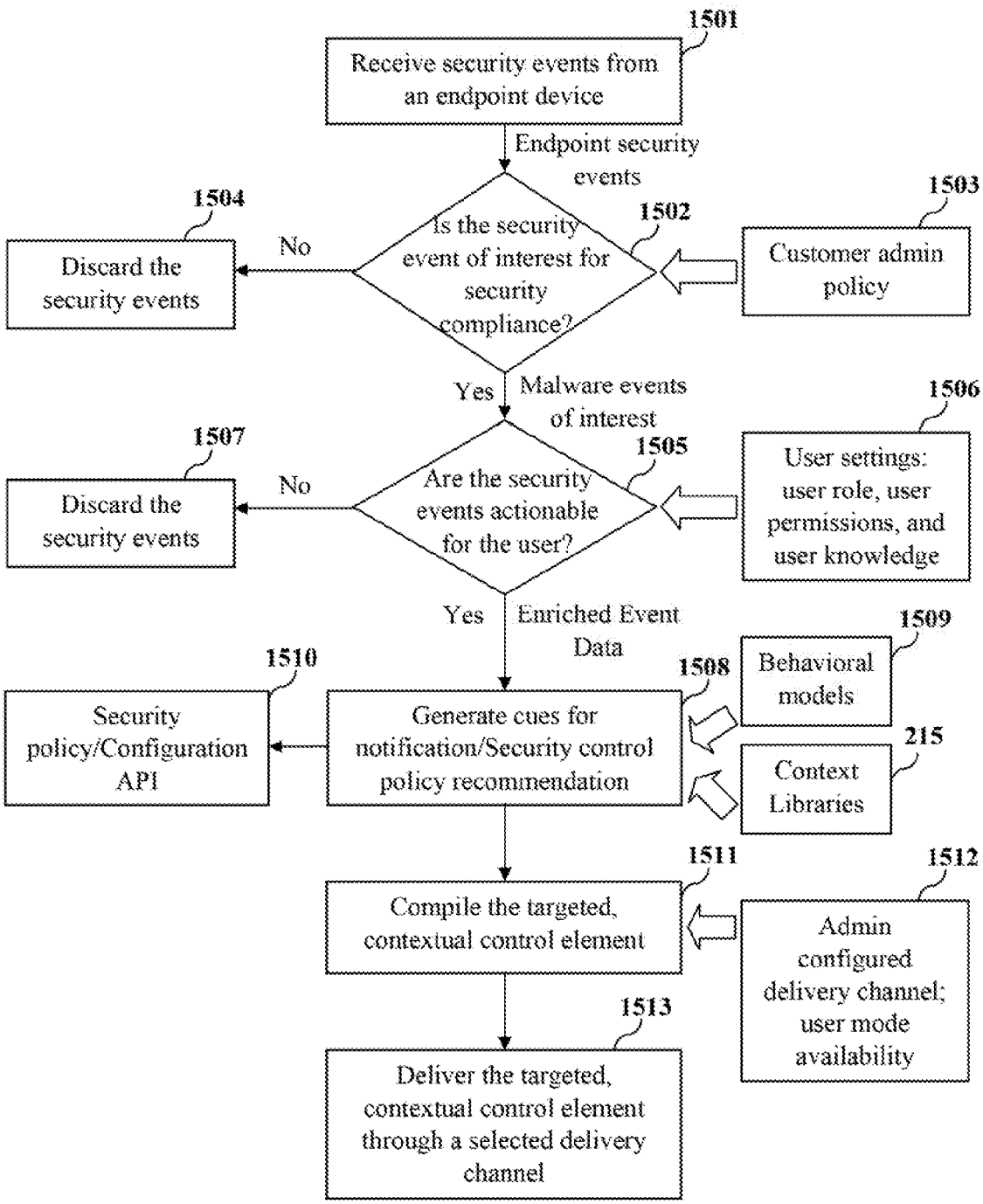
FIG. 15 exemplarily illustrates a flowchart comprising the steps for generating and delivering targeted, contextual control elements specific to a target user in an organization.

FIG. 15 exemplarily illustrates a flowchart comprising the steps for generating and delivering targeted, contextual control elements specific to a target user in an organization. Consider an example where the security behavior management system (SBMS) 303 comprising the data extraction engine 205, the behavior modeling engine 208, and the content element generation engine 212 exemplarily illustrated in FIG. 3, is implemented in an organization. In this example, the data extraction engine 205 extracts context attributes, for example, security events, from an endpoint device and transmits the security events to the behavior modeling engine 208. The behavior modeling engine 208 receives 1501 the security events and accesses a customer administration policy 1503 from a database to determine 1502 whether the security events are of interest for security compliance in the organization. If the security events are of no interest for security compliance in the organization, the behavior modeling engine 208 discards 1504 the security events. If the security events are of interest for security compliance in the organization, for example, malware events, the behavior modeling engine 208 represents the security events as malware security events and determines 1505 whether the malware security events are actionable for the user by analyzing the user's settings 1506 comprising, for example, the user's role in the organization, user permissions, the user's knowledge via questionnaires, tests, etc. If the malware security events are not actionable for the user, the behavior modeling engine 208 discards 1507 the security events. If the malware security events are actionable for the user, the behavior modeling engine 208 generates enriched event data comprising data of the security events and the user's settings 1506. The behavior modeling engine 208 transmits the enriched event data to the content element generation engine 212 for generation of targeted, contextual control elements.

The content element generation engine 212 accesses the security behavioral models 1509 generated by the behavior modeling engine 208 for the target user and the context libraries 215 for generating the targeted, contextual control elements. The content element generation engine 212 generates 1508 cues for notification and security control policy recommendations using the enriched event data, the security behavioral models 1509 of the target user, the security behavior score of the target user, and the context libraries 215. In an embodiment, the content element generation engine 212, in communication with the policy management module 219 shown in FIG. 3, dynamically changes configurations of security controls, security operations, and security policies of the organization based on the security behavioral models 1509 of the target user using the security control policy recommendations via a security policy or configuration application programming interface (API) 1510. The content element generation engine 212 further compiles 1511 the targeted, contextual control element using the enriched event data based on personalization preferences of the target user and the organization, where the personalization preferences comprise an administration (admin) configured delivery channel and user mode availability 1512. In an example, the content element generation engine 212 generates the targeted, contextual notification messages by performing dynamic personalized message compilations using, for example, message templates with user interface and static data, context attributes and security behavioral models 1509 specific to a user, personalization preferences comprising name, salutation, role based information of the user, etc., personalization preferences of the organization comprising a logo of the organization, specific messaging configured by a system administrator of the organization, etc., user preferences comprising mode and frequency of delivery selected by the user, a message mode such as a real time mode, a delayed mode, or an offline mode, a selection of delivery channels, etc. The content element generation engine 212 then delivers 1513 the targeted, contextual control element to the user device of the target user through a selected admin configured delivery channel, for example, the Slack® delivery channel, an SMS delivery channel, an email delivery channel, the Facebook® Workplace™ delivery channel, the Microsoft® Teams® messaging delivery channel, the WhatsApp® messaging delivery channel, etc. In an embodiment, the targeted, contextual control elements comprise, for example, targeted, contextual notification messages comprising one or more of preventive warnings based on internal threat vectors, preventive warnings based on external threat vectors, real-time cues and close to real-time cues to retract from prior actions to preclude further security issues, links to access contextual awareness content and facilitate execution of targeted training to the target user, etc.

FIGS. 16A-16D exemplarily illustrate a tabular representation showing targeted, contextual control elements, for example, notification messages, used for executing a change in the security behavior of a target user. The content element generation engine 212, in communication with the behavior modeling engine 208 exemplarily illustrated in FIGS. 2-5 and FIG. 7, dynamically generates and renders targeted, contextual control elements for different security events triggered by users in an organization from different event sources. The event sources comprise, for example, security products such as an endpoint security protection software on a user's endpoint device, data protection software, email protection software, calendar applications, cloud applications (apps) such as the Slack® collaboration app, etc. The security events comprise, for example, a browser being out of date and multiple malware being found on a user's endpoint device, a user attempting to share sensitive data externally, a user clicking on a phishing email, calendar events such a travel plans to a different country, using unapproved meeting applications for an office meeting, installing apps from external marketplaces in a user's workspace, etc. The content element generation engine 212 dynamically generates and renders targeted, contextual control elements, for example, real-time notification messages with preventive warnings and contextual awareness content, reward cues, punishment cues, awareness facts, and social or cultural comparisons to a user device of a target user via selected delivery channels as exemplarily illustrated in FIGS. 16A-16D.

FIG. 17 exemplarily illustrates a tabular representation of a portion of a compliance database 218 shown in FIG. 3. An organization must meet corporate and government compliance requirements to conduct business. The compliance requirements vary by country and sector. For example, the compliance requirements of the Health Insurance Portability and Accountability Act (HIPAA) of 1996 must be followed by the healthcare sector for protecting healthcare information of patients. In another example, the General Data Protection Regulation (GDPR) must be followed in relation to personal data of citizens of the European Union and the European Economic Area. In another example, the National Institute of Standards and Technology (NIST) SP800-53 R3 standards define a set of security controls that satisfy security requirements levied on information systems and organizations. In another example, the Payment Card Industry Data Security Standard (PCI DSS) provides security policies and procedures to optimize security of financial information and card transactions. Users, for example, employees of an organization must follow compliance processes and controls. The compliance mapping module 217 shown in FIG. 3, provides a mapping of compliance scenarios and security behavior, which allows an organization to assess cost implications in terms of compliance to a particular security behavior. The compliance mapping module 217 maintains the compliance database 218 for storing compliance and security controls required to meet compliance requirements, thereby providing another source of information for the dynamic generation of security behavioral models, and in turn, targeted, contextual control elements for a target user.

The compliance mapping module 217 maps control specifications identified by the security behavior management system (SBMS) configured control ID, for example, SA-EKM-103-10 and SA-EKM-103-11, to a Cloud Security Alliance (CSA) Cloud Controls Matrix (CCM) Control ID, for example, EKM-03, as exemplarily illustrated in FIG. 17. In an example, SA-EKM-103-10 refers to non-encrypted sensitive data transmission, and SA-EKM-103-1 refers to non-encrypted sensitive data stored in a user device. The EKM-03 control ID of the CSA CCM refers to a control domain associated with encryption, key management, and sensitive data protection. The control specifications identified by the EKM-03 control ID comprise, for example, policies and procedures established and supporting business processes and technical measures implemented for the use of encryption protocols for protection of sensitive data in storage devices, for example, file servers, databases, and end-user workstations, data in use, and data in transmission as per applicable legal, statutory, and regulatory compliance obligations. The control specifications identified by the EKM-03 control ID are further mapped to standard compliance requirements of, for example, NIST, PCI DSS, HIPAA, etc. The compliance mapping module 217 maps context attributes, for example, user events mapped to the SBMS configured control IDs and provides information on general control violations that happen in an organization to an administrator of the organization via a graphical user interface on the user device. For example, if a hospital clerk sends patient information to a vendor without enabling any security encryption, the compliance mapping module 217 detects a violation of data protection with reference to the HIPAA compliance requirements and triggers the control element generation engine 212 shown in FIGS. 2-5 and FIG. 7, to generate and render contextual awareness content to the hospital clerk to remediate the situation.

Figure 18:
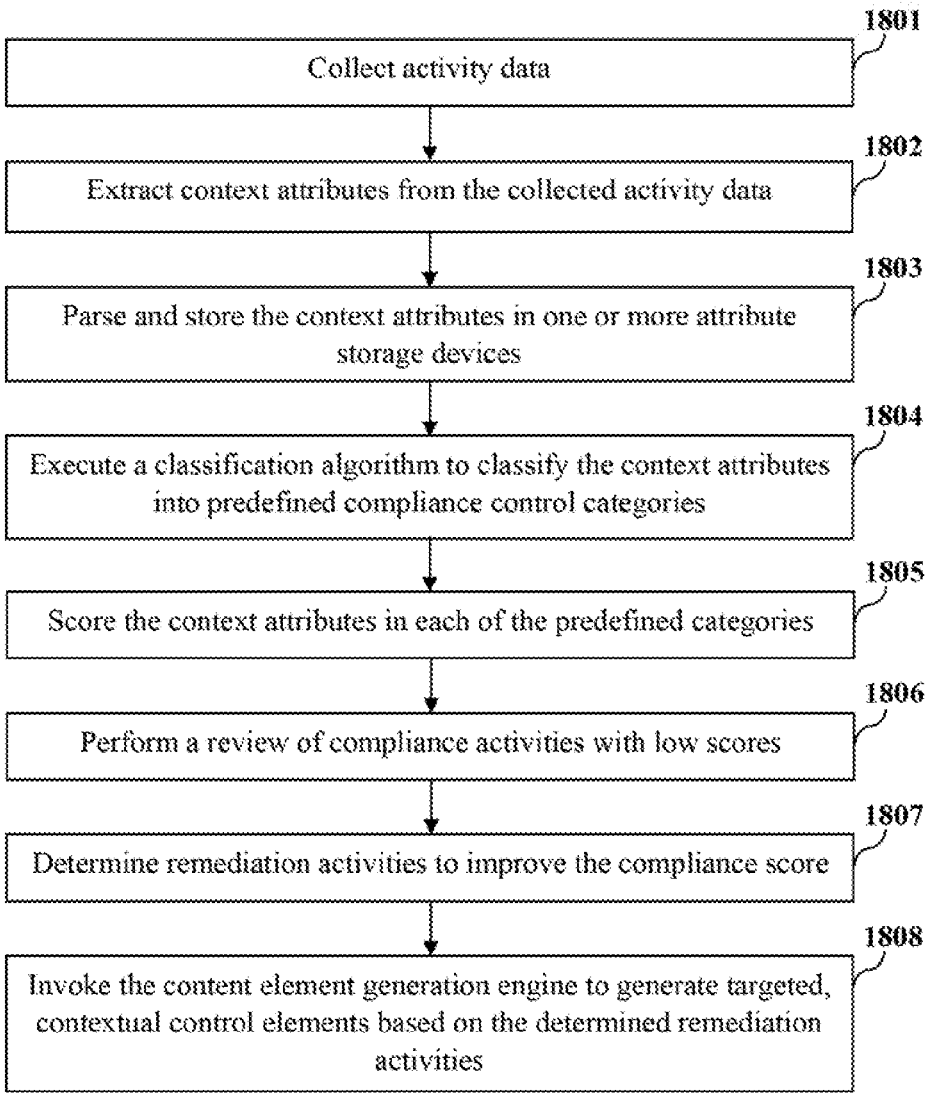
FIG. 18 exemplarily illustrates a flowchart comprising the steps for regulating security compliance in an organization.

FIG. 18 exemplarily illustrates a flowchart comprising the steps for regulating security compliance in an organization. The data extraction engine 205 shown in FIGS. 2-5, collects 1801 activity data and extracts 1802 context attributes comprising activity telemetry from the collected activity data. The data extraction engine 205 parses and stores 1803 the context attributes in one or more attribute storage devices, for example, 205a, 205c, and 205e shown in FIG. 2. The data extraction engine 205 transmits the context attributes to the behavior modeling engine 208 shown in FIGS. 2-5 and FIG. 7. In an embodiment, the behavior modeling engine 208 executes 1804 a classification algorithm to classify the context attributes into predefined compliance control categories. For example, the behavior modeling engine 208 outputs legal information from a web application or a website into predefined compliance control categories, for example, a privacy category, a terms of use (ToU) category, an end-user license agreement (EULA) category, an end-user subscription agreement (EUSA) category, etc. The behavior modeling engine 208 then validates and scores 1805 each of the context attributes in each of the predefined compliance control categories and generates a compliance score. Based on the scoring of each of the context attributes, the behavior modeling engine 208 performs 1806 a review of compliance activities with a low compliance score. The compliance mapping module 217, in communication with the compliance database 218, determines 1807 remediation activities to improve the compliance score. The compliance mapping module 217 then invokes 1808 the content element generation engine 212 shown in FIGS. 2-5 and FIG. 7, to generate targeted, contextual control elements, in communication with the behavior modeling engine 208, based on the determined remediation activities.

In an embodiment, the compliance mapping module 217 indicates a rating of an application, for example, via a visual representation of colors, for example, red, yellow, and green for privacy and compliance. The compliance mapping module 217, in communication with the behavior modeling engine 208 and the compliance database 218 shown in FIG. 3, analyzes compliance conditions and privacy details of multiple cloud applications (apps) and other apps to determine whether the apps meet compliance regulations or privacy standards. The rating of an application defines a reputation of the application, herein referred to as "app reputation". App reputation measures a risk associated with an app. The compliance mapping module 217, in communication with the behavior modeling engine 208, determines the app reputation based on multiple context attributes about the app. The app reputation is used to coach a target user about the risk associated with an app. In an example, if a user installs an app from an app store, the control element generation engine 212 notifies the user that the app installed is riskier than other apps in the organization. This notification allows the user to either re-evaluate the app or completely remove the app from the user device. In an example, if the behavior modeling engine 208 determines that more than 3000 employees are using an application that has low compliance and privacy ratings, the control element generation engine 212, in communication with the behavior modeling engine 208, generates a targeted, contextual notification message with a recommendation of another application with positive compliance and privacy ratings. The control element generation engine 212 generates and renders a targeted, contextual notification message containing the rating of an app, for example, as "Did you check how safe this app is? Here is the rating and security information of the app." to a user device of a target user via a collaboration app message.

FIG. 19A exemplarily illustrates a screenshot of a message configuration screen 1901 rendered by the security behavior management system (SBMS) 303 shown in FIG. 3, for allowing an administrator to configure a targeted, contextual notification message based on personalization preferences of an organization. The SBMS 303 renders the message configuration screen 1901 on a graphical user interface (GUI) 307a of the display unit 307 shown in FIG. 3. The message configuration screen 1901 allows the administrator to configure a notification message comprising, for example, contextual awareness content, a link to access a training module, etc., as exemplarily illustrated in FIG. 19A.

FIGS. 19B-19D exemplarily illustrate different targeted, contextual notification messages generated by the control element generation engine 212 shown in FIGS. 2-5 and FIG. 7, for executing a change in security behavior of an organization. FIG. 19B exemplarily illustrates a contextual notification message 1902 comprising warnings and actions required, for example, updating of a version of an operating system on an endpoint device. The contextual notification message 1902 further comprises instructions for performing the actions and links to access additional instructions for performing the actions. In another example, when a user logs into an application, the control element generation engine 212 renders a contextual notification message 1903 instructing the user about an administration policy, for example, a policy for enabling multi-factor authentication to secure the login as exemplarily illustrated in FIG. 19C. The contextual notification message 1903 also includes user interface elements, for example, click buttons or links, that allow the user to instantly enable multifactor authentication or obtain additional information on multifactor authentication. In another example, if a user shares sensitive information to other users via a collaboration application, the control element generation engine 212 renders a contextual notification message 1904 indicating to the user that sensitive information as per the organization's rules was shared by the user, and renders user interface elements, for example, click buttons or links, that allow the user to tag the sensitive information as appropriate, delete the sensitive information, and obtain contextual awareness content about sharing sensitive information as exemplarily illustrated in FIG. 19D.

Figure 20:
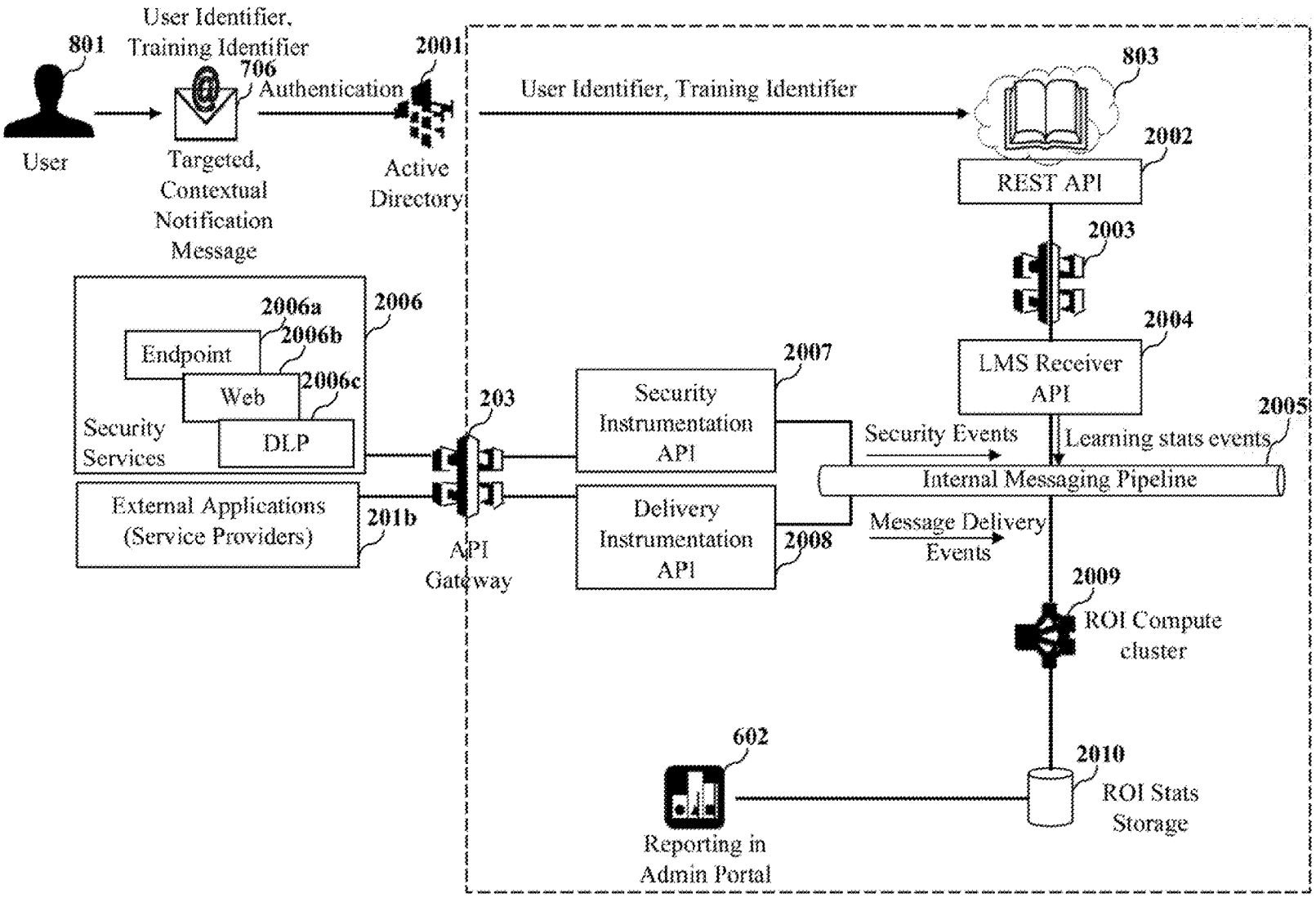
FIG. 20 exemplarily illustrates system components involved in tracking user actions performed in response to targeted, contextual control elements and reporting security risks associated with target users, security behavior patterns, security behavior trends, and a correlation between the security risks and security compliance in an organization associated with the target users to an administration portal.

FIG. 20 exemplarily illustrates system components involved in tracking user actions performed in response to targeted, contextual control elements and reporting security risks associated with target users, security behavior patterns, security behavior trends, and a correlation between the security risks and security compliance in an organization associated with the target users to an administrator (admin) portal 602. On receiving a targeted, contextual control element, for example, a target, contextual notification message 706 from the control element generation engine 212 shown in FIGS. 2-5 and FIG. 7, on an endpoint device of an organization, a target user 802 may click on a link provided in the target, contextual notification message 706 to access contextual awareness content and facilitate execution of targeted training. In an embodiment, the targeted, contextual notification message 706 provides access to the contextual awareness content through a cloud-based learning management system (LMS) 803 via an active directory 2001. The active directory 2001 manages permissions and access to networked resources, for example, the LMS 803. The active directory 2001 authenticates the target user 802 and transmits a user identifier and a training identifier that identifies the contextual awareness content, to the LMS 803. The LMS 803 tracks the training and actions performed by the target user 802 on the contextual awareness content and transmits learning statistics events to an internal messaging pipeline 2005 via a representational state transfer (REST) application programming interface (API) 2002 of the LMS 803, an API gateway 2003, and an LMS receiver API 2004. In an embodiment, the security behavior management system (SBMS) 303 shown in FIG. 3, implements a security instrumentation API 2007 and a delivery instrumentation API 2008 for transmitting security events and message delivery events respectively, from security service applications 2006 and the external applications 201b via an API gateway 203 to the internal messaging pipeline 2005. The security service applications 2006 provide, for example, endpoint security services 2006a, web services 2006b, and data loss prevention (DLP) 2006c services. The internal messaging pipeline 2005 transmits the learning statistics events, the security events, and the message delivery events to a return on investment (ROI) compute cluster 2009. The ROI compute cluster 2009, in communication with the reporting module 220 of the SBMS 303 shown in FIG. 3, generates ROI reports by processing the learning statistics events, the security events, and the message delivery events and stores the ROI reports in an ROI statistics storage device 2010. A system administrator can retrieve the ROI reports from the ROI statistics storage device 2010 and view the ROI reports in the admin portal 602. Through the ROI reports, the reporting module 220 provides visibility and reports, for example, behavior patterns, number of trainings completed, risky users, top violating users, and how security risks are changing over time to obtain a clear measured visibility in terms of how security is improving in the organization based on goals defined by the organization.

The method and the system 200 exemplarily illustrated in FIGS. 2-5, implement one or more specific computer programs for contextually managing and executing a change in security behavior of a target user. The method and the system 200 disclosed herein improve the functionality of a computer and provide an improvement in cybersecurity, behavioral analytics and messaging technology related to contextually managing and executing a change in security behavior of a target user as follows: On implementing the method disclosed herein, the data extraction engine 205 extracts multiple context attributes from multiple external applications 201 via the API system 202 shown in FIGS. 2-3, and multiple data acquisition sources, while the behavior modeling engine 208 dynamically generates one or more security behavioral models for each of multiple users based on behavior modeling criteria derived from the context attributes. Moreover, the behavior modeling engine 208 dynamically generates a security behavior score for each of the users by scoring a selection of one or more of the context attributes from one or more security behavioral models of each of the users. Then, the control element generation engine 212, through the use of separate and autonomous computer programs, dynamically generates multiple targeted, contextual control elements specific to a target user identified from among the users using the security behavioral models, the security behavior score, and one or more context libraries 215 shown in FIG. 3, and dynamically renders one or more of the targeted, contextual control elements on a user device of the target user through one or more of multiple delivery channels for executing a change in the security behavior of the target user. Furthermore, the policy management module 219 shown in FIG. 3, dynamically generates policy management recommendations configured to change configurations of security controls, security operations, and security policies of an organization associated with target users based on one or more security behavioral models of each of the users using the dynamically generated targeted, contextual control elements and a change in security risks of the organization incurred due to user actions performed in response to the targeted, contextual control elements.

The focus of the method and the system 200 disclosed herein is on an improvement to cybersecurity, behavioral analytics and messaging technology and computer functionalities for contextually managing and executing a change in security behavior of a target user, and not on tasks for which a generic computer is used in its ordinary capacity. Rather, the method and the system 200 disclosed herein are directed to a specific improvement to the way processors in the system 200 operate, embodied in, for example, extracting multiple context attributes from multiple external applications 201 via the API system 202 and multiple data acquisition sources; dynamically generating one or more security behavioral models for each of multiple users based on behavior modeling criteria derived from the context attributes; dynamically generating a security behavior score for each of the users; dynamically generating multiple targeted, contextual control elements specific to a target user using the security behavioral models, the security behavior score, and one or more context libraries 215; and dynamically rendering one or more of the targeted, contextual control elements on a user device of the target user through one or more of multiple delivery channels for executing a change in the security behavior of the target user.

In the method disclosed herein, the design and the flow of data and interactions between the external applications 201, the API system 202, and the SBMS 303 are deliberate, designed, and directed. The interactions between the external applications 201, the API system 202, and the SBMS 303 allow the system 200 to contextually manage and execute a change in security behavior of a target user. The steps performed by the SBMS 303 disclosed above require eight or more separate computer programs and subprograms, the execution of which cannot be performed by a person using a generic computer with a generic program. The steps performed by the system 200 disclosed above are tangible, provide useful results, and are not abstract. The hardware and software implementation of the system 200 disclosed herein comprising the API system 202, the SBMS 303, and one or more processors, is an improvement in computer related, cybersecurity, behavioral analytics and messaging technology. The method and the system 200 disclosed herein can be utilized, for example, by security companies, security awareness companies, and cyber insurance companies to mitigate security risks and improve their security posture.

Figure 21A:
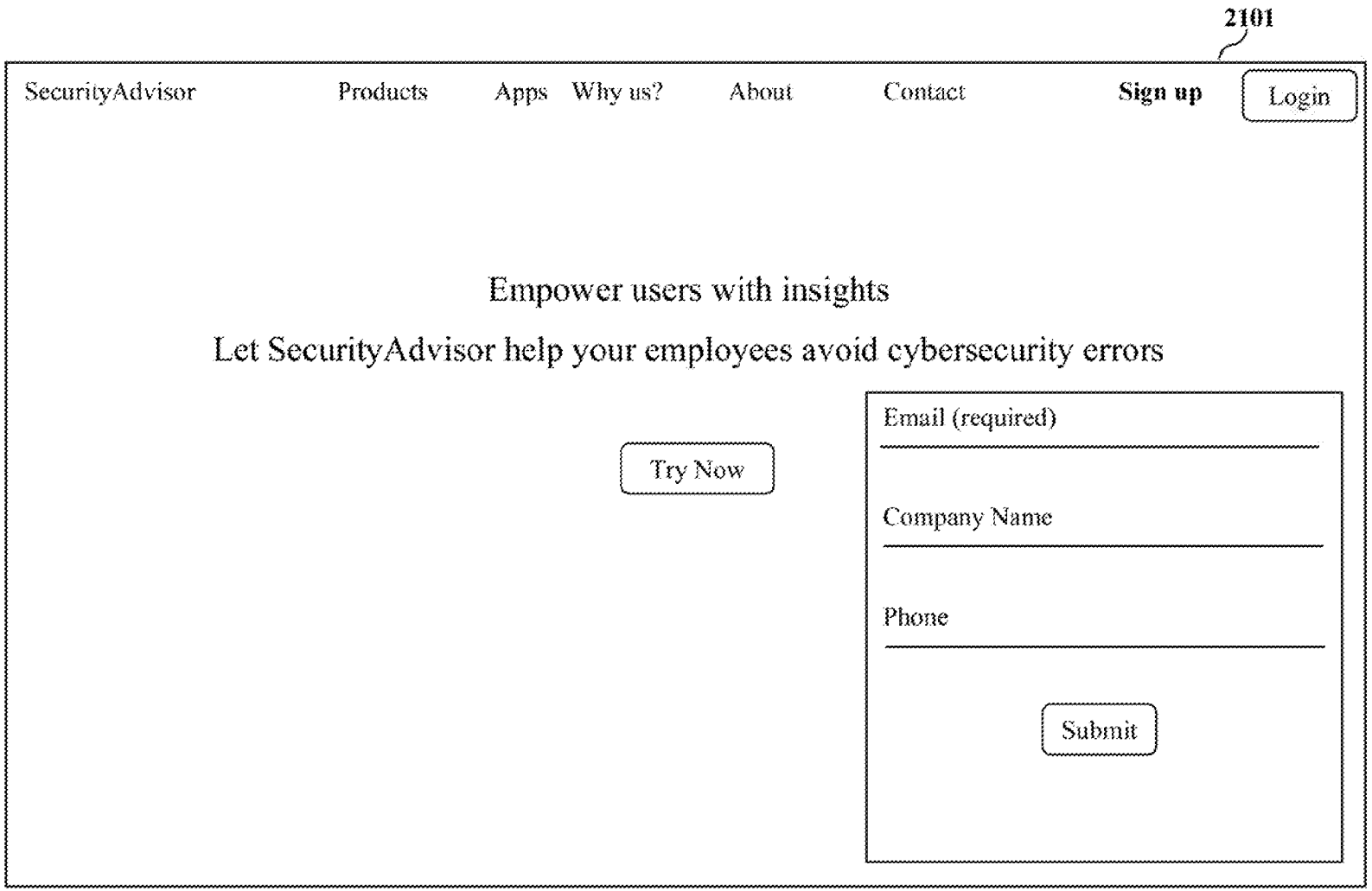
FIGS. 21A-21T exemplarily illustrate screenshots of graphical user interfaces rendered by the system for contextually managing and executing a change in security behavior of an organization.
Figure 21C:
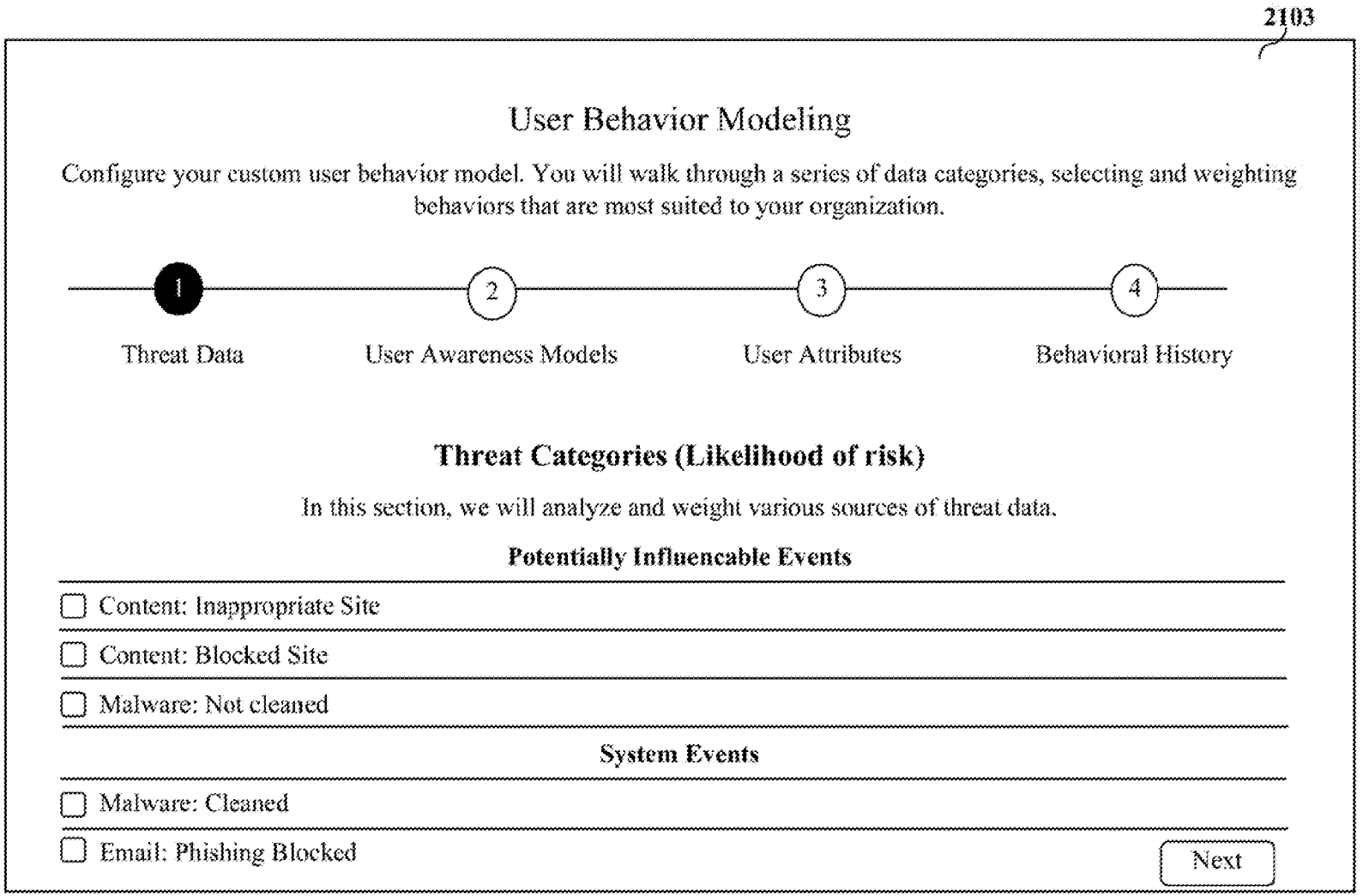
Figure 21E:
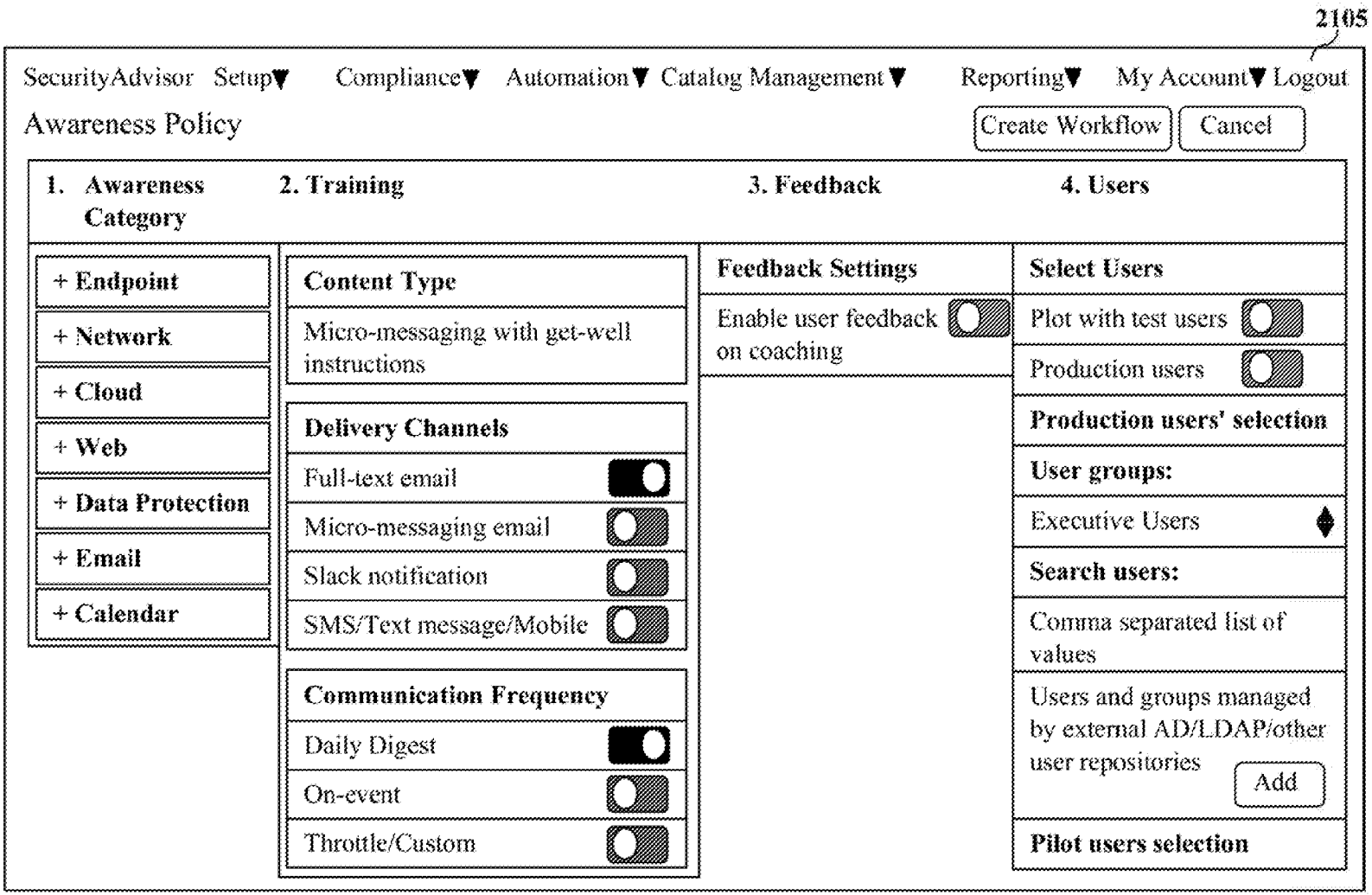
Figure 21H:
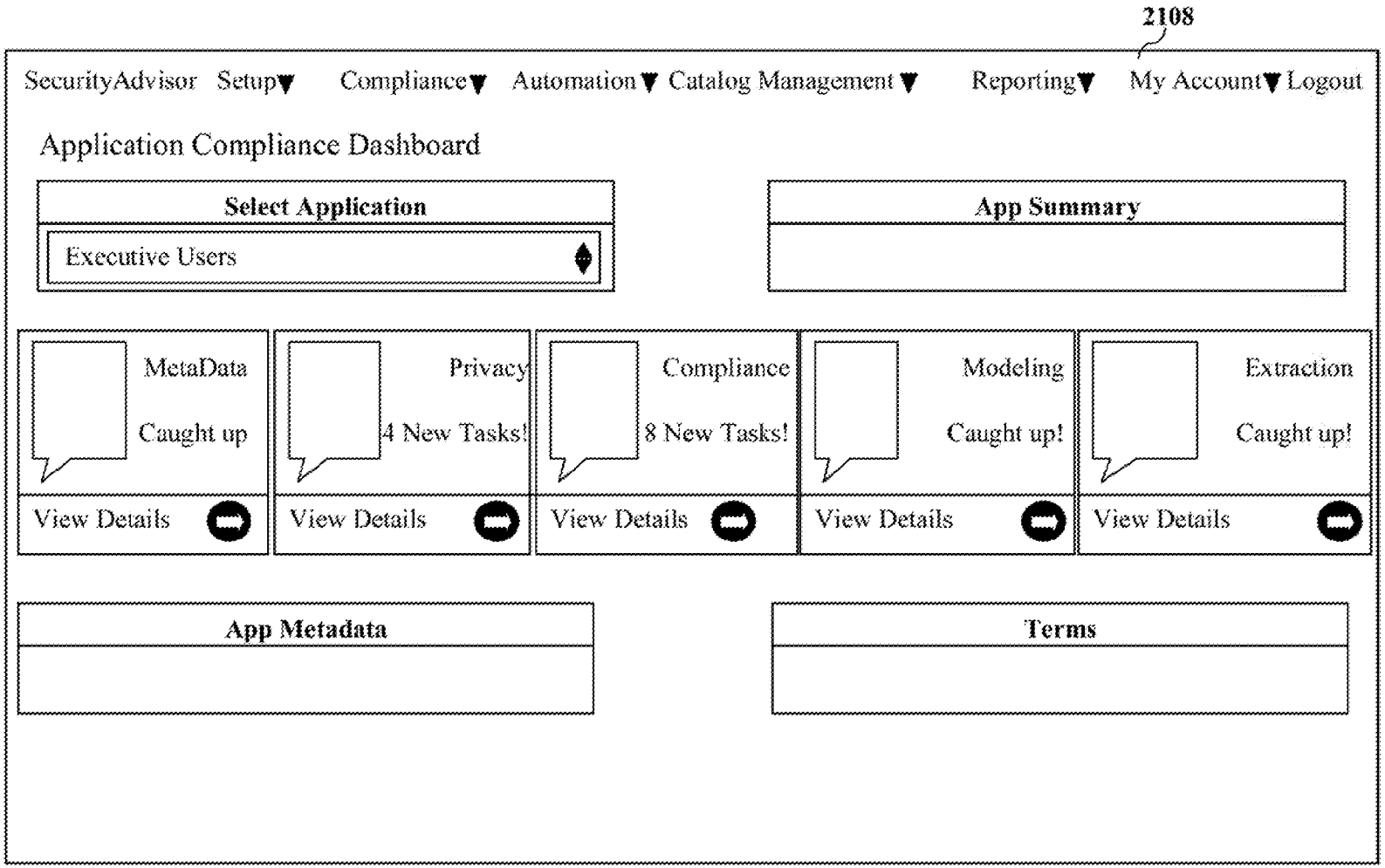
Figure 211:
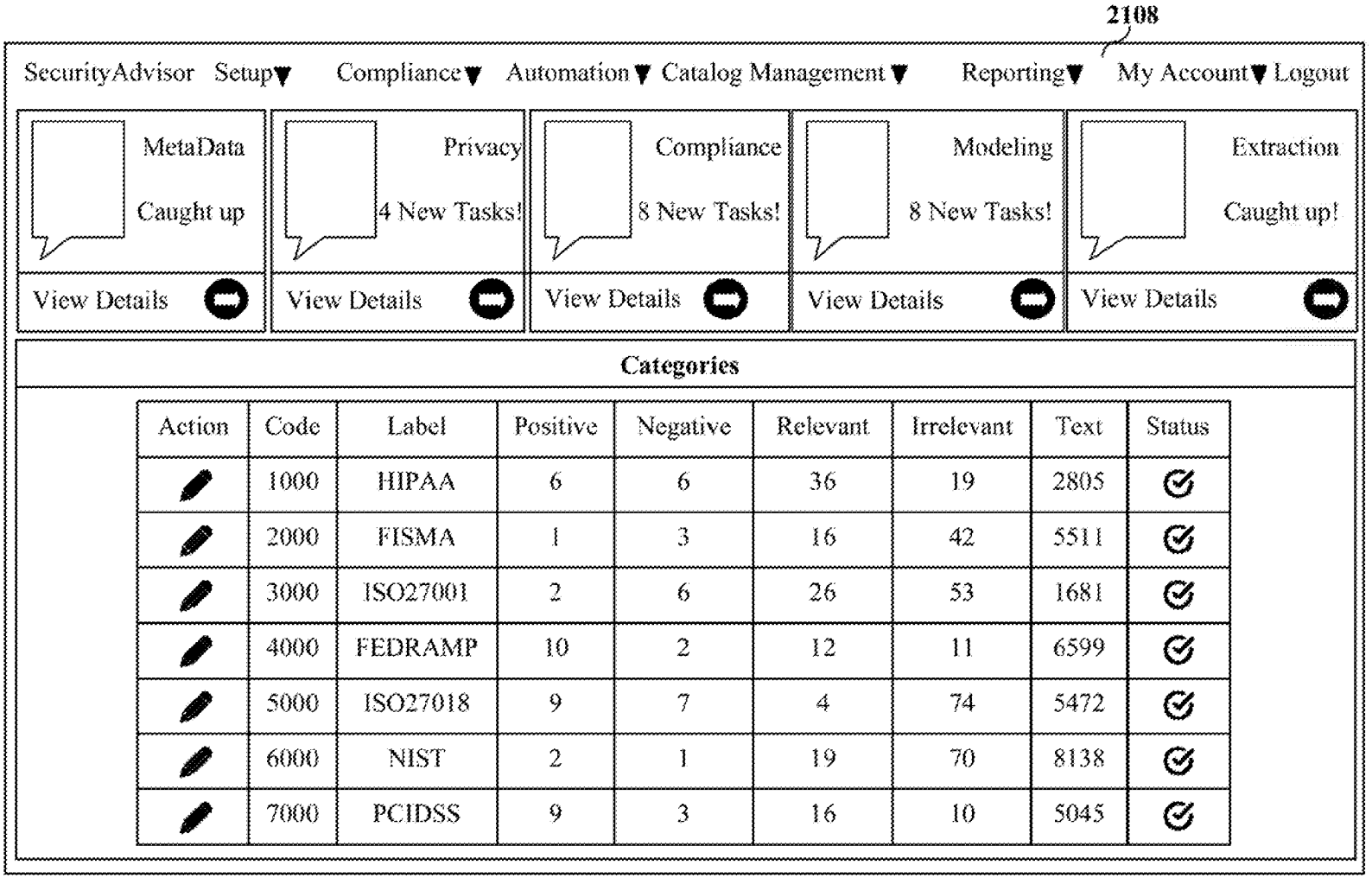
Figure 21J:
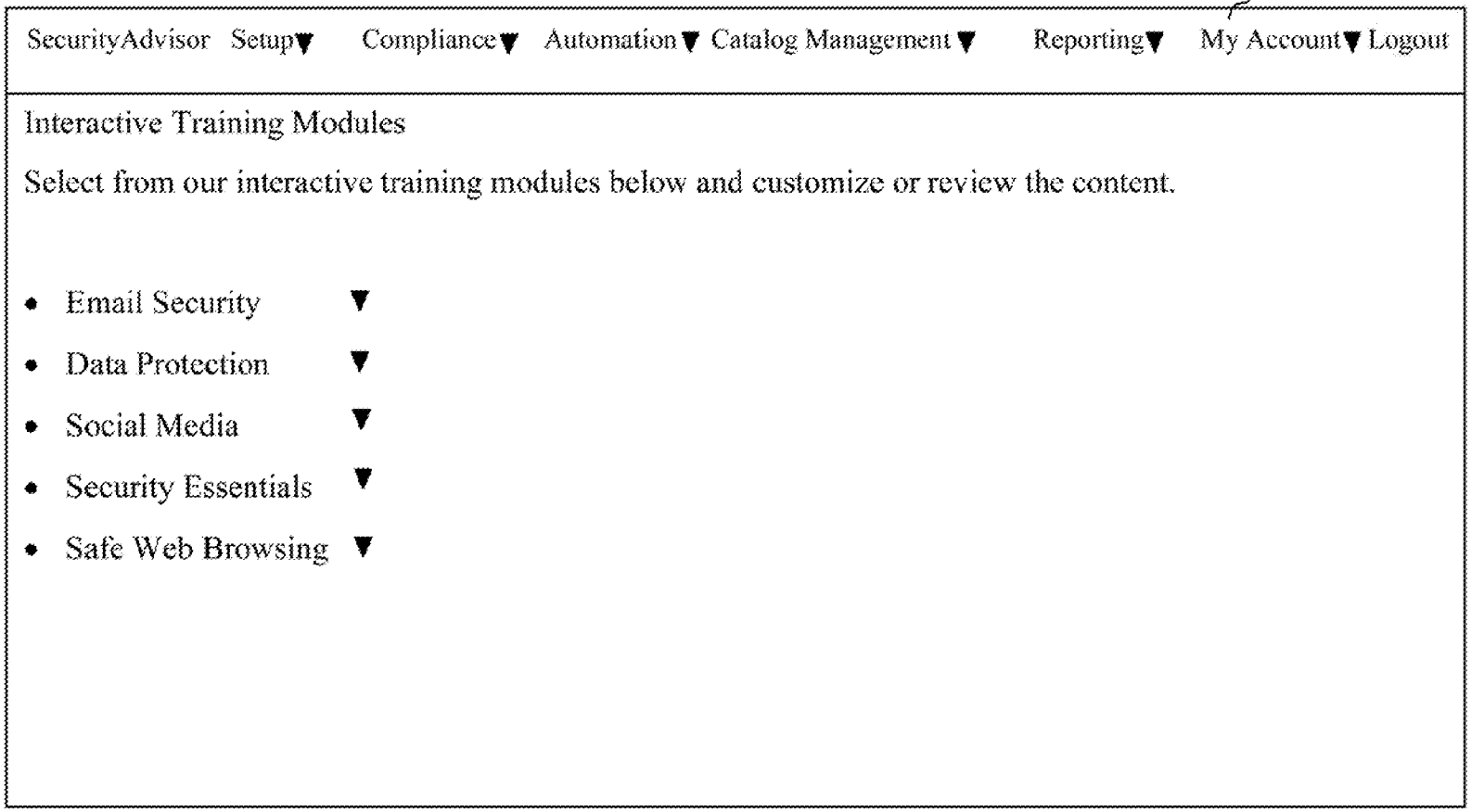
Figure 21K:
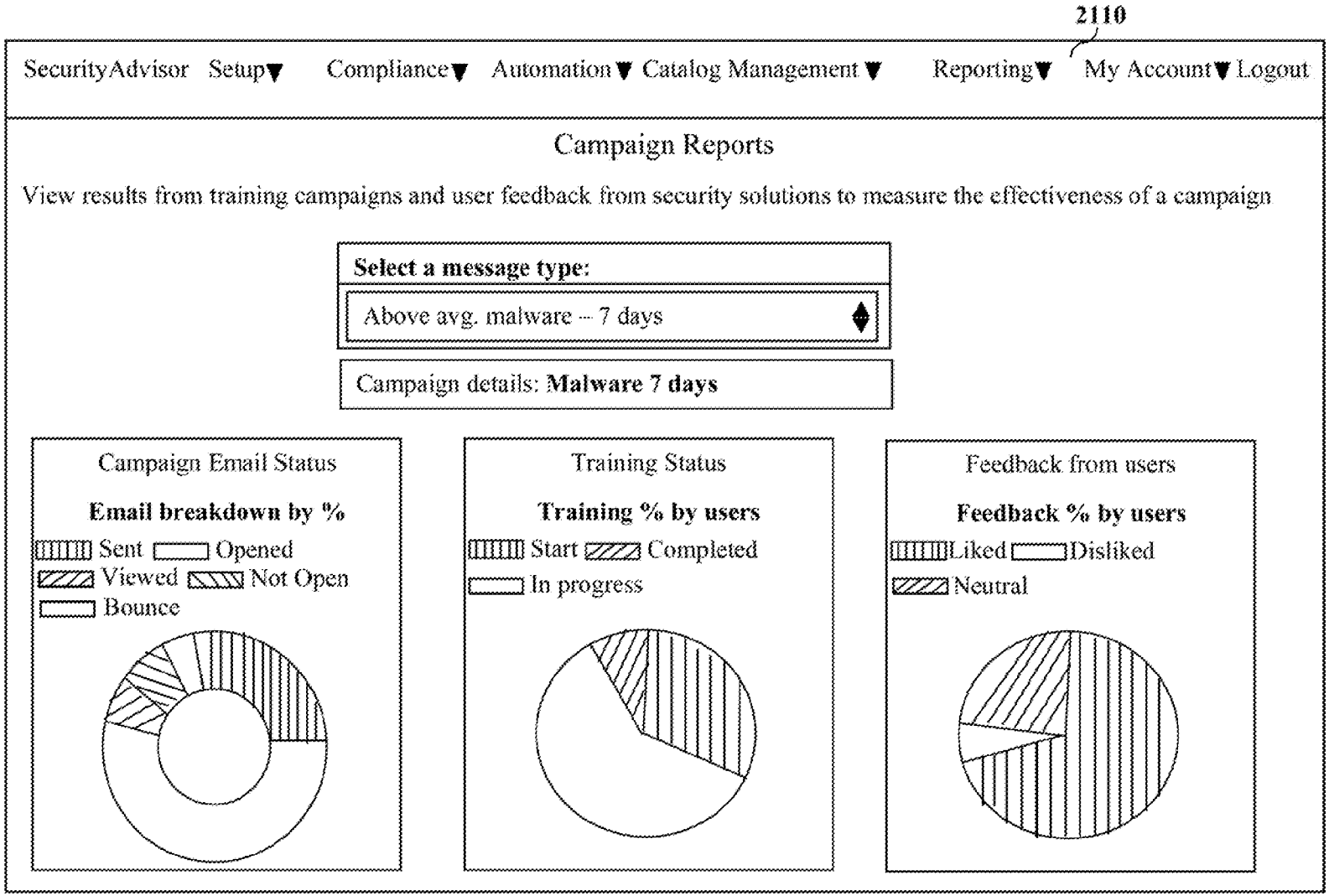
Figure 21L:
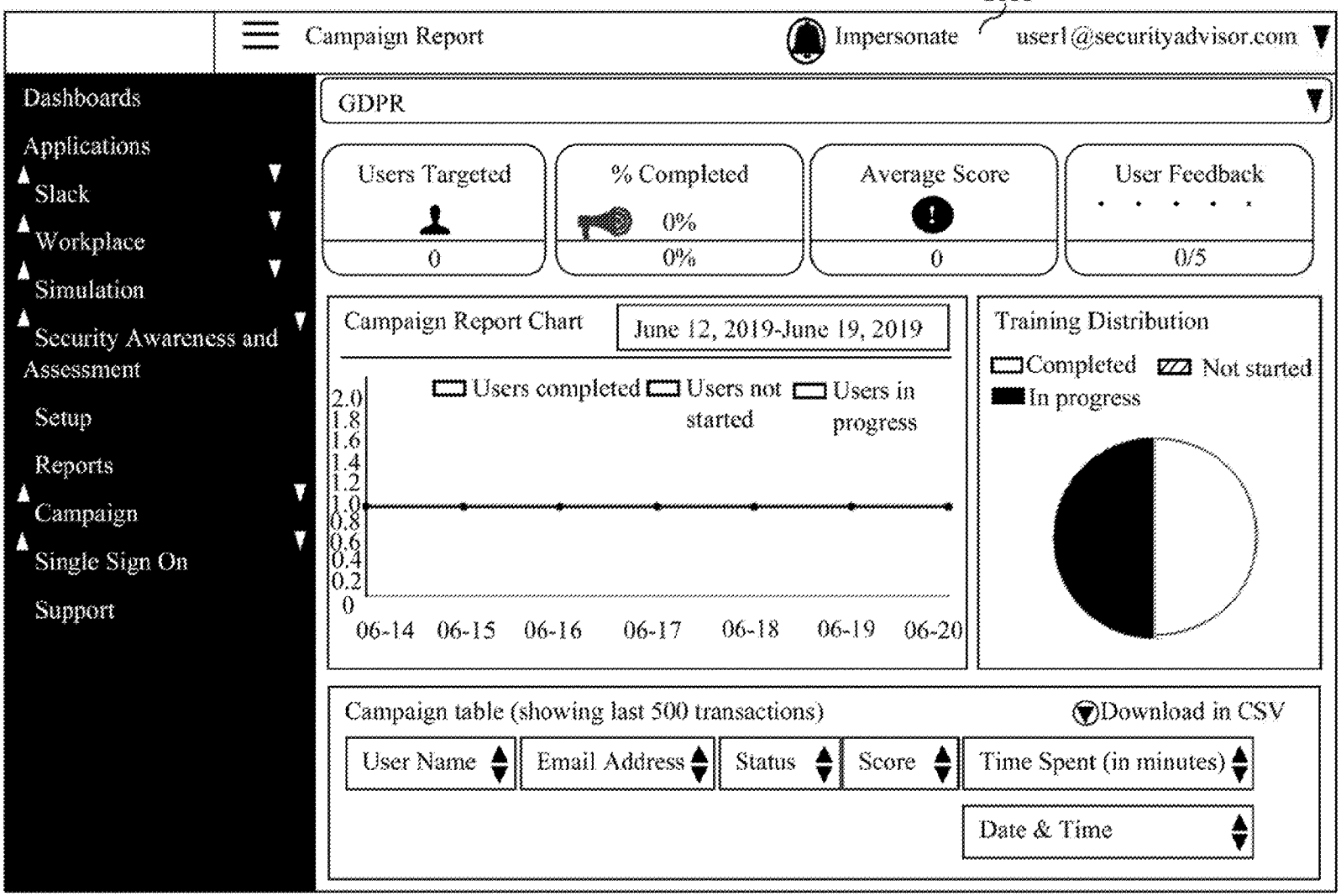
Figure 21M:
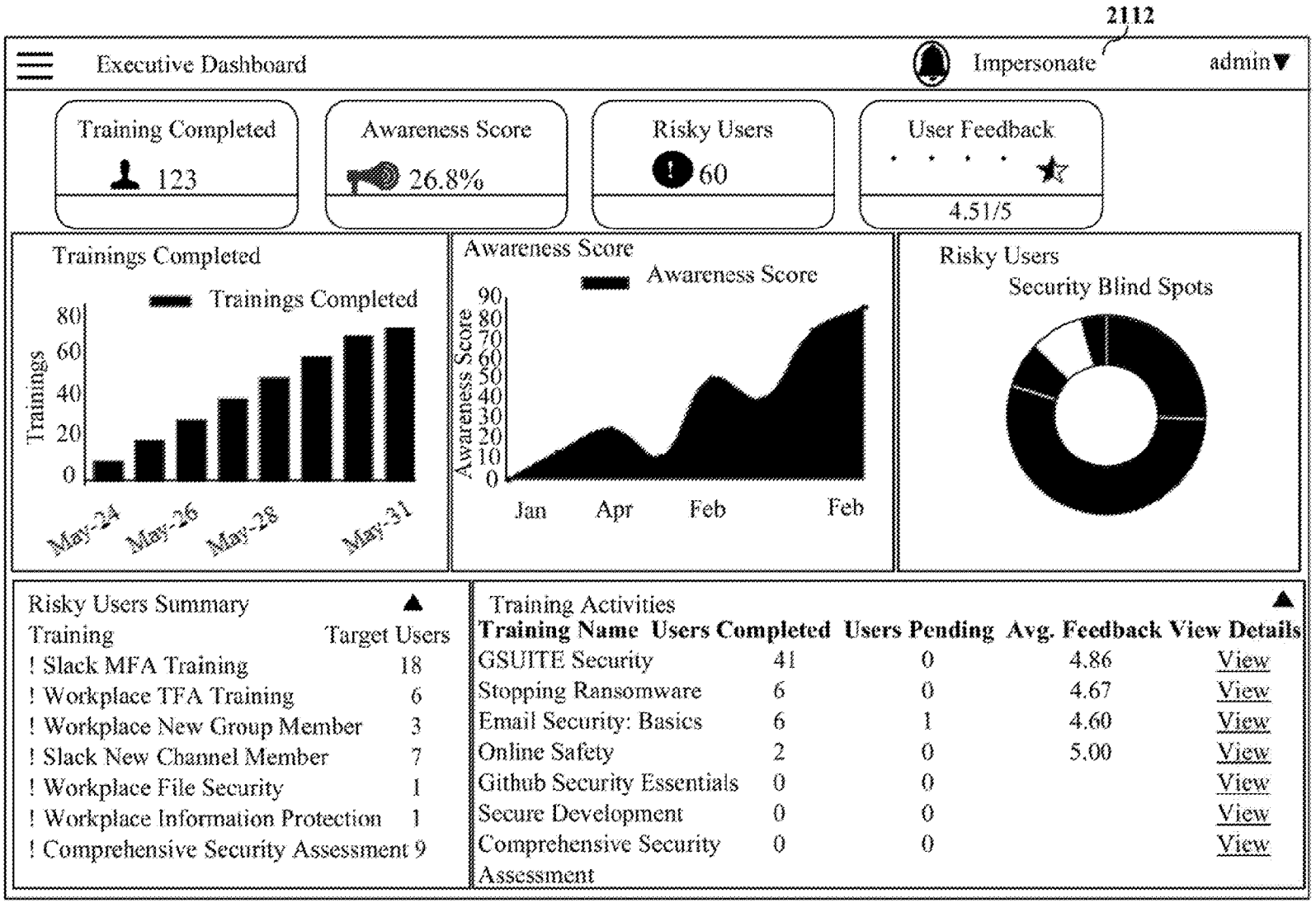
Figure 21N:
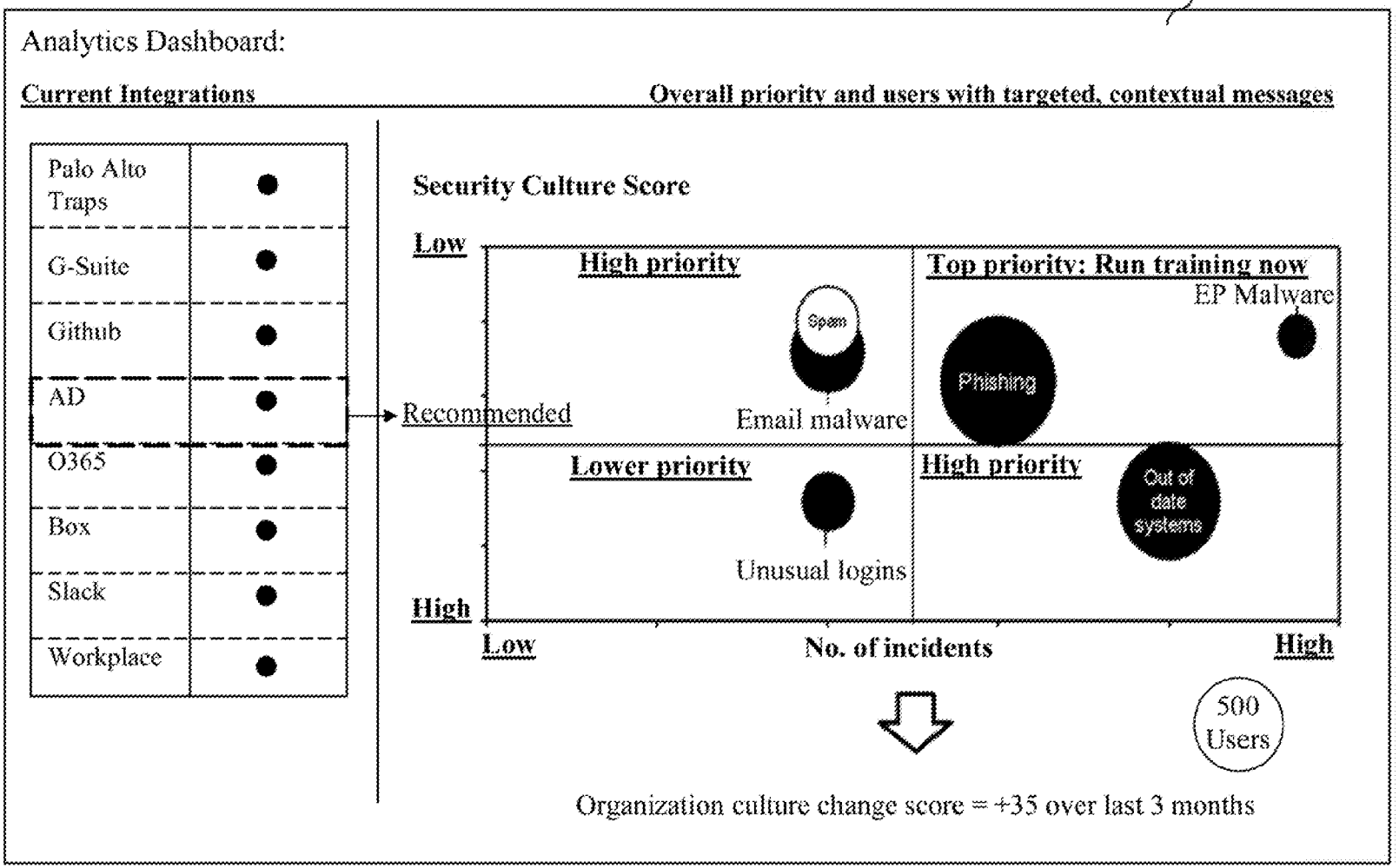
Figure 21O:
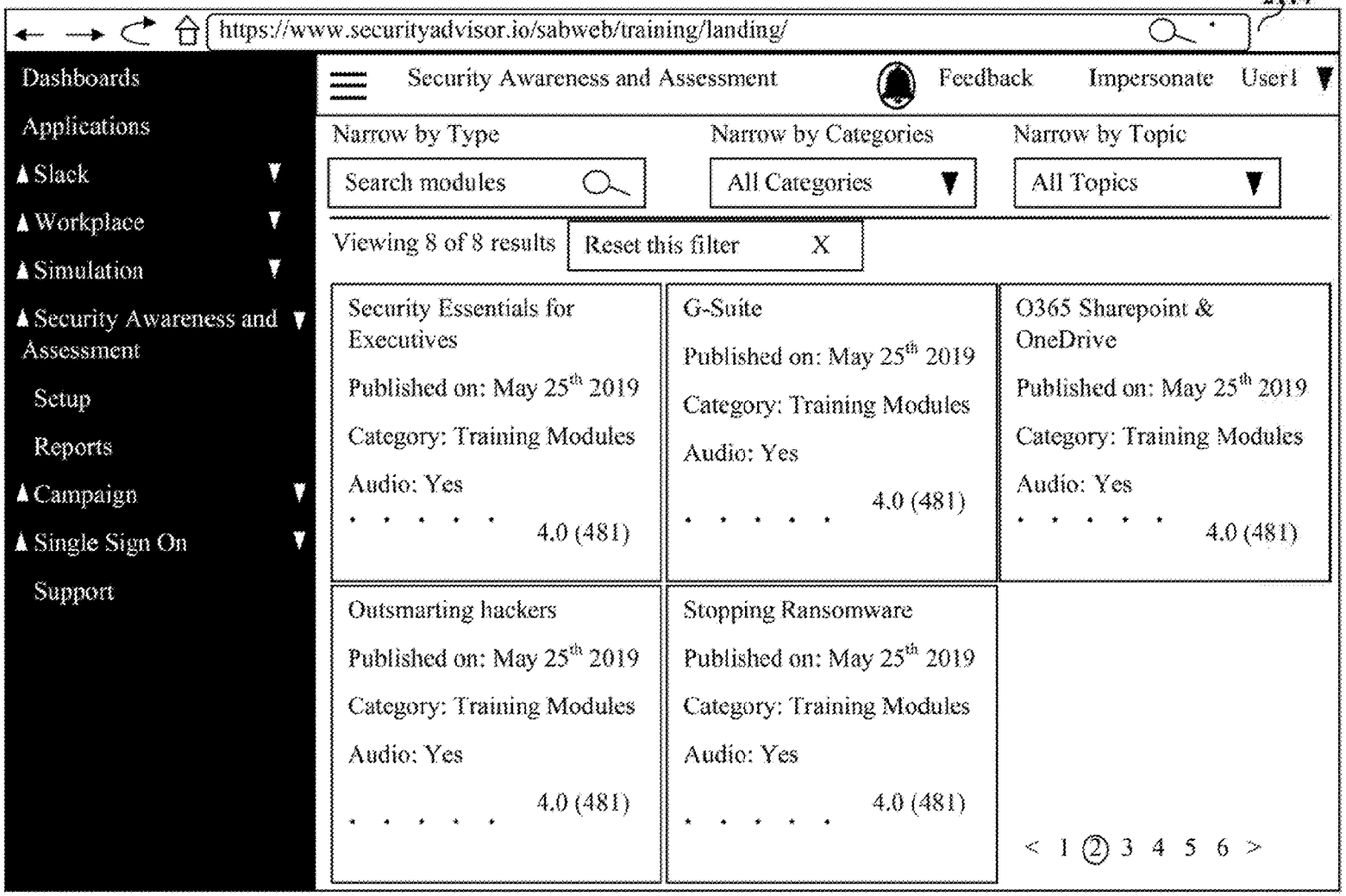
Figure 21P:
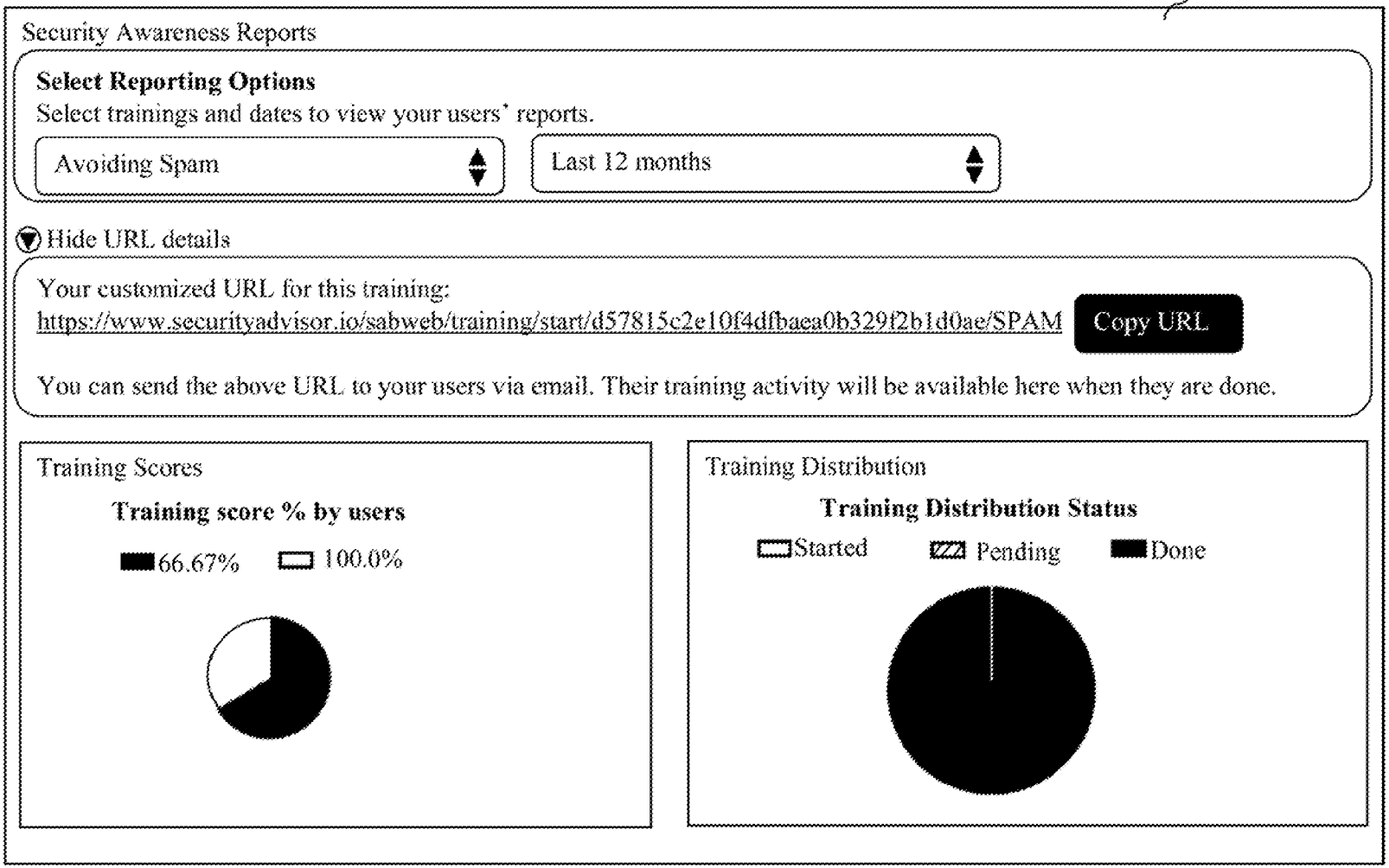
Figure 21Q:
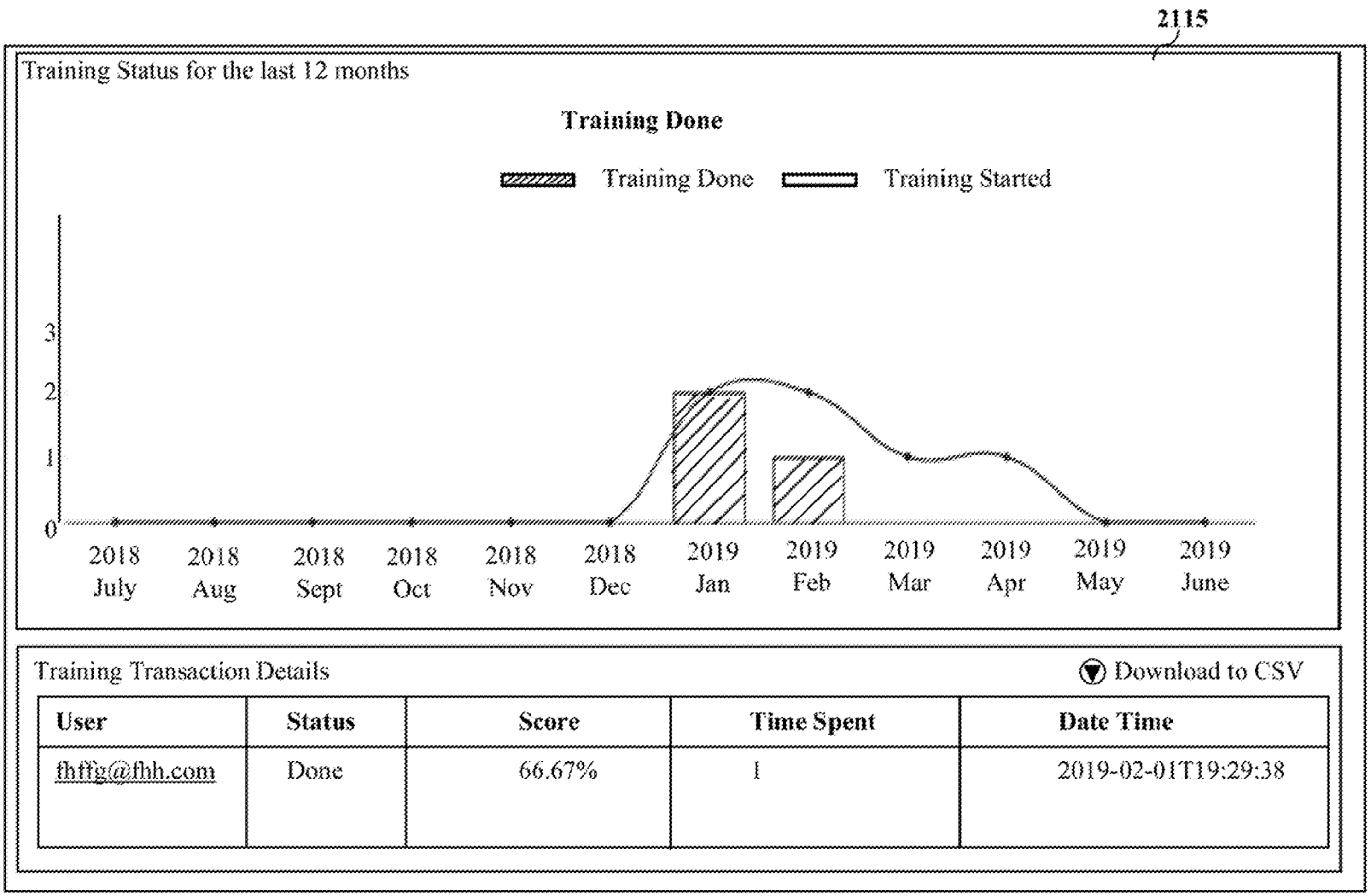
Figure 21R:
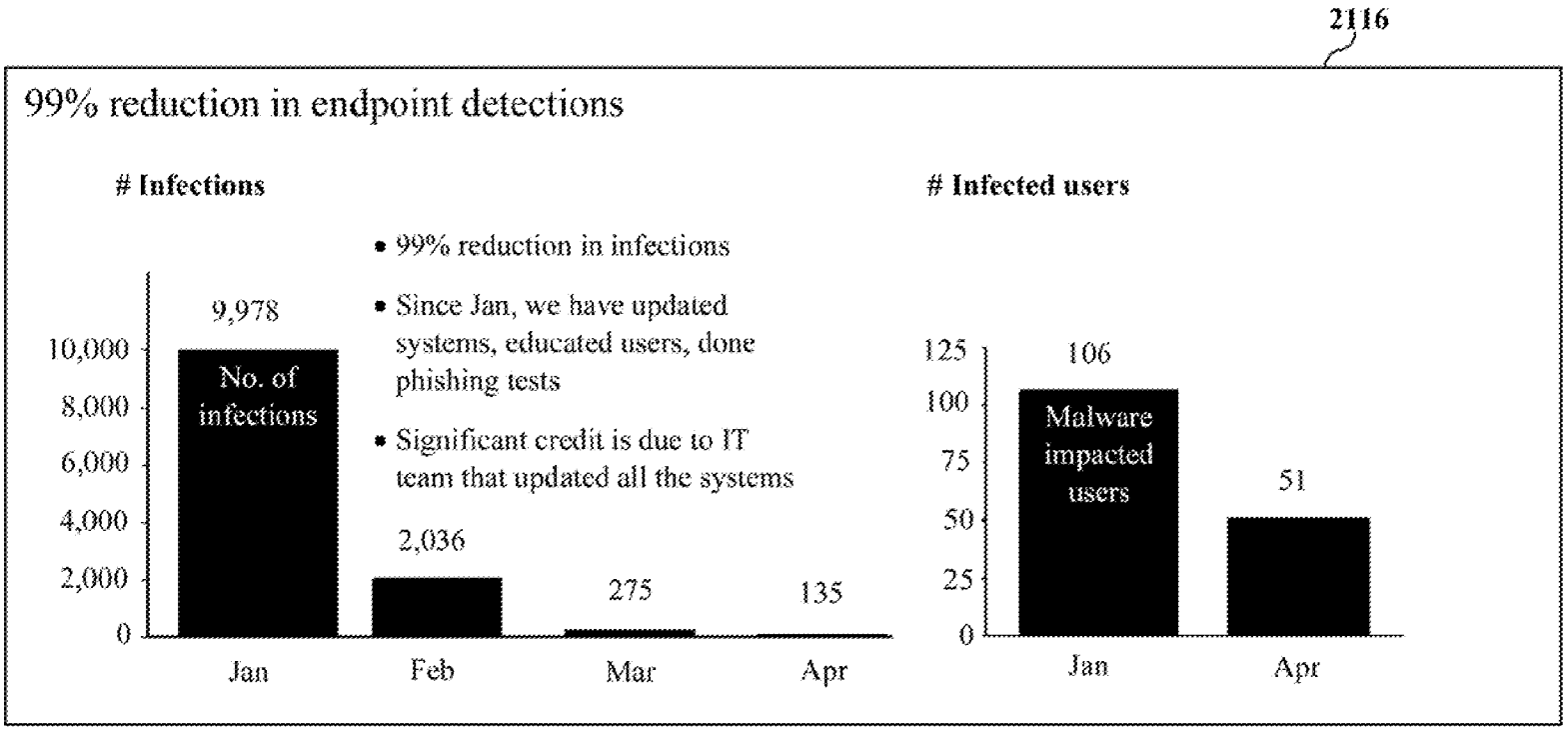
Figure 21S:
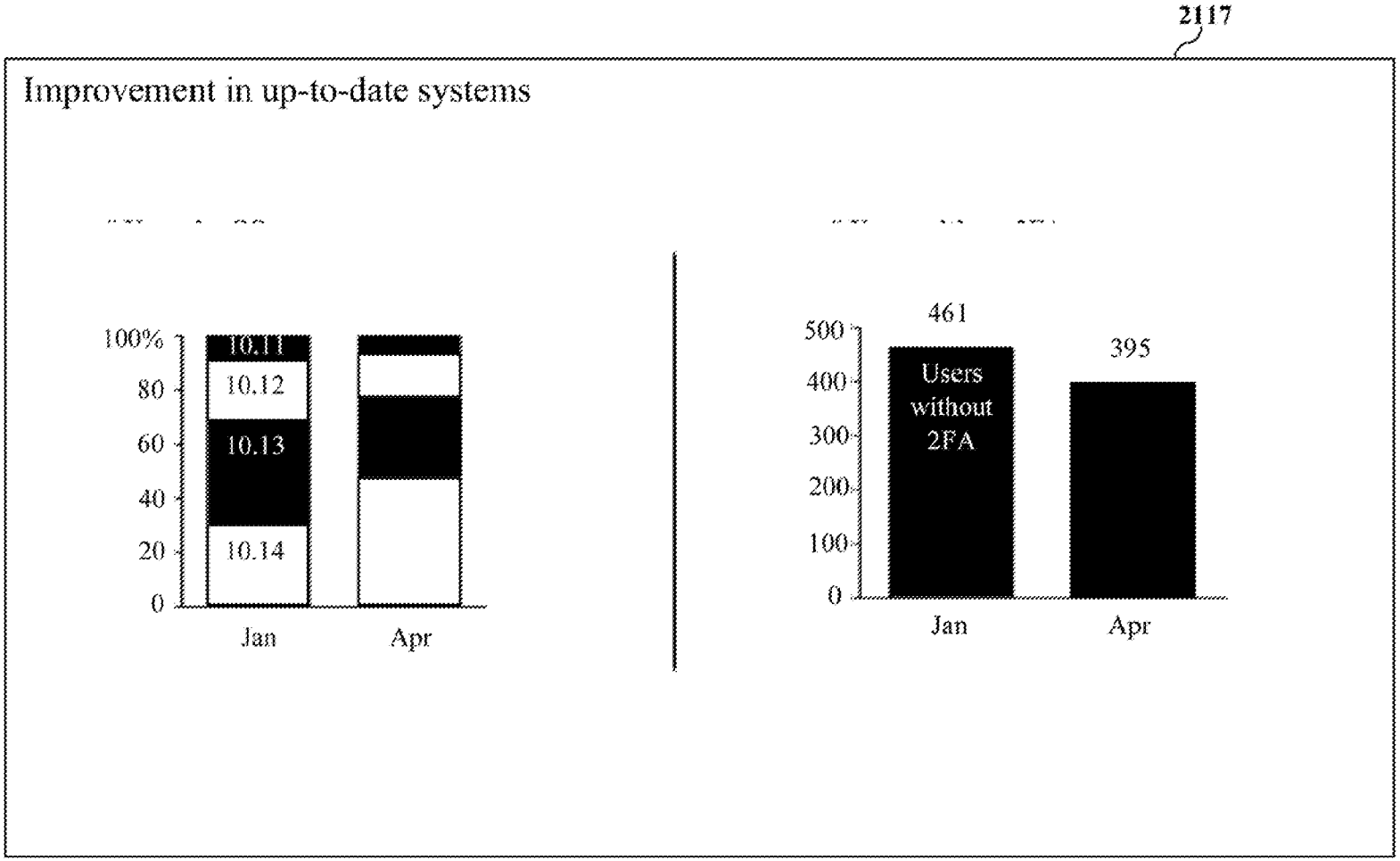
Figure 21T:
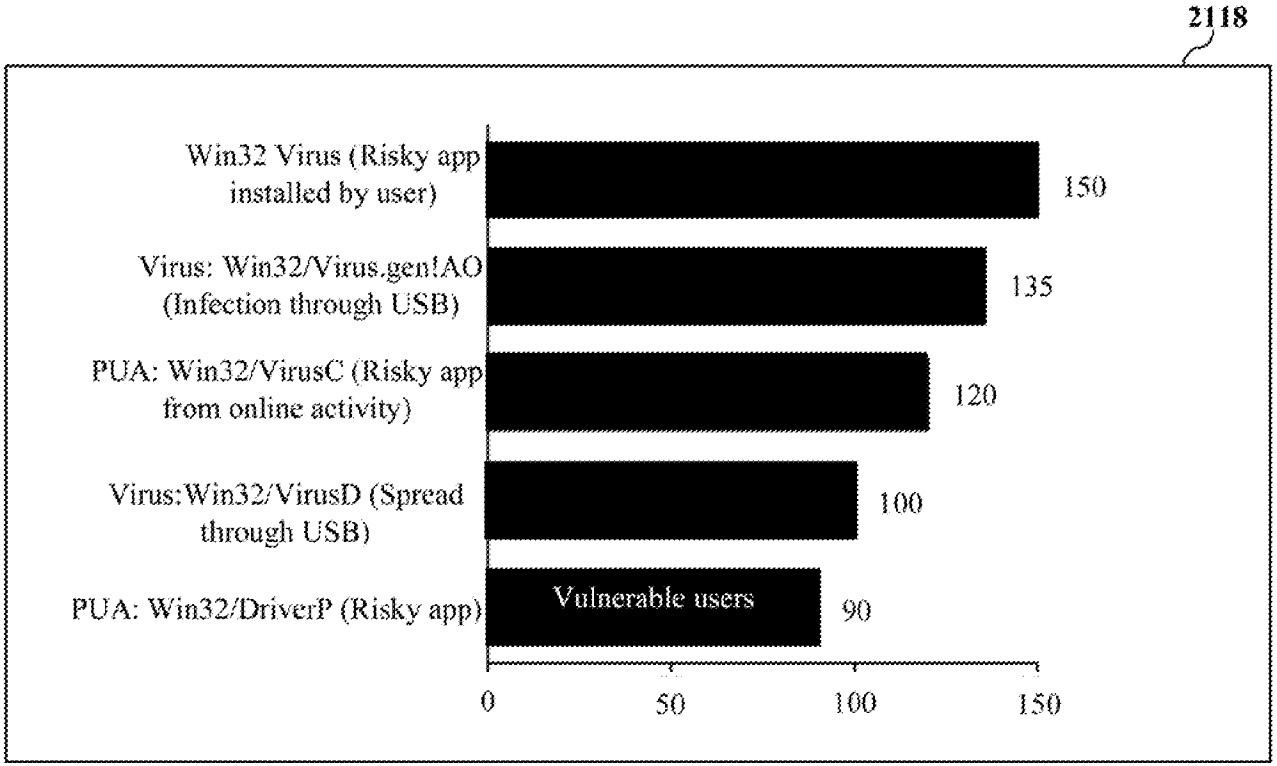

FIGS. 21A-21T exemplarily illustrate screenshots of graphical user interfaces (GUIs) rendered by the system 200 shown in FIGS. 2-5, for contextually managing and executing a change in security behavior of an organization. In an embodiment, the system 200 provides an artificial intelligence (AI) based behavior management platform, also referred to as the security behavior management system (SBMS) 303 shown in FIG. 3, that assists organizations in reducing security incidents. In an embodiment, the SBMS 303 provides security awareness training tailored for specific applications and offers actionable content for each of those applications. The SBMS 303 trains users, for example, employees of the organization about activities they are engaged in and about actual applications they use based on their security posture. The SBMS 303 renders contextual awareness content that is accessible from mobile devices to target users. The SBMS 303 renders a login screen 2101 exemplarily illustrated in FIG. 21A, on a user device of a system administrator (admin) for allowing the system admin to log into the SBMS 303.

The SBMS 303 also renders a configuration screen 2102 exemplarily illustrated in FIG. 21B, for allowing the system admin to configure external applications to integrate with the SBMS 303. The configuration screen 2102 also allows the system admin to configure data connectors or API connectors of multiple external applications such as security applications, customer relationship management (CRM) applications, etc., and view statuses of the configured data connectors and events processed from the external applications as exemplarily illustrated in FIG. 21B. The SBMS 303 also renders a behavior modeling screen 2103 exemplarily illustrated in FIG. 21C, for allowing the system admin to configure security behavioral models for each of the users in the organization. The behavior modeling screen 2103 allows the system admin to navigate through a series of predefined categories and select and weigh security behaviors that are most suited to the organization. For example, the system admin may select and weigh various sources of threat data through a series of threat categories as exemplarily illustrated in FIG. 21C. The SBMS 303 also renders a message configuration screen 2104 exemplarily illustrated in FIG. 21D, for allowing the system admin to set conditions and configurations for generation of contextual notification messages. The SBMS 303 also renders an awareness content selection screen 2105 exemplarily illustrated in FIG. 21E, for allowing the system admin to select types of awareness content, select target users or groups of target users, select delivery channels for delivering the contextual awareness content to selected target users, enable user feedback on coaching, etc.

The SBMS 303 displays a list of applications deployed in the organization and their compliance and privacy statuses on a GUI 2106 as exemplarily illustrated in FIG. 21F. The SBMS 303 also displays a summary, metadata, compliance status, and privacy status of each application deployed in the organization on a GUI 2107 as exemplarily illustrated in FIG. 21G. The SBMS 303 also renders an application compliance dashboard 2108 as exemplarily illustrated in FIGS. 21H-21I, that allows the system admin to select an application and view summary, metadata, categories, etc., of the selected application. In an embodiment, the SBMS 303 renders a GUI 2109 as exemplarily illustrated in FIG. 21J, for allowing the system admin to select training modules and awareness content related, for example, to email security, data protection, social media, security essentials, safe web browsing, etc., for a target user. The SBMS 303 also displays campaign reports comprising results from training campaigns, training status, and user feedback from security solutions that allow a measurement of the effectiveness of the training campaigns, on GUIs 2110 and 2111 as exemplarily illustrated in FIGS. 21K-21L. The SBMS 303 displays a campaign report chart on the GUI 2111 exemplarily illustrated in FIG. 21L, that displays the number of users who have completed training, the number of users who have not started training, and the number of users whose training is in progress. The system admin may also view user training information comprising, for example, username, email address, status of training, score, time spent, date and time of training, etc., of each user in a campaign table displayed on the GUI 2111 as exemplarily illustrated in FIG. 21L. The SBMS 303 also renders an executive dashboard 2112 that displays graphical representations of the number of trainings completed by target users, awareness scores, number of risky users, user feedback, a risky users' summary, training activities performed by target users, etc., as exemplarily illustrated in FIG. 21M.

Furthermore, the SBMS 303 renders an analytics dashboard 2113 exemplarily illustrated in FIG. 21N, that represents integrations with multiple external applications, a security culture score, graphical representations of security events and security incidents in the organization, and an organizational culture change score determined based on responses of target users to the contextual notification messages. The SBMS 303 also renders a security content catalog 2114 exemplarily illustrated in FIG. 21O, that displays training modules associated with different software applications deployed in the organization and security awareness content. The SBMS 303 also generates and renders multiple reports, for example, security awareness reports showing training scores, training distribution, training status, and training transaction details on a GUI 2115 as exemplarily illustrated in FIGS. 21P-21Q. The SBMS 303 measures the value the trainings provide to employees in an organization to prepare them for future security threats and aids in eliminating the security threats faced by the organization. The system admin may select the type of training and dates on the GUI 2115 to view the security awareness reports of the users. The system admin may also send customized training uniform resource locators (URLs) to target users via email and view their training activities and the training status for selected periods of time on the GUI 2115. The SBMS 303 also measures effectiveness of the targeted, contextual control elements based on the goal of the organization and the outcomes produced over time. The SBMS 303 tracks and measures data over a period of time based on predefined criteria. For example, if the goal of the organization is to reduce malware in the organization, then the SBMS 303 identifies and renders corresponding contextual control elements comprising, for example, contextual notification messages, contextual awareness content, etc., to target users and measures the reduction of malware incidents in the organization. The SBMS 303 generates and renders a report showing the measured reduction of malware incidents on the GUI 2116 as exemplarily illustrated in FIG. 21R. The SBMS 303 also generates and renders reports showing improvements in up-to-date systems and activation of multifactor authentication by users on the GUI 2117 as exemplarily illustrated in FIG. 21S. The SBMS 303 also generates and renders reports showing security events and number of users in the organization who are vulnerable to the security events on the GUI 2118 as exemplarily illustrated in FIG.

21T. The SBMS 303 utilizes the detected vulnerabilities to execute a change in the security behavior of the organization.

It is apparent in different embodiments that the various methods, algorithms, and computer readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the methods disclosed herein. Common forms of the non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read-only memory (CD-ROM), a digital versatile disc (DVD), any optical medium, a flash memory card, punch cards, paper tape, any other physical medium with patterns of holes, a random access memory (RAM), a programmable read-only memory (PROM), an erasable programmable read-only memory (EPROM), an electrically erasable programmable read-only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in various manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, R used for analyzing and manipulating data for statistical purposes, etc. Other object-oriented, functional, scripting, and/or logical programming languages can also be used. In an embodiment, the computer program codes or software programs are stored on or in one or more mediums as object code. In another embodiment, various aspects of the method and the system 200 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the system 200 disclosed herein are implemented as programmed elements, or non-programmed elements, or any suitable combination thereof.

Where databases are described such as the attribute stores 205a, 205c, and 205e shown in FIG. 2, the compliance database 218 shown in FIG. 3, etc., it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 200, the databases are integrated to communicate with each other for enabling simultaneous updates of data linked across the databases, when there are any updates to the data in one of the databases.

The method and the system 200 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system 200 disclosed herein are not limited to a particular computer system platform, processor, operating system, or network. In an embodiment, one or more embodiments of the method and the system 200 disclosed herein are distributed among one or more computer systems, for example, servers configured to provide one or more services to one or more client computers, or to perform a complete task in a distributed system. For example, one or more embodiments of the method and the system 200 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system 200 disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the method and the system 200 disclosed herein. While the method and the system 200 have been described with reference to various embodiments, illustrative implementations, drawings, and techniques, it is understood that the words, which have been used herein, are words of description and illustration, rather than words of limitation. Furthermore, although the method and the system 200 have been described herein with reference to particular means, materials, techniques, and embodiments, the method and the system 200 are not intended to be limited to the particulars disclosed herein; rather, the method and the system 200 extend to all functionally equivalent structures, methods and uses, such as are within the scope of the appended claims. While multiple embodiments are disclosed, it will be understood by those skilled in the art, having the benefit of the teachings of this specification, that the method and the system 200 disclosed herein are capable of modifications and other embodiments may be effected and changes may be made thereto, without departing from the scope and spirit of the method and the system 200 disclosed herein.

What is claimed is:

1. A method [for contextually managing and executing a change in security behavior of a target user, the method] comprising:

extracting a plurality of context attributes from a plurality of external applications by a security behavior management system via an application programming interface system and a plurality of data acquisition sources;

dynamically generating one or more security behavioral models for each of a plurality of users by the security behavior management system based on behavior modeling criteria derived from the context attributes;

dynamically generating a security behavior score for the each of the users by the security behavior management system by scoring a selection of one or more of the context attributes from the one or more security behavioral models of the each of the users;

dynamically generating a plurality of targeted, contextual control elements specific to a target user identified from among the users by the security behavior management system using the one or more security behavioral models, the security behavior score, and one or more context libraries; [and]

dynamically rendering one or more of the targeted, contextual control elements on a user device of the target user by the security behavior management system through one or more of a plurality of delivery channels for executing the change in the security behavior of the target user[.]*; and*

*tracking user actions performed in response to the targeted, contextual control elements and mapping the user actions to compliance requirements stored in a compliance database by the security behavior management system for regulating security compliance and identifying gaps in security risks of an organization associated with the target user.*

2. The method according to claim 1, wherein the context attributes comprise activity telemetry, relevancy metrics, security severity levels, actionability metrics, skill metrics, a timing metric, user actions, peer actions, historic responses, and user roles and permissions in an organization associated with the target user.

3. The method according to claim 1, wherein the behavior modeling criteria comprise a perceived security threat criterion, a self-efficacy criterion, a social norm criterion, and a perceived reward and punishment criterion.

4. The method according to claim 1, wherein the dynamic generation of the security behavior score for the each of the users comprises:

classifying the context attributes into a plurality of predefined categories by the security behavior management system;

computing an intermediate score for each of the context attributes in each of the predefined categories by the security behavior management system on performing an assessment of actions of the each of the users in relation to the context attributes;

generating a cumulative score for the each of the predefined categories by the security behavior management system using the intermediate score of the each of the context attributes; and generating the security behavior score by the security behavior management system using the generated cumulative score of the each of the predefined categories.

5. The method according to claim 1, wherein the targeted, contextual control elements comprise targeted, contextual notification messages comprising one or more of preventive warnings based on internal threat vectors, preventive warnings based on external threat vectors, [real-time cues and close to real-time] cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user.

6. The method according to claim 1, wherein the dynamic generation of the targeted, contextual control elements comprises dynamically generating contextual awareness content using the one or more security behavioral models, automatically [generated] *generating* awareness strategies, and personalization preferences of the target user and an organization associated with the target user, by the security behavior management system in communication with the one or more context libraries, wherein the contextual awareness content comprises security use cases derived from the external applications and the data acquisition sources, security training modules, newsletters, and multi-channel threat simulations configured to educate the target user prior to a [real-time] threat.

[7. The method according to claim 1, further comprising tracking user actions performed in response to the targeted, contextual control elements and mapping the user actions to compliance requirements stored in a compliance database by the security behavior management system for regulating security compliance and identifying gaps in security risks of an organization associated with the target user.]

8. The method according to claim 1, further comprising dynamically generating policy management recommendations configured to change configurations of security controls, security operations, and security policies of an organization associated *with a plurality of* target users by the security behavior management system based on the one or more security behavioral models of the each of the users using the dynamically generated targeted, contextual control elements and a change in security risks of the organization incurred due to user actions performed in response to the targeted, contextual control elements.

9. The method according to claim 1, further comprising generating reports comprising one or more of user actions performed in response to the targeted, contextual control elements, security risks associated with *a plurality of* target users, security behavior patterns, security behavior trends, and a correlation between the security risks and security compliance in an organization associated with the target users, by the security behavior management system.

10. The method according to claim 1, wherein the external applications comprise communication applications, web sources, cloud sources, calendar applications, productivity applications, endpoint security applications, events and alerts of security applications, cloud collaboration applications, on-premise collaboration applications, data analytics applications, customer relationship management applications, enterprise resource planning applications, file hosting applications, enterprise social media applications, marketing applications, and cloud-based software as a service applications.

11. A system [for contextually managing and executing a change in security behavior of a target user, the system] comprising:

a non-transitory, computer-readable storage medium configured to store computer program instructions executable by at least one processor; and the at least one processor communicatively coupled to the non-transitory, computer-readable storage medium and configured to execute computer program instructions defined by a plurality of modules, the modules comprising:

a data extraction engine configured to extract a plurality of context attributes from a plurality of external applications via an application programming interface system and a plurality of data acquisition sources;

a behavior modeling engine configured to dynamically generate one or more security behavioral models for each of a plurality of users based on behavior modeling criteria derived from the context attributes;

the behavior modeling engine further configured to dynamically generate a security behavior score for the each of the users by scoring a selection of one or more of the context attributes from the one or more security behavioral models of the each of the users;

a control element generation engine configured to dynamically generate targeted, contextual control elements specific to a target user identified from among the users using the one or more security behavioral models, the security behavior score, and one or more context libraries; [and]

the control element generation engine further configured to dynamically render one or more of the targeted, contextual control elements on a user device of the target user through one or more of a plurality of delivery channels for executing the change in the security behavior of the target user[.]*; and*

*a compliance mapping module configured to track user actions performed in response to the targeted, contextual control elements and map the user actions to compliance requirements stored in a compliance database for regulating security compliance and identifying gaps in security risks of an organization associated with the target user.*

12. The system according to claim 11, wherein the context attributes comprise activity telemetry, relevancy metrics, security severity levels, actionability metrics, skill metrics, a timing metric, user actions, peer actions, historic responses, and user roles and permissions in an organization associated with the target user.

13. The system according to claim 11, wherein the behavior modeling criteria comprise a perceived security threat criterion, a self-efficacy criterion, a social norm criterion, and a perceived reward and punishment criterion.

14. The system according to claim 11, wherein the behavior modeling engine is configured to dynamically generate the security behavior score for the each of the users by:

classifying the context attributes into a plurality of predefined categories;

computing an intermediate score for each of the context attributes in each of the predefined categories on performing an assessment of actions of the each of the users in relation to the context attributes;

generating a cumulative score for the each of the predefined categories using the intermediate score of the each of the context attributes; and generating the security behavior score using the generated cumulative score of the each of the predefined categories.

15. The system according to claim 11, wherein the targeted, contextual control elements comprise targeted, contextual notification messages comprising one or more of preventive warnings based on internal threat vectors, preventive warnings based on external threat vectors, [real-time cues and close to real-time] cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user.

16. The system according to claim 11, wherein the control element generation engine, in communication with the one or more context libraries, is further configured to dynamically generate contextual awareness content using the one or more security behavioral models, automatically [generated] *generating* awareness strategies, and personalization preferences of the target user and an organization associated with the target user, and wherein the contextual awareness content comprises security use cases derived from the external applications and the data acquisition sources, security training modules, newsletters, and multi-channel threat simulations configured to educate the target user prior to a [real-time] threat.

[17. The system according to claim 11, wherein the modules further comprise a compliance mapping module configured to track user actions performed in response to the targeted, contextual control elements and map the user actions to compliance requirements stored in a compliance database for regulating security compliance and identifying gaps in security risks of an organization associated with the target user.]

18. The system according to claim 11, wherein the modules further comprise a policy management module configured to dynamically generate policy management recommendations configured to change configurations of security controls, security operations, and security policies of an organization associated with *a plurality of* target users based on the one or more security behavioral models of the each of the users using the dynamically generated targeted, contextual control elements and a change in security risks of the organization incurred due to user actions performed in response to the targeted, contextual control elements.

19. The system according to claim 11, wherein the modules further comprise a reporting module configured to generate reports comprising one or more of user actions performed in response to the targeted, contextual control elements, security risks associated with *a plurality of* target users, security behavior patterns, security behavior trends, and a correlation between the security risks and security compliance in an organization associated with the target users.

20. The system according to claim 11, wherein the external applications comprise communication applications, web sources, cloud sources, calendar applications, productivity applications, endpoint security applications, events and alerts of security applications, cloud collaboration applications, on-premise collaboration applications, data analytics applications, customer relationship management applications, enterprise resource planning applications, file hosting applications, enterprise social media applications, marketing applications, and cloud-based software as a service applications.

*21. A method comprising:*

*extracting, by a system, one or more context attributes from one or more applications via an application programming interface;*

*generating, by the system, one or more security behavioral models for one or more users based on criteria derived from the one or more context attributes;*

*generating, by the system, for each of the one or more users a security behavior score from a selection of the one or more context attributes from the one or more security behavioral models of each of the users;*

*generating, by the system, one or more contextual control elements for a target user using the one or more security behavioral models and the security behavior score;*

*rendering, by the system, the one or more contextual control elements on a user device of the target user; and*

*tracking, by the system, user actions performed in response to the targeted, contextual control elements and mapping the user actions to compliance requirements and identifying gaps in security risks of an organization associated with the target user.*

*22. The method of claim 21, wherein the context attributes comprises one or more of the following: activity telemetry, relevancy metrics, security severity levels, actionability metrics, skill metrics, a timing metric, user actions, peer actions, historic responses, and user roles and permissions in an organization associated with the target user.*

*23. The method of claim 21, wherein the criteria comprises one or more of the following: a perceived security threat criterion, a self-efficacy criterion, a social norm criterion, and a perceived reward and punishment criterion.*

*24. The method of claim 21, wherein the generation of the security behavior score for the each of the users comprises:*

*classifying the context attributes into a plurality of predefined categories;*

*computing an intermediate score for each of the context attributes in each of the predefined categories on performing an assessment of actions of the each of the users in relation to the context attributes;*

*generating a cumulative score for the each of the predefined categories using the intermediate score of the each of the context attributes; and*

*generating the security behavior score using the generated cumulative score of the each of the predefined categories.*

*25. The method of claim 21, wherein the contextual control elements comprise one or more of the following: targeted, contextual notification messages comprising one or more of preventive warnings based on internal threat vectors, preventive warnings based on external threat vectors, cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user.*

*26. The method of claim 21, wherein the generation of the contextual control elements comprises generating contextual awareness content using the one or more security behavioral models.*

*27. The method of claim 21, further comprising generating one or more policy management recommendations configured to change one or more configurations of one or more of security controls, security operations, and security policies of an organization associated with the target user.*

*28. The method of claim 21, further comprising generating reports comprising one or more user actions performed in response to the contextual control elements.*

*29. The method of claim 21, wherein the one or more applications comprise one or more of the following: communication applications, web sources, cloud sources, calendar applications, productivity applications, endpoint security applications, events and alerts of security applications, cloud collaboration applications, on-premise collaboration applications, data analytics applications, customer relationship management applications, enterprise resource planning applications, file hosting applications, enterprise social media applications, marketing applications, and cloud-based software as a service applications.*

*30. A system comprising:*

*one or more processors, coupled to memory and configured to:*

*extract one or more context attributes from one or more applications via an application programming interface;*

*generate one or more security behavioral models for one or more users based on criteria derived from the one or more context attributes;*

*generate for each of the one or more users a security behavior score from a selection of the one or more context attributes from the one or more security behavioral models of each of the users;*

*generate one or more contextual control elements for a target user using the one or more security behavioral models and the security behavior score;*

*render the one or more contextual control elements on a user device of the target user; and*

*track user actions performed in response to the targeted, contextual control elements and mapping the user actions to compliance requirements and identifying gaps in security risks of an organization associated with the target user.*

*31. The system of claim 30, wherein the context attributes comprises one or more of the following: activity telemetry, relevancy metrics, security severity levels, actionability metrics, skill metrics, a timing metric, user actions, peer*

*actions, historic responses, and user roles and permissions in an organization associated with the target user.*

*32. The system of claim 30, wherein the criteria comprises one or more of the following:*

*a perceived security threat criterion, a self-efficacy criterion, a social norm criterion, and a perceived reward and punishment criterion.*

*33. The system of claim 30, wherein the generation of the security behavior score for the each of the users comprises:*

*classifying the context attributes into a plurality of predefined categories;*

*computing an intermediate score for each of the context attributes in each of the predefined categories on performing an assessment of actions of the each of the users in relation to the context attributes;*

*generating a cumulative score for the each of the predefined categories using the intermediate score of the each of the context attributes; and*

*generating the security behavior score using the generated cumulative score of the each of the predefined categories.*

*34. The system of claim 30, wherein the contextual control elements comprise one or more of the following: targeted, contextual notification messages comprising one or more of preventive warnings based on internal threat vectors, preventive warnings based on external threat vectors, cues to retract from prior actions to preclude further security issues, links to access contextual awareness content and facilitate execution of targeted training to the target user, an indication of a reputation of applications, awareness strategy recommendations, and recommendations to execute changes to configurations of security controls, security operations, and security policies of an organization associated with the target user.*

*35. The system of claim 30, wherein the generation of the contextual control elements comprises generating contextual awareness content using the one or more security behavioral models.*

*36. The system of claim 30, wherein the one or more processors are further configured to generate one or more policy management recommendations that are configured to change one or more configurations of one or more of security controls, security operations, and security policies of an organization associated with the target user.*

*37. The system of claim 30, wherein the one or more processors are further configured to generate one or more reports comprising one or more user actions performed in response to the contextual control elements.*

*38. The system of claim 30, wherein the one or more applications comprise one or more of the following: communication applications, web sources, cloud sources, calendar applications, productivity applications, endpoint security applications, events and alerts of security applications, cloud collaboration applications, on-premise collaboration applications, data analytics applications, customer relationship management applications, enterprise resource planning applications, file hosting applications, enterprise social media applications, marketing applications, and cloud-based software as a service applications.*

* * * * *